US012429827B2

(12) United States Patent

Takyo et al.

(10) Patent No.: US 12,429,827 B2

(45) Date of Patent: Sep. 30, 2025

(54) MECHANICAL TIMEPIECE

(71) Applicant: CITIZEN WATCH CO., LTD., Tokyo (JP)

(72) Inventors: Yu Takyo, Nishitokyo (JP); Yusaku Niida, Kawagoe (JP); Takuya Shirai, Tokyo (JP); Yosuke Abe, Fuchu (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 299 days.

(21) Appl. No.: 18/546,777

(22) PCT Filed: Jan. 13, 2022

(86) PCT No.: PCT/JP2022/000922

§ 371 (c)(1),
(2) Date: Aug. 16, 2023

(87) PCT Pub. No.: WO2022/176453

PCT Pub. Date: Aug. 25, 2022

(65) Prior Publication Data

US 2024/0126212 A1 Apr. 18, 2024

(30) Foreign Application Priority Data

Feb. 17, 2021 (JP) ................................ 2021-023509
Aug. 12, 2021 (JP) ................................ 2021-131592

(51) Int. Cl.

*G04C 3/06* (2006.01)
*G04C 5/00* (2006.01)
*G04C 10/00* (2006.01)

(52) U.S. Cl.

CPC ............ *G04C 3/064* (2013.01); *G04C 5/005* (2013.01); *G04C 10/00* (2013.01)

(58) Field of Classification Search

CPC ........ G04C 3/064; G04C 5/005; G04C 10/00; G04C 3/04; G04C 11/081; G04C 3/047;
(Continued)

(56) References Cited

U.S. PATENT DOCUMENTS

| | | | | |
|---|---|---|---|---|
| 3,877,215 A | | 4/1975 | Burckhardt et al. | |
| 7,031,230 B1 | * | 4/2006 | Nagasaka .............. | G04C 10/00 368/204 |
| 10,386,791 B2 | * | 8/2019 | Tombez ............... | G04C 11/084 |
| 11,687,041 B2 | * | 6/2023 | Tombez ............... | G04C 11/081 368/76 |

(Continued)

FOREIGN PATENT DOCUMENTS

| | | |
|---|---|---|
| JP | S36-011942 B | 7/1961 |
| JP | S49-98280 A | 9/1974 |

(Continued)

OTHER PUBLICATIONS

Extended European Search Report of Jan. 8, 2025, for corresponding EP Patent Application No. 22755778.2., pp. 1-10.

(Continued)

*Primary Examiner* — Edwin A. Leon
(74) *Attorney, Agent, or Firm* — HEA Law PLLC

(57) ABSTRACT

A mechanical timepiece includes: a hairspring; a permanent magnet; a soft magnetic core; a control circuit for performing rate adjustment based on a counter-electromotive voltage caused in a coil by a motion of the permanent magnet accompanying a forward direction motion and a reverse direction motion of the balance wheel. The permanent magnet is arranged so that, under a state in which the hairspring is brought to an equilibrium length, a direction of magnetization is directed to the first end portion side or the second end portion side.

19 Claims, 45 Drawing Sheets

(58) Field of Classification Search
CPC .......... G04C 11/00; G04C 3/008; G04C 3/16; G04B 17/06
See application file for complete search history.

(56) References Cited

U.S. PATENT DOCUMENTS

| | | | |
|---|---|---|---|
| 2011/0216629 | A1 | 9/2011 | Zaugg et al. |
| 2012/0269043 | A1 | 10/2012 | Baudet et al. |
| 2014/0098646 | A1 | 4/2014 | Gaechter et al. |
| 2019/0187625 | A1 | 6/2019 | Tombez |
| 2020/0073331 | A1 | 3/2020 | Tombez |

FOREIGN PATENT DOCUMENTS

| | | | |
|---|---|---|---|
| JP | 2011-185932 | A | 9/2011 |
| JP | 2013-509576 | A | 3/2013 |
| JP | 2014-077788 | A | 5/2014 |
| JP | 2017058248 | A | 3/2017 |
| JP | 2018-159598 | A | 10/2018 |
| JP | 2019-113548 | A | 7/2019 |
| JP | 2020-038206 | A | 3/2020 |
| WO | 2011051497 | A1 | 5/2011 |

OTHER PUBLICATIONS

Office Action of Mar. 18, 2025, for corresponding JP Patent Application No. 2021-131592, pp. 1-3.

International Search Report of Apr. 5, 2022, relating International Patent Application for PCT/JP2022/000922 with English translation, pp. 1-4.

* cited by examiner

MECHANICAL TIMEPIECE

CROSS REFERENCE TO RELATED APPLICATIONS

This application is a National Stage of International Application No. PCT/JP2022/000922 filed on Jan. 13, 2022, which claims priority from Japanese Patent Application 2021-023509, filed on Feb. 17, 2021. The contents of the above document is incorporated herein by reference in its entirety.

TECHNICAL FIELD

The present invention relates to a mechanical timepiece.

BACKGROUND ART

In Patent Literature 1, there is disclosed a mechanical timepiece having functions of performing power generation based on a motion of a magnet mounted to a shaft (balance staff), and also performing rate adjustment by observing a cycle of rotation of a balance (for example, paragraphs 0072 and 0073, FIG. 27, and the like of Patent Literature 1). Further, in Patent Literature 2, there is disclosed a configuration in which power generation is performed by means of electric power obtained by performing full wave rectification through use of a rectifier including four diodes (for example, FIG. 13 of Patent Literature 2).

CITATION LIST

Patent Literature

[Patent Literature 1] JP 2020-38206 A
[Patent Literature 2] JP 2019-113548 A

SUMMARY OF INVENTION

Technical Problem

In this case, the electric power to be caused by the motion of the magnet accompanying the motion of the balance staff is very small, and hence it is required to devise a way to efficiently extract the electric power. However, when full wave rectification is performed by means of a rectifier including a plurality of diodes as in Patent Literature 2, a voltage drop corresponding to the number of diodes occurs, resulting in occurrence of power loss.

The present invention has been made in view of the above-mentioned problems, and has an object to efficiently extract electric power in a mechanical timepiece in which rate adjustment is performed through use of electromagnetic means.

Solution to Problem (1) A mechanical timepiece, including: a power source; a speed governing mechanism including: a balance wheel to be driven by motive power supplied from the power source; and a hairspring to be elastically deformed so as to cause the balance wheel to perform a forward/reverse rotational motion; a permanent magnet which is magnetized into two poles, and is configured to perform a forward/reverse rotational motion along with the forward/reverse rotational motion of the balance wheel; a coil; a soft magnetic core including: a first end portion to be provided along an outer periphery of the permanent magnet; and a second end portion which is to be provided along the outer periphery of the permanent magnet, and is to be arranged so as to be opposed to the first end portion through intermediation of the permanent magnet, the soft magnetic core being configured to form a magnetic circuit together with the coil; a control circuit configured to perform rate adjustment based on a detection voltage and a normal frequency of a reference signal source, the detection voltage being caused in the coil by a motion of the permanent magnet accompanying a forward direction motion and a reverse direction motion of the balance wheel; a rectifying circuit configured to rectify a current caused in the coil due to the motion of the permanent magnet accompanying the forward direction motion and the reverse direction motion of the balance wheel; and a power supply circuit configured to drive the control circuit based on the current rectified by the rectifying circuit, wherein the permanent magnet is arranged so that, under a state in which the hairspring is brought to a neutral position of elastic deformation thereof, a direction of magnetization is directed to the first end portion side or the second end portion side.

(2) The mechanical timepiece according to Item (1), wherein the permanent magnet is arranged so that, under the state in which the hairspring is brought to the neutral position of the elastic deformation thereof, the direction of magnetization is the same as an opposing direction of the first end portion and the second end portion.

(3) The mechanical timepiece according to Item (1) or (2), wherein the soft magnetic core includes: a first separating portion configured to separate magnetic coupling between the first end portion and the second end portion; and the second separating portion which is configured to separate the magnetic coupling between the first end portion and the second end portion, and is to be arranged so as to be opposed to the first separating portion through intermediation of the permanent magnet, and wherein the permanent magnet is arranged so that, under the state in which the hairspring is brought to the neutral position, the direction of magnetization is orthogonal to an opposing direction of the first separating portion and the second separating portion.

(4) The mechanical timepiece according to Item (1) or (2), wherein the soft magnetic core includes: a first separating portion configured to separate magnetic coupling between the first end portion and the second end portion; and the second separating portion which is configured to separate the magnetic coupling between the first end portion and the second end portion, and is to be arranged so as to be opposed to the first separating portion through intermediation of the permanent magnet, and wherein the permanent magnet includes an N-pole portion and an S-pole portion, and is arranged so that, under the state in which the hairspring is brought to the neutral position, a boundary between the N-pole portion and the S-pole portion overlaps an imaginary band-shaped region connecting the first separating portion and the second separating portion to each other.

(5) The mechanical timepiece according to any one of Items (1) to (4), wherein, under the state in which the hairspring is brought to the neutral position, the balance wheel is brought to a motive power supply position at which the motive power is supplied from the power source.

(6) The mechanical timepiece according to Item (5), wherein the permanent magnet is arranged so that the detection voltage to be detected while the permanent magnet is rotated by 180° in a forward direction or a reverse direction from the motive power supply position has the same polarity.

(7) The mechanical timepiece according to any one of Items (1) to (6), further including: a rotation detecting circuit configured to detect a detection signal based on the detection voltage; and a speed governing pulse output circuit configured to output a speed governing pulse for controlling a motion of the balance wheel, wherein the control circuit is configured to control the speed governing pulse output circuit based on a detection timing of the detection signal and an output timing of a reference signal, which is based on the normal frequency.

(8) The mechanical timepiece according to Item (7), wherein the speed governing pulse output circuit is configured to: output, when the detection timing of the detection signal is earlier than the output timing of the reference signal, the speed governing pulse to any one of a first terminal or a second terminal of the coil; and output, when the detection timing of the detection signal is later than the output timing of the reference signal, the speed governing pulse to another one of the first terminal or the second terminal.

(9) The mechanical timepiece according to Item (7) or (8), wherein the speed governing pulse output circuit is configured to output a plurality of speed governing pulses as the speed governing pulse, the plurality of speed governing pulses having output periods different from each other.

(10) The mechanical timepiece according to any one of Items (7) to (9), wherein the speed governing pulse output circuit is configured to output a plurality of speed governing pulses as the speed governing pulse, the plurality of speed governing pulses having duty ratios different from each other.

(11) The mechanical timepiece according to Item (9) or (10), wherein the speed governing pulse output circuit is configured to output the speed governing pulse corresponding to a deviation amount of the detection timing of the detection signal with respect to the output timing of the reference signal.

(12) The mechanical timepiece according to Item (11), further including an accumulating unit configured to accumulate the deviation amount of the detection timing of the detection signal with respect to the output timing of the reference signal, wherein the speed governing pulse output circuit is configured to output the speed governing pulse corresponding to the deviation amount accumulated in the accumulating unit.

(13) The mechanical timepiece according to any one of Items (1) to (12), further including speed reduction means for reducing a speed of the balance wheel by acting on the balance wheel during a halfway period in each of a forward direction motion and a reverse direction motion in the forward/reverse rotational motion of the balance wheel, the speed reduction means being provided in a predetermined direction with respect to a rotary shaft of the balance wheel, wherein the balance wheel includes an affected portion which is formed in a part of the balance wheel in a circumferential direction, and is to be affected by the speed reduction means.

(14) The mechanical timepiece according to Item (13), wherein the control circuit is configured to perform rate adjustment based on the normal frequency and a detection voltage caused in the coil due to the motion of the permanent magnet before the affected portion reaches a position of the speed reduction means in the forward direction motion and the reverse direction motion in the forward/reverse rotational motion of the balance wheel.

(15) The mechanical timepiece according to Item (13) or (14), wherein the control circuit is configured to perform rate adjustment during a period after the affected portion reaches a position of the speed reduction means in the forward direction motion and the reverse direction motion in the forward/reverse rotational motion of the balance wheel.

(16) The mechanical timepiece according to any one of Items (13) to (15), wherein the control circuit is to be driven by being supplied with a counter-electromotive force caused in the coil due to the motion of the permanent magnet before the affected portion reaches a position of the speed reduction means in the forward direction motion and the reverse direction motion in the forward/reverse rotational motion of the balance wheel.

(17) The mechanical timepiece according to any one of Items (1) to (16), wherein the rectifying circuit includes a diode.

(18) The mechanical timepiece according to any one of Items (1) to (17), wherein the hairspring is made of a resin.

(19) The mechanical timepiece according to any one of Items (1) to (18), wherein the first end portion and the second end portion have at least a pair of notches for reducing holding torque of the permanent magnet, the pair of notches being formed so as to be opposed to each other.

(20) The mechanical timepiece according to any one of Items (1) to (19), wherein the hairspring is provided so as to cause the balance wheel to move back and forth one time in two seconds.

(21) The mechanical timepiece according to any one of Items (1) to (20), further including a bearing structure configured to support an end portion of a rotary shaft of the balance wheel on a side closer to the permanent magnet, wherein the bearing structure includes an elastic deformation portion which is to be elastically deformed in accordance with displacement of the rotary shaft, and is made of a non-magnetic material.

(22) The mechanical timepiece according to Item (21), wherein the elastic deformation portion has such a shape as to be elastically deformable in at least one of a radial direction or an axial direction of the rotary shaft in accordance with the displacement of the rotary shaft.

(23) The mechanical timepiece according to Item (21) or (22), wherein the bearing structure includes: a hole stone having a shaft hole through which the end portion of the rotary shaft is to be inserted; and a holding portion which is configured to hold the hole stone, is to be connected to the elastic deformation portion, and is made of a non-magnetic material.

(24) The mechanical timepiece according to any one of Items (21) to (23), further including an accommodating member configured to accommodate the bearing structure, wherein the accommodating member includes: a first peripheral surface for surrounding the end portion of the rotary shaft; a second peripheral surface which is to be provided on a side closer to the balance wheel with respect to the first peripheral surface, and which has a diameter smaller than a diameter of the first peripheral surface; and a stepped portion connecting the first peripheral surface and the second peripheral surface to each other, and wherein an outer edge of the elastic deformation portion is fixed with respect to the stepped portion.

(25) The mechanical timepiece according to Item (24), wherein a diameter of the permanent magnet is smaller than the diameter of the second peripheral surface, and wherein at least parts of the permanent magnet and the second peripheral surface are provided at the same position in an axial direction of the rotary shaft.

Advantageous Effects of Invention

According to the aspects of Items (1) to (25) of the present invention described above, the electric power can be efficiently extracted in the mechanical timepiece in which the rate adjustment is performed through use of the electromagnetic means.

DESCRIPTION OF EMBODIMENTS

Description is made below in detail of an embodiment (hereinafter referred to as this embodiment) of the present invention based on the drawings.

Outline of Overall Configuration

Figure 1:
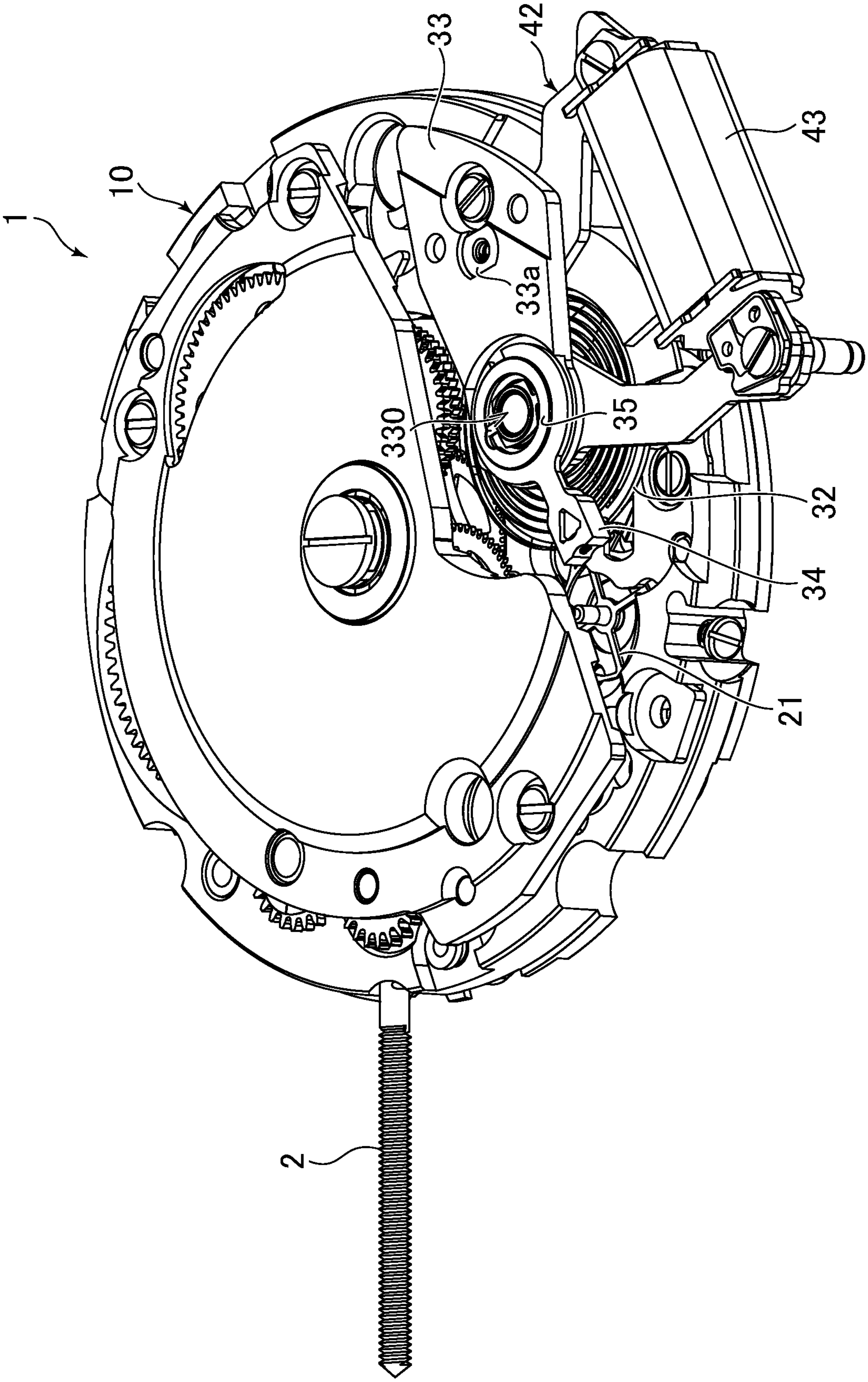
FIG. 1 is a perspective view for illustrating a main plate and each member to be incorporated thereto in an embodiment of the present invention.
Figure 2:
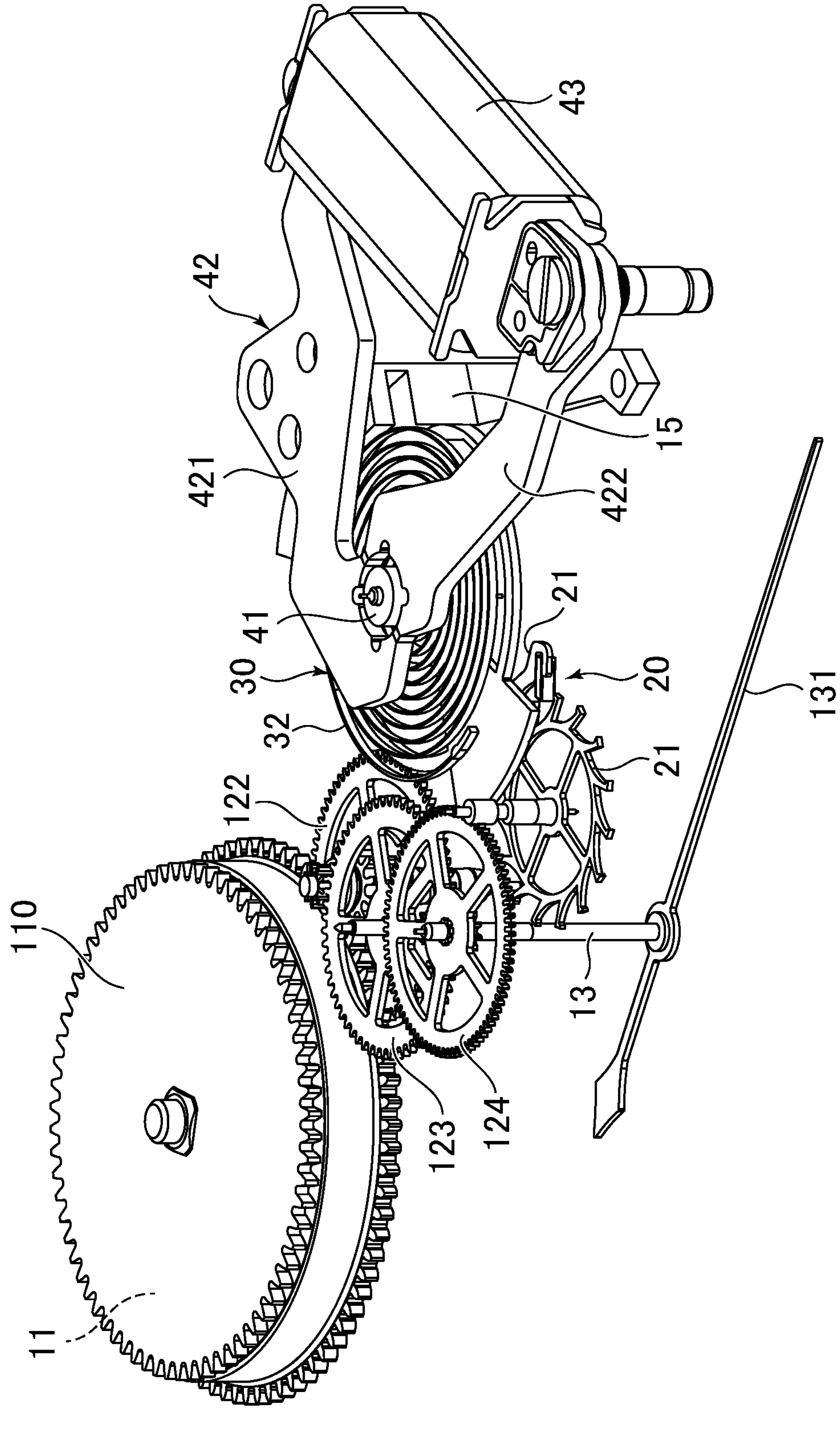
FIG. 2 is a perspective view for illustrating a mechanism for transmitting motive power and its surroundings in the embodiment.
Figure 3:
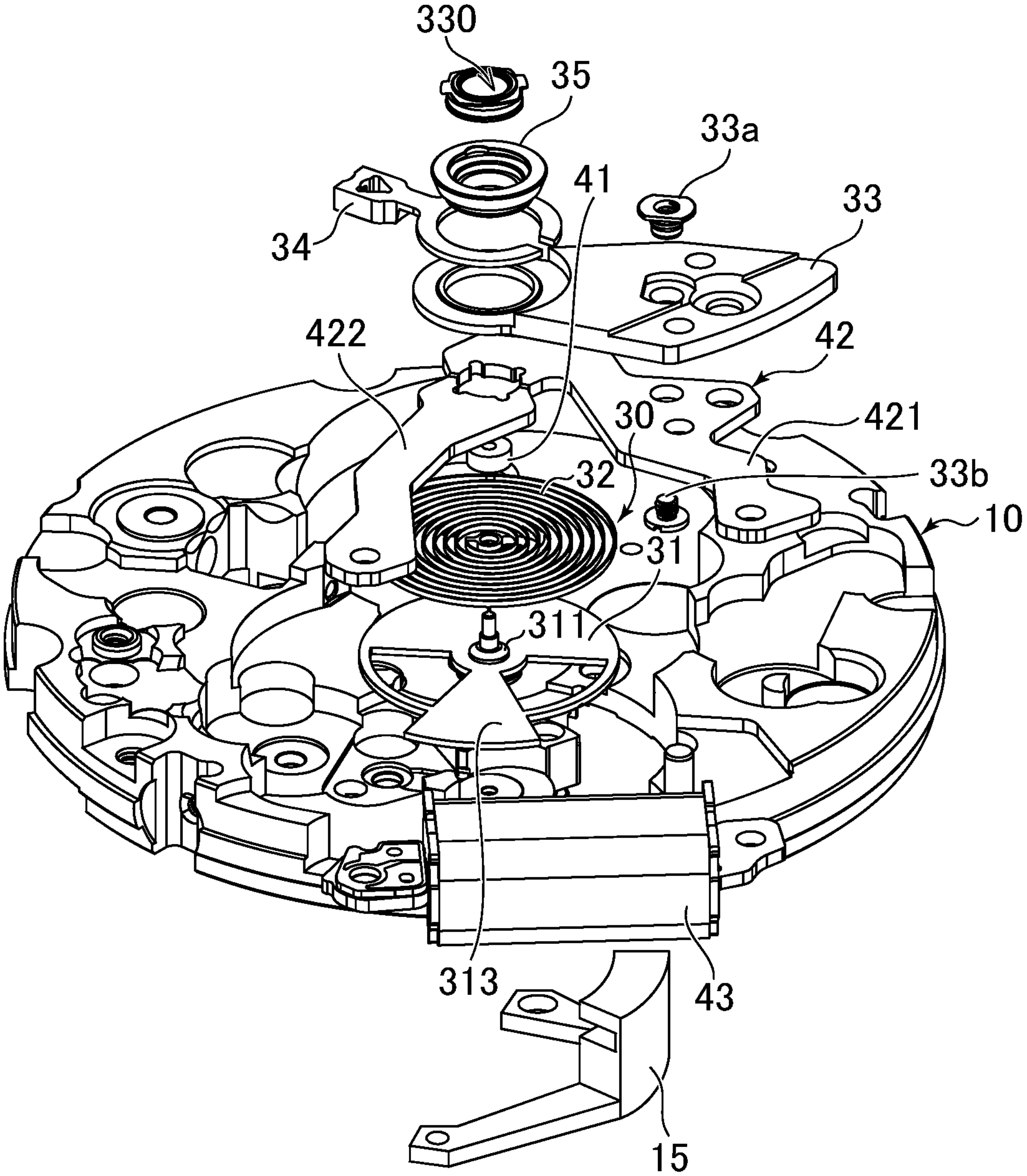
FIG. 3 is an exploded perspective view for illustrating a state in which a speed governing mechanism and its surrounding members are disassembled from the main plate in the embodiment.

First, with reference to FIG. 1 to FIG. 8, an outline of an overall configuration of a mechanical timepiece 1 according to this embodiment is described. FIG. 1 is a perspective view for illustrating a main plate and each member to be incorporated thereto in this embodiment. FIG. 2 is a perspective view for illustrating a mechanism for transmitting motive power and its surroundings in this embodiment. FIG. 3 is an exploded perspective view for illustrating a state in which a speed governing mechanism and its surrounding members are disassembled from the main plate in this embodiment. FIG. 1 to FIG. 3 show a state in which the mechanical timepiece 1 is viewed from its back side. The back side refers to a side on which a back cover of an exterior case is arranged in a thickness direction of the mechanical timepiece 1.

Figure 4:
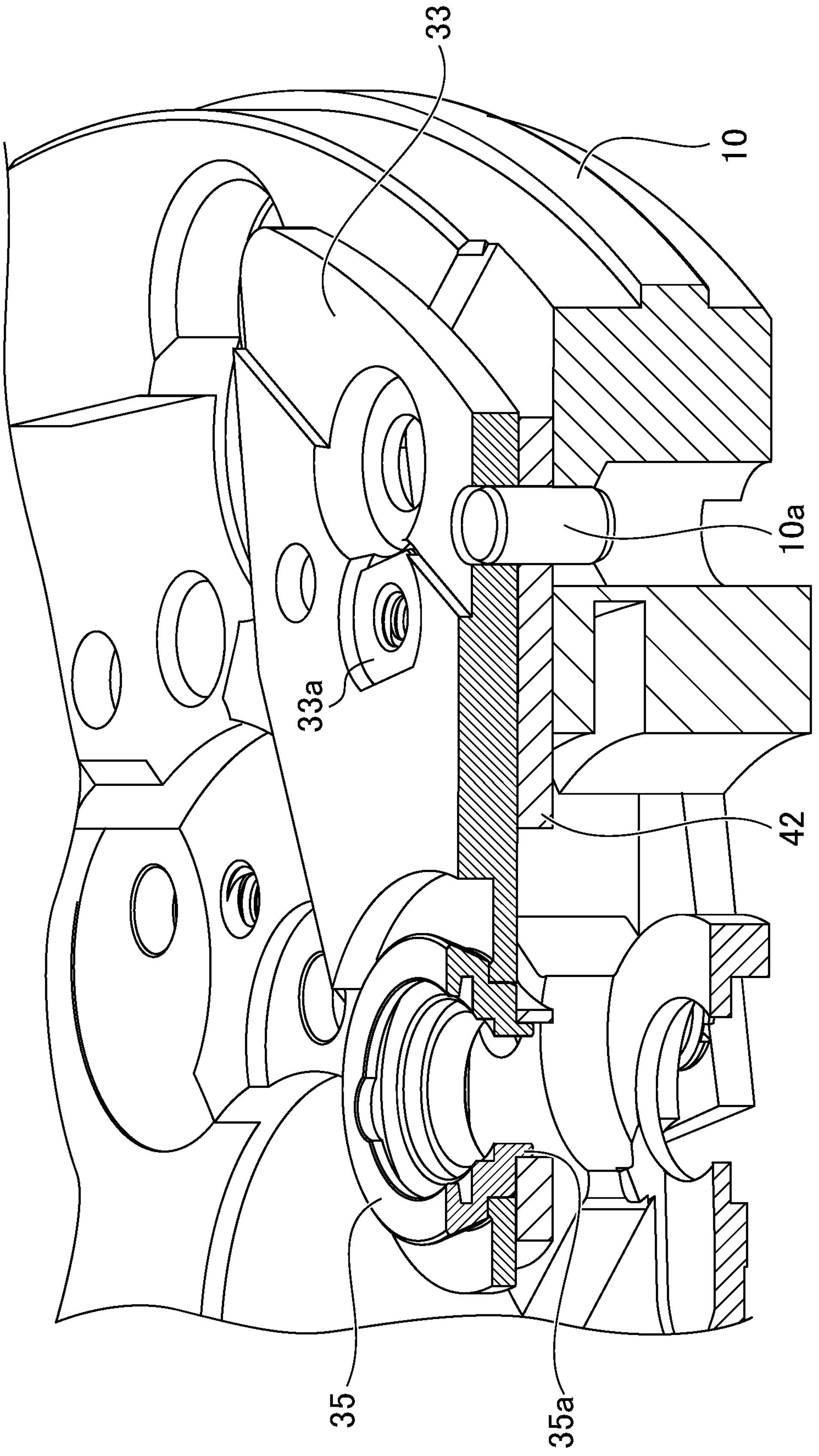
FIG. 4 is a view for illustrating cross sections of a support member and a soft magnetic core, and their surroundings in the embodiment.
Figure 5:
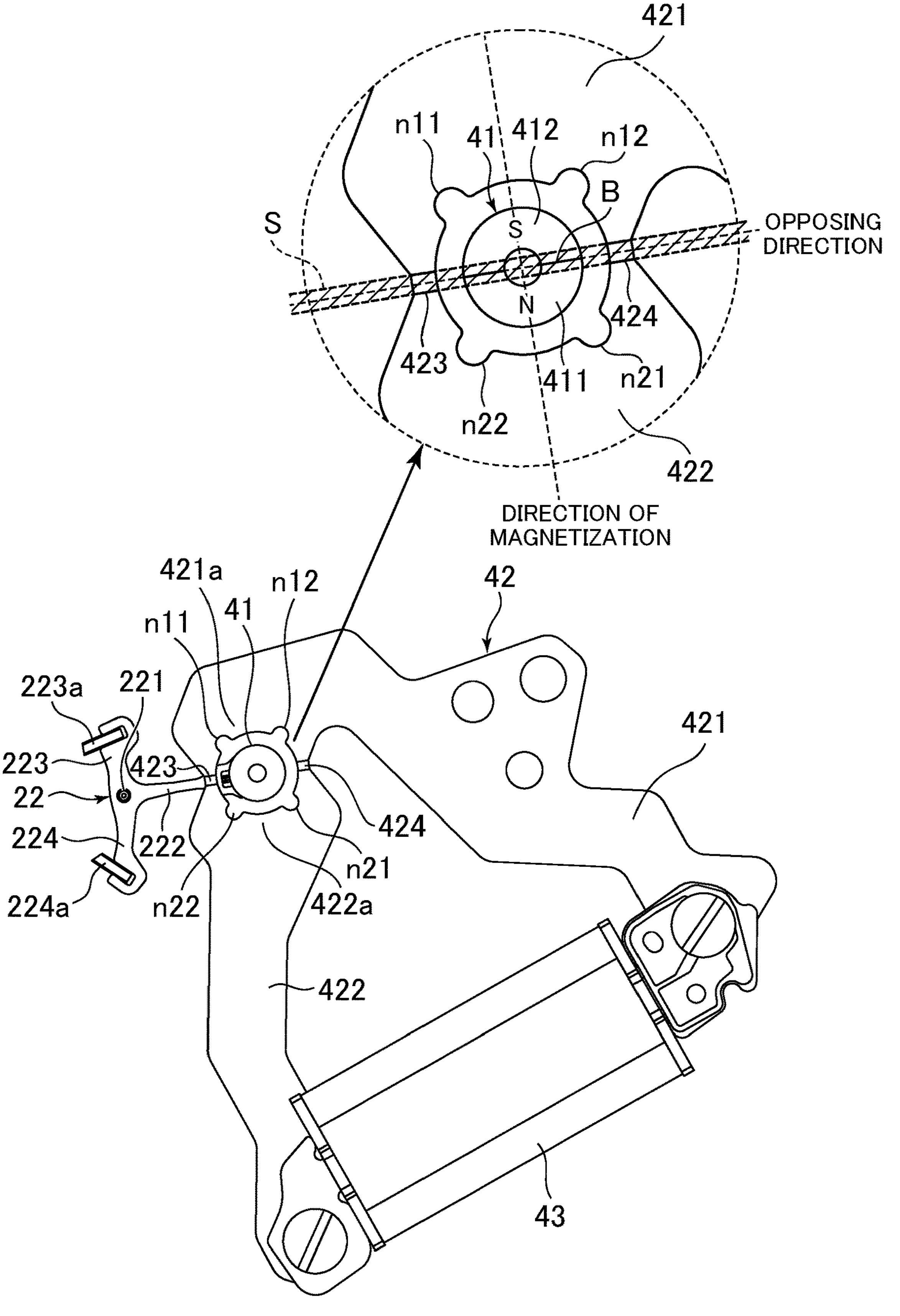
FIG. 5 is a plan view for illustrating the soft magnetic core and its surroundings in the embodiment, and an enlarged plan view for illustrating a part thereof in an enlarged manner.
Figure 6:
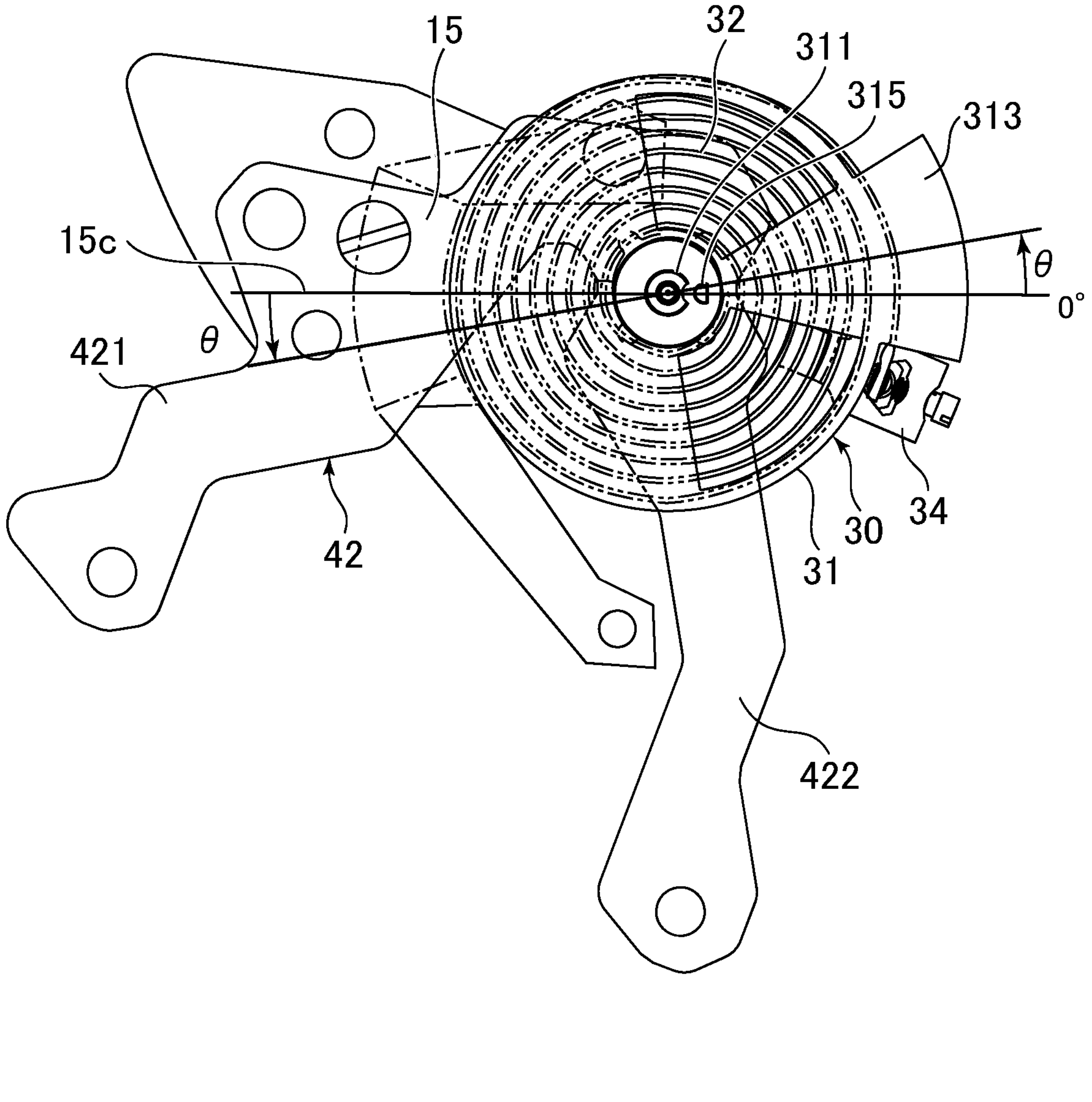
FIG. 6 is a plan view for illustrating the speed governing mechanism and its surroundings in the embodiment.
Figure 7:
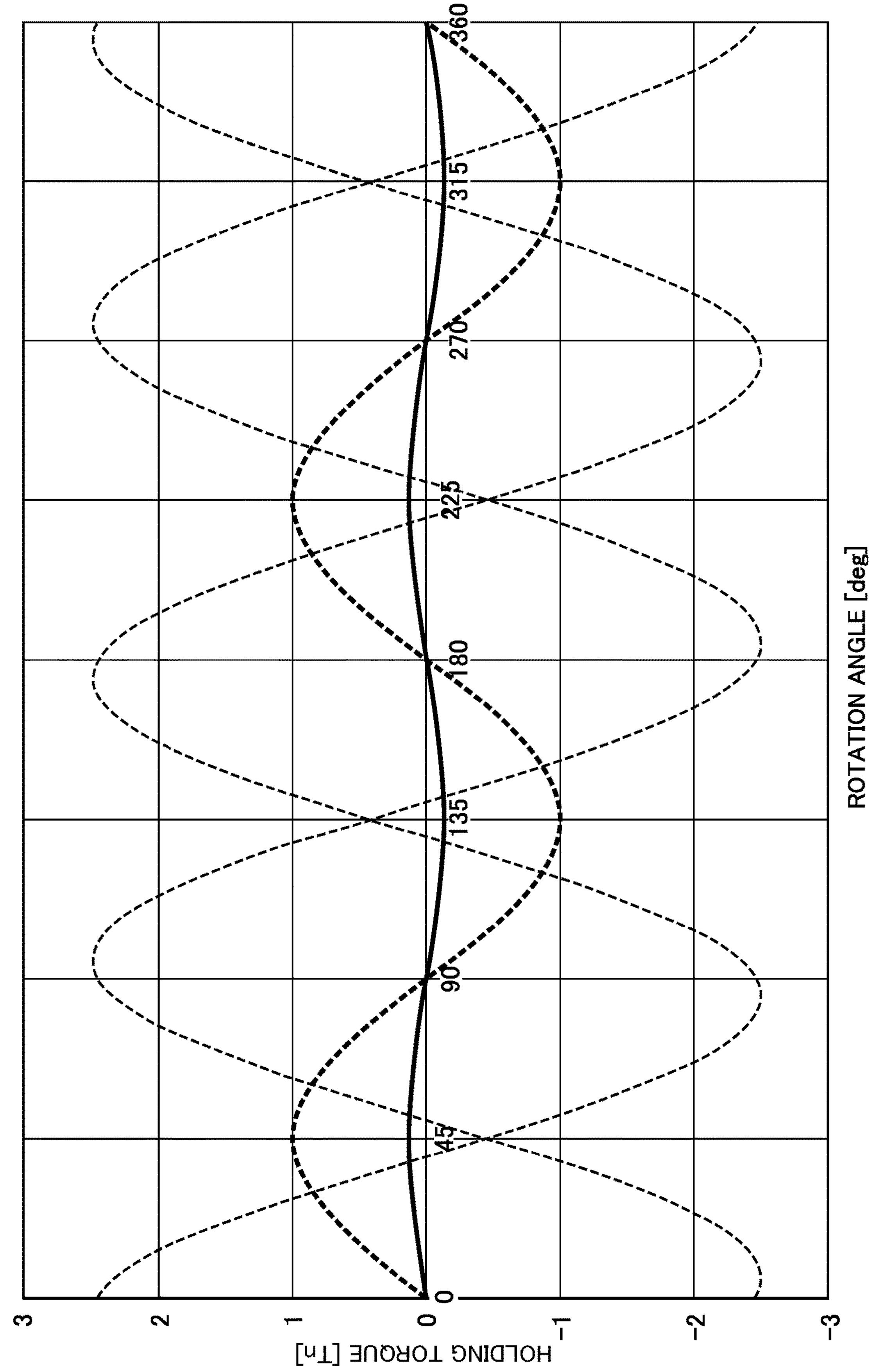
FIG. 7 is a graph for showing holding torque of a permanent magnet in the embodiment.
Figure 8:
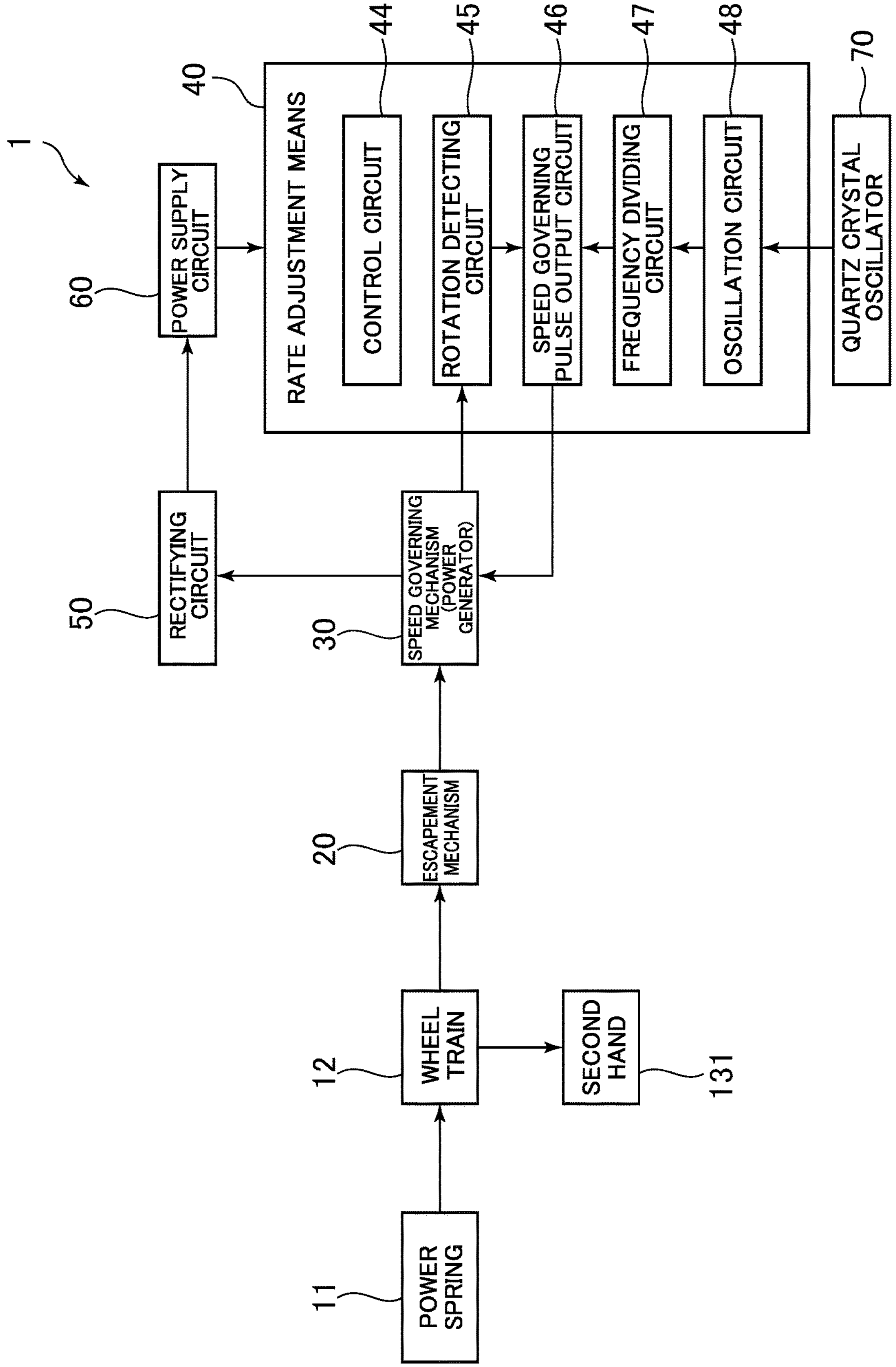
FIG. 8 is a block diagram for illustrating an overall configuration of a mechanical timepiece according to the embodiment.

FIG. 4 is a view for illustrating cross sections of a support member and a soft magnetic core, and their surroundings in this embodiment. FIG. 5 is a plan view for illustrating the soft magnetic core and its surroundings in this embodiment, and an enlarged plan view for illustrating a part thereof in an enlarged manner. FIG. 6 is a plan view for illustrating the speed governing mechanism and its surroundings in this embodiment. FIG. 7 is a graph for showing holding torque of a permanent magnet in this embodiment. FIG. 8 is a block diagram for illustrating an overall configuration of the mechanical timepiece according to this embodiment. FIG. 5 shows a state in which the mechanical timepiece 1 is viewed from its back side, and FIG. 6 shows a state in which the mechanical timepiece 1 is viewed from its front side. The front side refers to a side on which a user can visually recognize hands and a dial in the thickness direction of the mechanical timepiece 1.

In this embodiment, in each view excluding FIG. 6, a counterclockwise direction of each of a balance wheel 31 and a permanent magnet 41 is defined as a forward direction, and a clockwise direction thereof is defined as a reverse direction.

The mechanical timepiece 1 is a timepiece which uses a power spring 11 as a power source, and uses an escapement mechanism 20 and a speed governing mechanism 30 to control a motion of the power spring 11 and also drive hands. The mechanical timepiece 1 is formed by accommodating, into an exterior case, a main plate 10 to which each mechanism for driving the hands is incorporated. In this embodiment, illustration of the exterior case is omitted. Further, illustration of a crown to be arranged on a side surface of the exterior case is also omitted. The crown is mounted to an end portion of a winding stem 2 illustrated in FIG. 1.

Outline of Overall Configuration: Configuration of Drive Mechanism

An outline of a drive mechanism included in the mechanical timepiece 1 is described. In this embodiment, a mechanism including the power spring 11 serving as the power source, a wheel train 12, and a hand shaft 13 is referred to as "drive mechanism." In FIG. 2, only a second hand 131 among the hands is illustrated. The drive mechanism illustrated in FIG. 2 is merely an example, and the present invention is not limited thereto. The drive mechanism may include gears or the like other than the illustrated gears.

The power spring 11 is formed of a band-like member made of a metal, and is accommodated into a barrel 110 having a plurality of teeth formed on an outer periphery thereof. The barrel 110 has a disc shape, and has a cavity formed therein for accommodating the power spring 11. The power spring 11 has its inner end fixed to a barrel arbor (not shown) serving as a rotary shaft provided at the center of the barrel 110, and has its outer end fixed to an inner side surface of the barrel 110. When the crown is rotated through the operation of the user, the winding stem 2 is rotated. Along with the rotation of the winding stem 2, the power spring 11 is wound up. The wound power spring 11 is unwound due to its elastic force. The barrel 110 is rotated along with the operation of the power spring 11 at this time.

The wheel train 12 at least includes a center wheel and pinion 122, a third wheel and pinion 123, and a fourth wheel and pinion 124. The center wheel and pinion 122 includes a pinion for meshing with the plurality of teeth formed on the barrel 110 functioning as a mainwheel, a rotary shaft, and a plurality of teeth. The center wheel and pinion 122 transmits the rotation of the barrel 110 to the third wheel and pinion 123. The rotary shaft of the center wheel and pinion 122 is a hand shaft of a minute hand (not shown). The third wheel and pinion 123 includes a pinion for meshing with the plurality of teeth of the center wheel and pinion 122, a rotary shaft, and a plurality of teeth. The third wheel and pinion 123 transmits the rotation of the center wheel and pinion 122 to the fourth wheel and pinion 124. The fourth wheel and pinion 124 includes a pinion meshing with the plurality of teeth of the third wheel and pinion 123, a rotary shaft, and a plurality of teeth. The fourth wheel and pinion 124 transmits the rotation of the third wheel and pinion 123 to the escapement mechanism 20. As illustrated in FIG. 2, the rotary shaft of the fourth wheel and pinion 124 is the hand shaft 13 of the second hand 131.

Outline of Overall Configuration: Outline of Configurations of Escapement Mechanism 20 and Speed Governing Mechanism 30, and Operations Thereof Next, the escapement mechanism 20 and the speed governing mechanism 30 are described. The motive power from the power spring 11 is transmitted via the wheel train 12 to the escapement mechanism 20 and the speed governing mechanism 30. The escapement mechanism 20 includes an escape wheel and pinion 21 and a pallet fork 22. The speed governing mechanism 30 includes a balance wheel 31 and a hairspring 32. The speed governing mechanism 30 is sometimes referred to as "balance with hairspring."

The escape wheel and pinion 21 is a component for meshing with the pallet fork 22 so as to receive, from the pallet fork 22, rhythm kept by the speed governing mechanism 30, thereby converting the rhythm into a regular reciprocating motion. The escape wheel and pinion 21 includes a pinion for meshing with the plurality of teeth of the fourth wheel and pinion 124, a rotary shaft, and a plurality of teeth. As illustrated in FIG. 2, the plurality of teeth of the escape wheel and pinion 21 are formed at intervals wider in a circumferential direction than intervals of the teeth of each gear of the wheel train 12.

The pallet fork 22 uses a pallet fork staff 221 illustrated in FIG. 5 as a rotary shaft so as to perform a forward/reverse rotational motion. The pallet fork 22 includes a lever portion 222. The lever portion 222 extends from the pallet fork staff 221 toward a center of the balance wheel 31 (balance staff 311), and collides with an impulse jewel 315 (see FIG. 6) which rotates together with the balance staff 311. The impulse jewel 315 is fixed to a disc-shaped part of the balance staff 311, which has a predetermined width in a radial direction. FIG. 6 shows a state in which the balance wheel 31 is rotated by θ from a position of a rotation angle of 0°, and a position of the impulse jewel 315 under this state.

Further, the pallet fork 22 includes a first arm portion 223, and a second arm portion 224 extending in a direction opposite to the first arm portion 223. An entry pallet 223*a* for colliding with the plurality of teeth of the escape wheel and pinion 21 is mounted to the first arm portion 223, and an exit pallet 224*a* for colliding with the plurality of teeth of the escape wheel and pinion 21 is mounted to the second arm portion 224. It is preferred that each of the entry pallet 223*a* and the exit pallet 224*a* be, for example, a stone such as a sapphire.

The balance wheel 31 performs a forward/reverse rotational motion about the balance staff 311 serving as a rotation center, through use of the motive power transmitted by the wheel train 12. In the following description, in some cases, in the forward/reverse rotational motion, a forward direction motion is referred to as "rotation in the forward direction," and a reverse direction motion is referred to as "rotation in the reverse direction." Details of the configuration of the balance wheel 31 are described later. The balance staff 311 is supported by a bearing structure 330 (see FIG. 3 and FIG. 33, not shown in FIG. 4) to be described later, which is fixed with respect to a support member 33 through intermediation of a frame member 35 illustrated in FIG. 3 and FIG. 4.

The hairspring 32 performs an expansion/contraction motion (elastic deformation) so as to cause the balance wheel 31 to perform the forward/reverse rotational motion. The hairspring 32 has a spiral shape, and has an inner end fixed with respect to the balance staff 311 and an outer end fixed with respect to a stud support 34. The stud support 34 is fixed with respect to the main plate 10 together with the support member 33. Further, as illustrated in FIG. 3, the stud support 34 is provided so as to be sandwiched between the support member 33 and the frame member 35.

The escape wheel and pinion 21 is rotated along with the rotation of the fourth wheel and pinion 124. When the escape wheel and pinion 21 is rotated, the escape wheel and pinion 21 collides with the entry pallet 223*a* of the pallet fork 22 so that the pallet fork 22 is rotated about the pallet fork staff 221 serving as a center. The lever portion 222 of the rotated pallet fork 22 collides with the impulse jewel 315 fixed to the balance staff 311, thereby causing the balance wheel 31 to rotate. When the balance wheel 31 is rotated, the exit pallet 224*a* of the pallet fork 22 collides with the escape wheel and pinion 21 so that the escape wheel and pinion 21 is stopped. When the balance wheel 31 is rotated in the reverse direction due to a restoring force of the hairspring 32, the entry pallet 223*a* of the pallet fork 22 is released so that the escape wheel and pinion 21 is rotated again. As described later, the balance wheel 31 is designed so as to perform an operation of one cycle in two seconds, and hence the escape wheel and pinion 21 performs an operation of one step in one second.

As described above, the speed governing mechanism 30 causes the balance wheel 31 to repeatedly perform the forward/reverse rotational motion (reciprocating motion) in a certain cycle, through use of the expansion/contraction motion of the hairspring 32. The escapement mechanism 20 continuously applies, to the balance wheel 31, a force for performing the reciprocating motion. With such a configuration and operation, hands such as the second hand 131 are driven.

Outline of Overall Configuration: Configuration of Rate Adjustment Means 40

Next, a configuration of rate adjustment means 40 is described. The mechanical timepiece 1 according to this embodiment includes the rate adjustment means 40 in addition to the drive mechanism, the escapement mechanism 20, and the speed governing mechanism 30.

The rate adjustment means 40 includes a permanent magnet 41, a soft magnetic core 42 (sometimes referred to as "stator"), a coil 43, and various circuits (see FIG. 8). The rate adjustment means 40 performs rate adjustment based on a detection signal to be detected based on the forward/reverse rotational motion of the permanent magnet 41, and on a normal frequency of a quartz crystal oscillator 70 (see FIG. 8) serving as a reference signal source. In this embodiment, the quartz crystal oscillator 70 is used as a reference signal source for achieving a high frequency accuracy, but the present invention is not limited thereto. For example, a CR oscillator formed of a capacitor and a resistor may be used.

Although not shown, it is preferred that the coil 43 be arranged so as to overlap, in plan view, a casing frame provided on the inner side of the exterior case. As another example, it is preferred that a cutout be formed in a part of the casing frame in the circumferential direction, and the coil 43 be arranged inside of this cutout.

The permanent magnet 41 is a disc-shaped rotary member magnetized into two poles, and is magnetized into an N pole and an S pole in the radial direction. That is, the permanent magnet 41 is a magnet including an N-pole portion 411 and an S-pole portion 412.

The permanent magnet 41 is mounted to the balance staff 311 serving as the rotary shaft of the balance wheel 31 (see FIG. 10 to be referred to later), and is provided so as to perform a forward/reverse rotational motion along with the forward/reverse rotational motion of the balance wheel 31 (balance staff 311). That is, the permanent magnet 41 performs the forward/reverse rotational motion together with the balance wheel 31 so that its rotation angle becomes the same as the rotation angle of the balance wheel 31. It is preferred that the permanent magnet 41 be fixed with respect to the balance staff 311 through press fitting, adhesion, or the like.

It is preferred that the permanent magnet 41 be an isotropic magnet having an axis of easy magnetization directed in a random direction. It is preferred that the permanent magnet 41 be magnetized by being applied with a magnetic field by a Helmholtz coil or the like under a state in which the permanent magnet 41 is mounted to the balance staff 311. When such a magnetization method is adopted, a direction of magnetization of the permanent magnet 41 can be accurately adjusted.

The soft magnetic core 42 is made of a soft magnetic material. As illustrated in FIG. 5, the soft magnetic core 42 includes a first magnetic portion 421 and a second magnetic portion 422. The first magnetic portion 421 includes a first end portion 421*a* to be provided along an outer periphery of the permanent magnet 41. The second magnetic portion 422 includes a second end portion 422*a* to be provided along the outer periphery of the permanent magnet 41. The soft magnetic core 42 forms a magnetic circuit together with the coil 43. The first end portion 421*a* and the second end portion 422*a* are both shaped so as to have an inner peripheral surface having a half arc shape, and are arranged so as to be opposed to each other through intermediation of the permanent magnet 41.

In this embodiment, in the permanent magnet 41, under a state in which the hairspring 32 is brought to a neutral position of elastic deformation, the N-pole portion 411 is arranged on the second magnetic portion 422 side, and the S-pole portion 412 is arranged on the first magnetic portion 421 side (see the enlarged view of FIG. 5). The arrangement of the N-pole portion 411 and the S-pole portion 412 may be reversed, but, in this case, the winding direction of the coil 43 is required to be opposite to that in this embodiment.

Further, as illustrated in FIG. 3 and FIG. 4, the soft magnetic core 42 is fixed with respect to the support member 33 through use of a pipe 33*a* and a screw 33*b* which serve as a fixing tool. With such a configuration, the soft magnetic core 42 is mounted to the main plate 10 together with the support member 33. Further, the support member 33 and the soft magnetic core 42 are positioned by the frame member 35 and a positioning pin 10*a* provided to the main plate 10.

Further, as illustrated in FIG. 4, the frame member 35 includes an annular protruding portion 35*a*. The protruding portion 35*a* is fitted to the inner peripheral surfaces of the first end portion 421*a* and the second end portion 422*a* of the soft magnetic core 42. Further, the soft magnetic core 42 is positioned at two locations, specifically, the frame member 35 and the positioning pin 10*a*. With such a configuration, the soft magnetic core 42 can be mounted to the main plate 10 with a high positional accuracy. As a result, the positional accuracy of the soft magnetic core 42 with respect to the permanent magnet 41 can be improved. In this case, the soft magnetic core 42 is made of a magnetic material, and hence there is a possibility that a magnetic characteristic is degraded when a strong stress is applied thereto. For example, when the soft magnetic core 42 is directly fastened to the main plate 10 with a screw or the like, there is a possibility that the magnetic characteristic is degraded. In view of the above, in this embodiment, the positioning is performed through use of clearance fit as the fitting of the positioning pin 10*a* and the frame member 35, and the pipe 33*a* and the screw 33*b* are used so that the soft magnetic core 42 is fixed with respect to the support member 33. In this manner, both of the positioning and the fixing of the soft magnetic core 42 are achieved. When such a configuration is adopted, the positional accuracy of the soft magnetic core 42 can be improved without degrading the magnetic characteristic of the soft magnetic core 42. Further, in this embodiment, the soft magnetic core 42 is arranged so as to be fixed with respect to the support member 33, but there may be employed a configuration in which the permanent magnet 41 corresponding to the soft magnetic core 42 is arranged between the balance wheel 31 and the main plate 10, and the soft magnetic core 42 is directly fastened to the main plate 10 with a screw or the like.

It is desired that, among the components to be mounted to the main plate 10, components present at positions close to the permanent magnet 41 excluding the soft magnetic core 42, such as the support member 33, the stud support 34, the frame member 35, the hairspring 32, and the balance wheel 31, be made of a non-magnetic material so as not to affect the forward/reverse rotational motion of the speed governing mechanism 30 or a counter-electromotive voltage to be caused by the coil 43 to be described later.

Further, as illustrated in FIG. 5, the soft magnetic core 42 includes a first welding portion 423 and a second welding portion 424. The first welding portion 423 is a first separating portion for separating the magnetic coupling between the first end portion 421*a* and the second end portion 422*a*. The second welding portion 424 is a second separating portion for separating the magnetic coupling between the first end portion 421*a* and the second end portion 422*a*. The second separating portion is arranged so as to be opposed to the first welding portion 423 through intermediation of the permanent magnet 41. It is preferred that the first welding portion 423 and the second welding portion 424 be formed inside a gap for physically separating the first end portion 421*a* and the second end portion 422*a* from each other.

The permanent magnet 41 is brought to a magnetically balanced position when the permanent magnet 41 is brought into a state of being positioned so that the direction of magnetization is orthogonal to an opposing direction of the first welding portion 423 and the second welding portion 424. In this embodiment, the magnetically balanced position of the permanent magnet 41 is defined as a rotation angle of 0°. At this position, the holding torque of the permanent magnet 41 is almost 0. As illustrated in FIG. 5, the opposing direction of the first welding portion 423 and the second welding portion 424 refers to a direction in which a straight line connecting between the first welding portion 423 and the second welding portion 424 extends.

When the permanent magnet 41 is brought to a position at which its rotation angle is shifted by 90° from 0° in the forward direction, the direction of magnetization becomes the same as the opposing direction of the first welding portion 423 and the second welding portion 424. At this position, the holding torque of the permanent magnet 41 is almost 0. The thick broken-line graph of FIG. 7 indicates the holding torque of the permanent magnet 41 at the time when the first welding portion 423 and the second welding portion 424 are formed.

As illustrated in FIG. 5, in this embodiment, notches are formed in the inner peripheral surfaces of the first end portion 421*a* and the second end portion 422*a* of the soft magnetic core 42. Specifically, a notch n11 and a notch n12 are formed in the first end portion 421*a*. Further, a notch n21 is formed in the second end portion 422*a* so as to be opposed to the notch n11 through intermediation of the permanent magnet 41, and a notch n22 is formed in the second end portion 422*a* so as to be opposed to the notch n12 through intermediation of the permanent magnet 41. When the notches are formed as described above, the magnetic influence to be received by the permanent magnet 41 from the soft magnetic core 42 is reduced. Accordingly, the holding torque of the permanent magnet 41 can be reduced.

One broken-line graph of FIG. 7 indicates the holding torque of the permanent magnet 41 at the time when the notches n11 and n21 arranged so as to be opposed to each other are formed, and another broken-line graph of FIG. 7 indicates the holding torque of the permanent magnet 41 at the time when the notches n12 and n22 arranged so as to be opposed to each other are formed.

Further, the solid-line graph of FIG. 7 indicates combined holding torque obtained by combining the above-mentioned three broken-line graphs. That is, the solid-line graph of FIG. 7 indicates the holding torque of the permanent magnet 41 at the time when the first welding portion 423, the second welding portion 424, and the notches n11, n12, n21, and n22 are formed in the soft magnetic core 42. As shown in FIG. 7, in the configuration of this embodiment, the holding torques indicated by the respective broken-line graphs cancel each other out at the respective rotation angles, and the combined holding torque of the permanent magnet 41 takes a value close to 0 at any rotation angle. Thus, even when the hairspring 32 made of a material having a low Young's modulus as to be described later is used, the permanent magnet 41 can be smoothly rotated. The number, the arrangement, and the shape of the notches illustrated in FIG. 5 are merely examples, and the present invention is not limited thereto. It is preferred that, in the first end portion 421*a* and the second end portion 422*a*, at least a pair of notches which are opposed to each other be formed so as to reduce the holding torque of the permanent magnet 41.

Outline of Overall Configuration: Outline of Rate Adjustment

As illustrated in FIG. 8, the mechanical timepiece 1 includes, in addition to the above-mentioned power spring 11, wheel train 12, escapement mechanism 20, speed governing mechanism 30, and rate adjustment means 40, a rectifying circuit 50, a power supply circuit 60, and the quartz crystal oscillator 70. Further, as illustrated in FIG. 8, the rate adjustment means 40 includes, in addition to the above-mentioned permanent magnet 41, soft magnetic core 42, and coil 43, a control circuit 44, a rotation detecting circuit 45, a speed governing pulse output circuit 46, a frequency dividing circuit 47, and an oscillation circuit 48. The configuration of the rate adjustment means 40 illustrated in FIG. 8 is merely an example. The rate adjustment means 40 is not required to independently include the circuits illustrated in FIG. 8, and the rate adjustment means 40 is only required to be capable of implementing the functions described below.

The control circuit 44 is a circuit for controlling operations of the respective circuits included in the rate adjustment means 40.

The oscillation circuit 48 outputs a predetermined oscillation signal based on the frequency of the quartz crystal oscillator 70. The frequency of the quartz crystal oscillator 70 is 32,768 [Hz]. The frequency dividing circuit 47 divides the frequency of the oscillation signal output from the oscillation circuit 48. The frequency dividing circuit 47 divides the frequency of the oscillation signal which is based on the quartz crystal oscillator 70 so as to generate a reference signal OS output roughly at every 1,000 [ms]. However, the present invention is not limited thereto, and the reference signal OS may be output at every 2,000 [ms] or every 3,000 [ms]. That is, the reference signal OS is only required to be output at every right seconds. Moreover, the present invention is not limited thereto, and the reference signal OS is only required to correspond to the cycle of the speed governing mechanism 30.

The rotation detecting circuit 45 detects a detection signal based on a voltage waveform caused in the coil 43 due to the motion of the permanent magnet 41. The speed governing pulse output circuit 46 outputs a speed governing pulse based on the reference signal generated by the frequency dividing circuit 47 and on the detection signal detected by the rotation detecting circuit 45. Specifically, a detection timing of the detection signal detected by the rotation detecting circuit 45 and an output timing of the reference signal of about 1,000 [Hz] are compared with each other, and when there is a time lag between those timings, the speed governing pulse output circuit 46 outputs the speed governing pulse so that the cycle in which the detection signal is detected comes close to 1,000 [ms] (=one second).

The output of the speed governing pulse is performed through energization of the coil 43. Accordingly, it is preferred that, when the cycle in which the detection signal is detected is faster than the reference signal, the speed governing pulse output circuit 46 energize the coil 43 so that a torque acts in a direction of slowing down the movement of the permanent magnet 41, and, when the cycle in which the detection signal is detected is slower than the reference signal, the speed governing pulse output circuit 46 energize the coil 43 so that a torque acts in a direction of accelerating the movement of the permanent magnet 41. Details of rate adjustment control including the output timing of the speed governing pulse are described later.

Outline of Overall Configuration: Speed Governing Mechanism 30 Serving as Power Generator Further, the mechanical timepiece 1 has a power generating function using a principle of electromagnetic induction. In this embodiment, the speed governing mechanism 30 functions as a part of the power generator. Specifically, the permanent magnet 41 performs the forward/reverse rotational motion along with the forward/reverse rotational motion of the balance wheel 31, and electric power is generated by a current caused in the coil 43 based on a change in a magnetic field caused by the motion of the permanent magnet 41. The power supply circuit 60 is activated through use of the electric power extracted by such an operating principle. When the power supply circuit 60 is activated, the control circuit 44 included in the rate adjustment means 40 can be driven. Because such a configuration is adopted, in this embodiment, the control circuit 44 can be driven without separately providing a power supply such as a battery.

The rectifying circuit 50 rectifies the current caused in the coil 43 due to the motion of the permanent magnet 41 accompanying the forward direction motion and the reverse direction motion in the forward/reverse rotational motion of the balance wheel of the speed governing mechanism 30. The power supply circuit 60 is, for example, a circuit including a capacitor, and stores the electric power for driving the control circuit 44 based on the current rectified by the rectifying circuit 50.

Outline of Overall Configuration: Bearing Structure of Balance Staff

Figure 33:
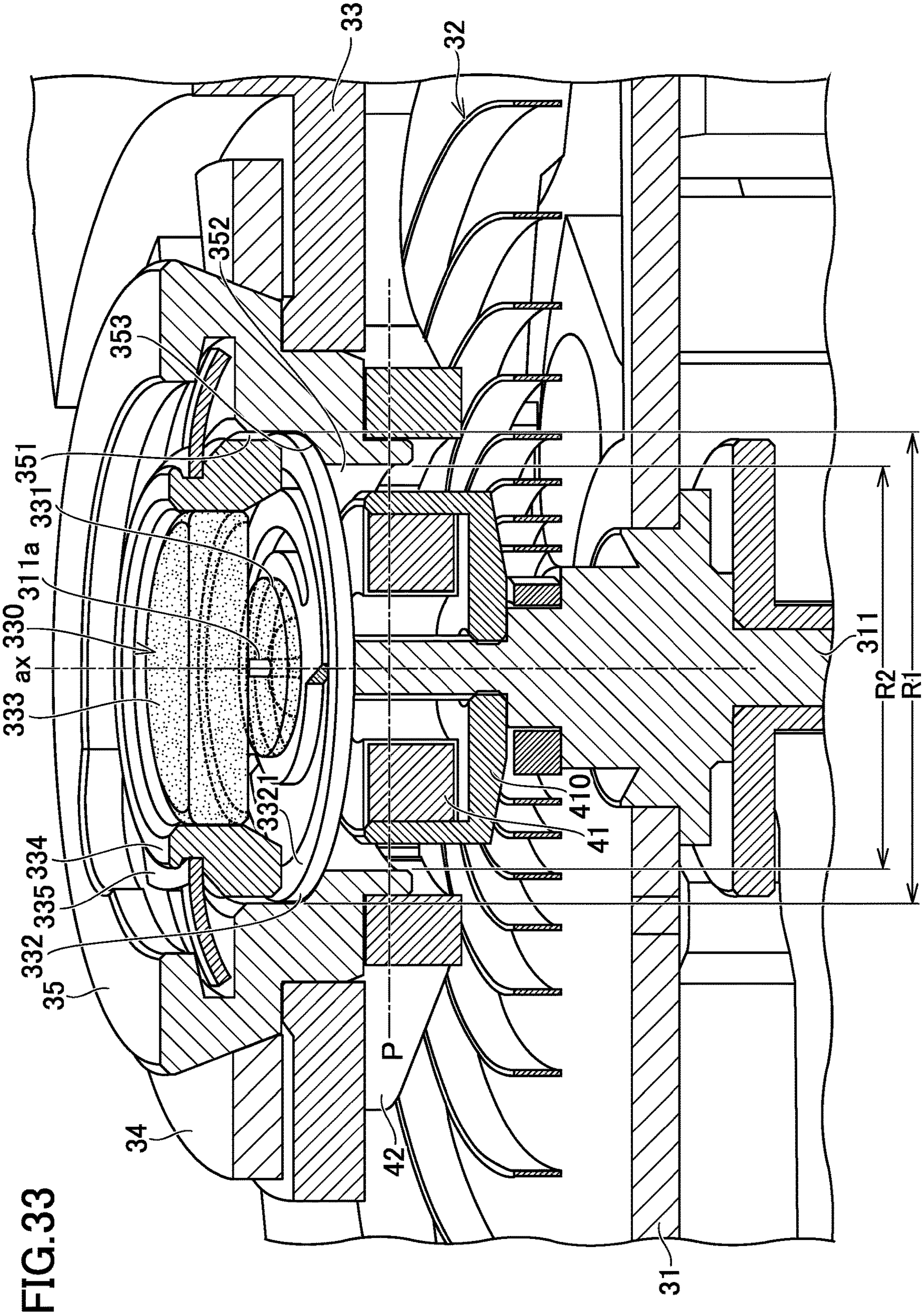
FIG. 33 is a cross-sectional view for illustrating a bearing structure and its surroundings in the embodiment.
Figure 34:
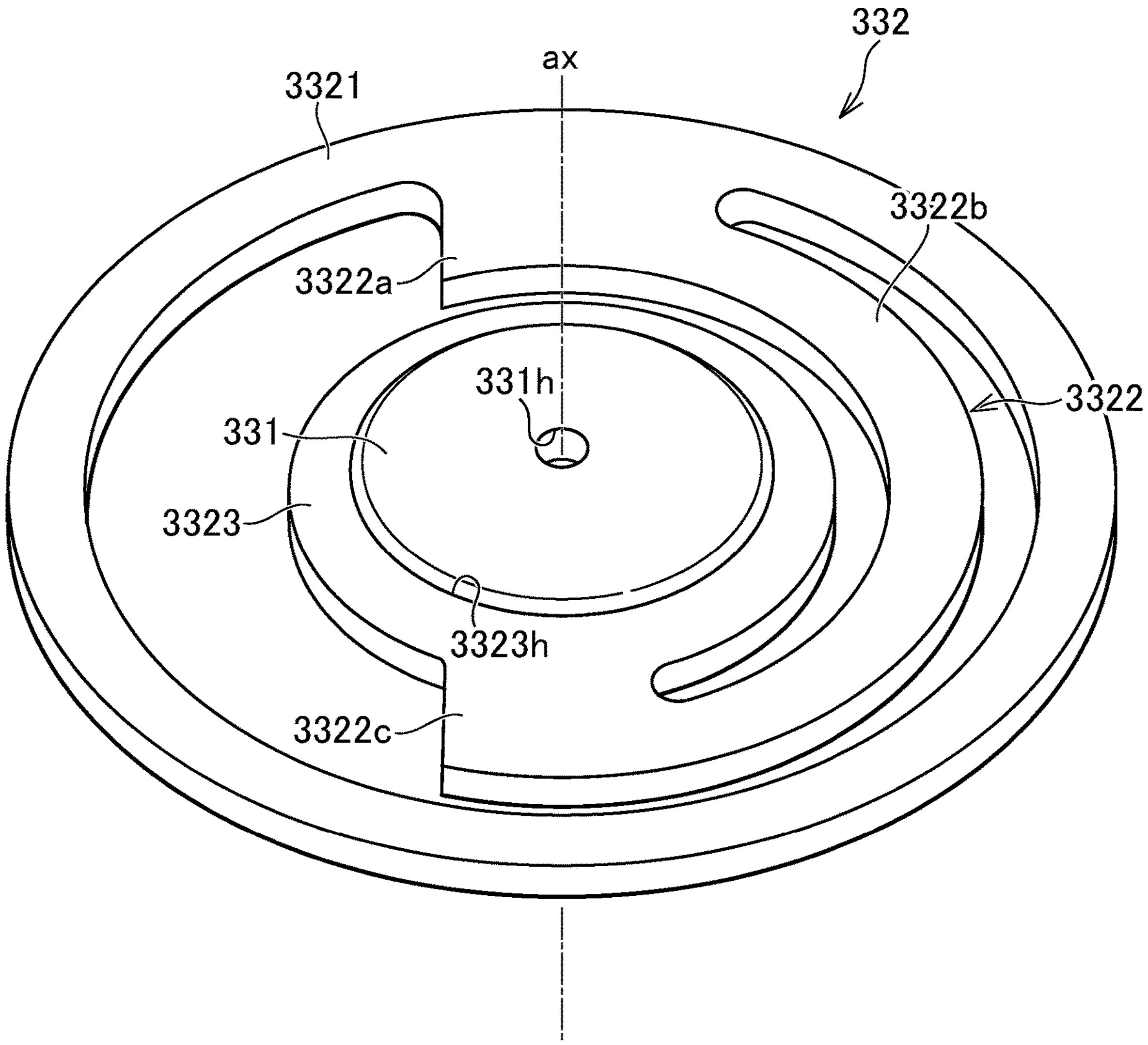
FIG. 34 is a plan view for illustrating an elastic deformation member.

Now, with reference to FIG. 33 and FIG. 34, the bearing structure 330 of the balance staff 311 in this embodiment is described. FIG. 33 is a cross-sectional view for illustrating the bearing structure and its surroundings in this embodiment. FIG. 34 is a plan view for illustrating an elastic deformation member.

The bearing structure 330 supports an end portion of the balance staff (rotary shaft) 311 on a side closer to the permanent magnet 41. As illustrated in FIG. 33, the balance staff 311 includes a pivot portion 311*a* at its distal end. The pivot portion 311*a* is a part of the balance staff 311 having a diameter smaller than those of other parts. As illustrated in FIG. 33, the bearing structure 330 supports the pivot portion 311*a* of the balance staff 311.

The bearing structure 330 is a structure at least including a hole stone 331, an elastic deformation member 332, a cap jewel 333, a holding member 334 for holding the cap jewel 333, and a cap jewel spring 335. The bearing structure 330 is accommodated in the frame member 35 serving as an accommodating member. As illustrated in FIG. 33, the holding member 334 is fixed with respect to the above-mentioned frame member 35. That is, the bearing structure 330 is fixed with respect to the support member 33 through intermediation of the frame member 35.

The cap jewel spring 335 is provided so that its inner edge holds the holding member 334, and a part of its outer edge is caught by the frame member 35. Further, the outer edge of the cap jewel spring 335 is elastically in contact with the frame member 35. The cap jewel spring 335 is one of members contributing to impact absorption in an axial direction of the balance staff 311. It is preferred that the holding member 334 and the cap jewel spring 335 be made of a non-magnetic material. For example, it is preferred that the holding member 334 be made of brass which is an alloy of copper and zinc.

The hole stone 331 is fitted into an opening 3323*h* to be described later, which is formed in the elastic deformation member 332, so as to be fixed with respect to the elastic deformation member 332. Further, at a center portion of the hole stone 331, a shaft hole 331*h* into which the pivot portion 311*a* of the balance staff 311 is to be inserted is formed. When the pivot portion 311*a* is inserted into the shaft hole 331*h*, the pivot portion 311*a* is positioned in the radial direction by the hole stone 331.

The cap jewel 333 is brought into abutment against a distal end of the pivot portion 311*a*. The pivot portion 311*a* is positioned in the up-down direction by the cap jewel 333.

It is preferred that the hole stone 331 and the cap jewel 333 be jewels having good slidability with respect to the pivot portion 311*a* and having advantage in rotational operation and wearing. Specifically, it is preferred that each of the hole stone 331 and the cap jewel 333 be a ruby, a sapphire, or the like. However, the present invention is not limited thereto, and each of the hole stone 331 and the cap jewel 333 is only required to be made of a non-magnetic material.

In this case, when an external impact or the like is applied to the mechanical timepiece 1, there is a fear in that the balance staff 311 is misaligned in the up-down direction or the radial direction. In this case, the up-down direction refers to a direction in which an axis "ax" of the balance staff 311 illustrated in FIG. 33 extends (hereinafter also referred to as "axial direction"), and the radial direction refers to a direction orthogonal to the direction in which the axis "ax" extends. When the balance staff 311 is misaligned, the rotation of the balance wheel 31 and the permanent magnet 41 is disturbed, and thus there is a fear in that the rate accuracy is reduced or the power generation efficiency is reduced. In view of the above, in this embodiment, there is adopted a configuration in which the bearing structure 330 includes the elastic deformation member 332.

As illustrated in FIG. 34, the elastic deformation member 332 has a spiral shape including an annular outer edge portion 3321, an elastic deformation portion 3322, and an annular holding portion 3323. The outer edge portion 3321 forms an outer shape of the elastic deformation member 332. The holding portion 3323 holds the hole stone 331.

As illustrated in FIG. 34, the elastic deformation portion 3322 has a shape including a first connection portion 3322*a*, a half arc portion 3322*b*, and a second connection portion 3322*c*. The first connection portion 3322*a* extends to a radially inner side from a part of the outer edge portion 3321 in the circumferential direction. The half arc portion 3322*b* is connected to the outer edge portion 3321 through intermediation of the first connection portion 3322*a*, and extends along the outer edge portion 3321. The second connection portion 3322*c* extends to the radially inner side at an end portion of the half arc portion 3322*b* on a side opposite to the first connection portion 3322*a*, and connects the half arc portion 3322*b* and the holding portion 3323 to each other. The outer edge portion 3321 is sandwiched between the frame member 35 and the holding member 334 so as to be fixed with respect to the frame member 35.

In this case, as illustrated in FIG. 33, the frame member 35 has a configuration including a first peripheral surface 351, a second peripheral surface 352, and a stepped portion 353. The first peripheral surface 351 surrounds the end portion of the balance staff 311. The second peripheral surface 352 is provided on a side closer to the balance wheel 31 with respect to the first peripheral surface 351, and has a diameter smaller than that of the first peripheral surface 351. The stepped portion 353 connects the first peripheral surface 351 and the second peripheral surface 352 to each other. The first peripheral surface 351 is a peripheral surface having a diameter R1 illustrated in FIG. 33, and the second peripheral surface 352 is a peripheral surface having a diameter R2 ($<$R1) illustrated in FIG. 33. The outer edge portion 3321 of the elastic deformation member 332 is sandwiched between the holding member 334 and the stepped portion 353 of the frame member 35 so as to be fixed.

When the balance staff 311 is displaced in the radial direction due to occurrence of an external impact or the like, the half arc portion 3322*b* is elastically deformed in the radial direction through use of the first connection portion 3322*a* as a fulcrum, and the holding portion 3323 is elastically deformed in the radial direction through use of the second connection portion 3322*c* as a fulcrum. In this case, "deformation" refers to movement of the balance staff 311 to a position deviated from a regular position.

Further, when the balance staff 311 is displaced in the axial direction due to application of an impact from the outside, the half arc portion 3322*b* is elastically deformed in the axial direction through use of the first connection portion 3322*a* as a fulcrum, and the holding portion 3323 is elastically deformed in the axial direction through use of the second connection portion 3322*c* as a fulcrum.

As described above, when a configuration in which the bearing structure 330 includes the elastic deformation portion 3322 is adopted, even in a case in which misalignment occurs in the radial direction or the axial direction, the balance staff 311 is maintained to a regular position due to the elastic force in the elastic deformation portion 3322. As a result, reduction of the rate accuracy and reduction of the power generation efficiency are suppressed.

Further, it is preferred that the elastic deformation portion 3322 be made of a non-magnetic material. The non-magnetic material is a material other than a ferromagnetic material, and is a material that is not affected by a magnetic field or is less affected by a magnetic field than in the case of the ferromagnetic material. Specifically, it is preferred that the elastic deformation portion 3322 be made of a metal material such as nickel phosphorus (NiP), titanium copper (TiCu), or a copper nickel alloy. It is preferred that the elastic deformation portion 3322 be formed through aging treatment (heat treatment). In this manner, the elastic force can be ensured, and a thin elastic deformation portion 3322 can be obtained. It is preferred that the outer edge portion 3321 and the holding portion 3323 also be made of a non-magnetic material similarly to the elastic deformation portion 3322. That is, it is preferred that the entire elastic deformation member 332 be made of a non-magnetic material.

As described above, when the elastic deformation member 332 (elastic deformation portion 3322), which is one of members arranged in the vicinity of the permanent magnet 41, is made of a non-magnetic material, the permanent magnet 41 can be prevented from receiving the magnetic influence. In this manner, the operation of the permanent magnet 41 is stabilized. As a result, reduction of the rate accuracy and reduction of the power generation efficiency are suppressed.

Further, when the elastic deformation member 332 and the holding member 334 are made of a non-magnetic material, the bearing structure 330 of the balance staff 311 can be arranged close to the permanent magnet 41. As a result, the mechanical timepiece 1 can be downsized in the thickness direction. Moreover, when the elastic deformation member 332 is made of a non-magnetic material, the size of the permanent magnet 41 can be increased. As a result, electric power to be obtained by the operation of the permanent magnet 41 can be increased, and the power generation performance can be improved.

Further, in this embodiment, as illustrated in FIG. 33, the diameter of the permanent magnet 41 is smaller than the smallest diameter (diameter R2) among the opening diameters of the frame member 35. That is, the frame member 35 has an opening capable of ensuring a space of a size sufficient for arranging the permanent magnet 41 at a position close to the bearing structure 330. The permanent magnet 41 is provided at a position passing through an imaginary plane P which is perpendicular to the axial direction "ax" of the balance staff 311 and passes through the frame member 35. In other words, at least parts of the permanent magnet 41 and the frame member 35 are provided at the same position in the axial direction "ax." FIG. 33 shows an example in which at least parts of the permanent magnet 41 and the second peripheral surface 352 of the frame member 35 are provided at the same position in the axial direction "ax." In the related art, a frame member having an opening slightly larger to some extent than the diameter of the balance staff has been used, but in such a configuration, there is a possibility that the balance staff interferes with the frame member along with an impact so that the end portion of the balance staff is damaged. In this embodiment, a configuration in which the frame member 35 has an opening having a diameter sufficiently larger than the diameter of the balance staff 311 is adopted, and thus the balance staff 311 does not interfere with the frame member 35 even when an impact is applied from the outside.

The shape of the elastic deformation member 332 illustrated in FIG. 33 and FIG. 34 is merely an example, and the present invention is not limited thereto. It is preferred that the elastic deformation member 332 (elastic deformation portion 3322) have a shape that can be elastically deformed in at least any of the radial direction or the axial direction of the balance staff 311 in accordance with the displacement of the balance staff 311.

Although not shown, an end portion of the balance staff 311 on a side farther from the permanent magnet 41 may also be supported by a structure equivalent to the bearing structure 330. In this manner, members for supporting one end and another end of the balance staff 311 can be common members, and the manufacturing cost can be reduced.

Figure 10:
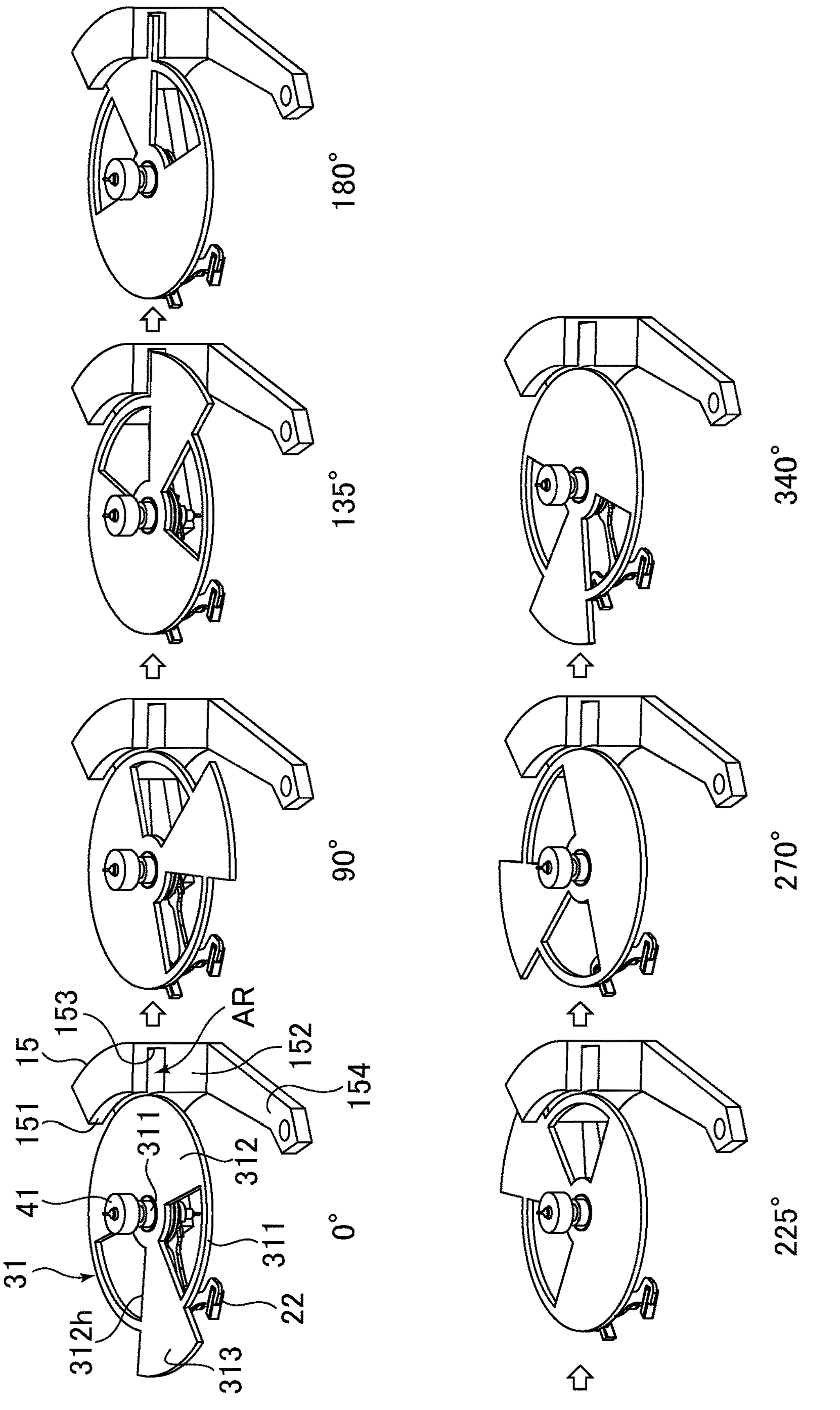
FIG. 10 is a perspective view for illustrating an operation of a balance wheel in the embodiment.

The permanent magnet 41 may be directly mounted to the balance staff 311 as illustrated in FIG. 10, or may be mounted to the balance staff 311 through intermediation of an accommodating member 410 for accommodating the permanent magnet 41 as illustrated in FIG. 33.

The bearing structure 330 of the balance staff 311 described with reference to FIG. 33 and FIG. 34 may be adopted in any of configurations of this embodiment, modification examples thereof, and Comparative Examples.

[Reducing Speed of Balance Wheel 31]

In this case, in the mechanical timepiece 1, as the speed of the movement of the balance wheel 31 is higher, that is, as the operation cycle of the balance wheel 31 is faster, each mechanism for transmitting the motive power (for example, the escape wheel and pinion 21 or the pallet fork 22) is liable to be worn, and the durability is reduced. Meanwhile, an amount of current to be caused in the coil 43 is proportional to an angular velocity of the permanent magnet 41, and hence, when the speed of the movement of the balance wheel 31 is low, a power generation amount required for driving the control circuit 44 cannot be obtained.

In view of the above, in this embodiment, a configuration capable of reducing the speed of the movement of the balance wheel 31 and also capable of ensuring the power generation amount is adopted.

Figure 12:
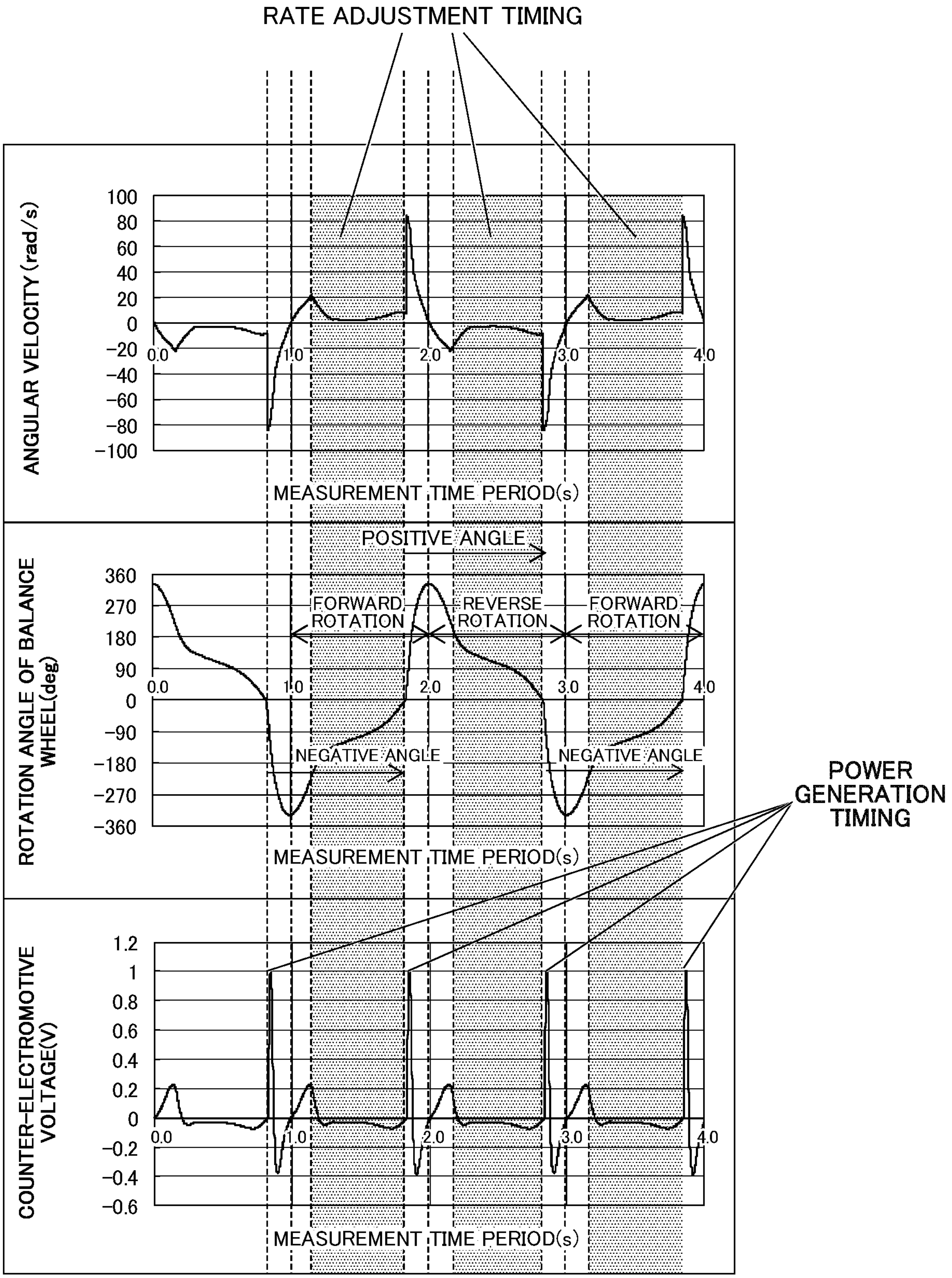
FIG. 12 shows graphs of a relationship between the operation of the balance wheel and a counter-electromotive voltage to be caused in a coil in the embodiment.

FIG. 10 is a perspective view for illustrating the operation of the balance wheel in this embodiment. In FIG. 10, the balance wheel 31, the pallet fork 22, the permanent magnet 41, and an air resistance member 15 to be described later are illustrated. In FIG. 10, reference symbols are omitted except for a view for illustrating the state of the rotation angle of 0°. FIG. 12 shows graphs of a relationship between the operation of the balance wheel and a counter-electromotive voltage to be caused in the coil in this embodiment. In the graph at the upper stage of FIG. 12, the vertical axis represents an angular velocity [rad/s] of the balance wheel 31, and the horizontal axis represents a measurement time period [s]. In the graph at the middle stage of FIG. 12, the vertical axis represents a rotation angle [deg] of the balance wheel 31, and the horizontal axis represents the measurement time period [s]. In the graph at the lower stage of FIG. 12, the vertical axis represents a counter-electromotive voltage [V] to be caused in the coil 43, and the horizontal axis represents the measurement time period [s]. Further, the graphs of FIG. 12 show an example in which the movement of the balance wheel 31 (permanent magnet 41) is measured for four seconds.

In this embodiment, the balance wheel 31 is designed so as to perform one back-and-forth operation in two seconds.

Thus, a resin material having a low Young's modulus is adopted as the material of the hairspring 32. In this manner, as compared to a case in which the hairspring 32 is made of a metal material, low speed oscillation of the balance wheel 31 can be achieved. When the low speed oscillation is to be achieved by a metal hairspring, it is required to reduce the cross-sectional area of the hairspring 32 to a level that is difficult to process, or to increase the hairspring length to a level that is difficult to handle.

In this embodiment, as the material of the hairspring 32, a resin having the Young's modulus of about 5 [GPa] is used. Specifically, as the material of the hairspring 32, polyester is used. It is preferred that the hairspring 32 made of a resin material be manufactured by, for example, laser processing. A general hairspring made of a metal has a Young's modulus of about 200 [GPa]. The Young's modulus given here is merely an example, and it is preferred that the Young's modulus of the hairspring 32 be 20 [GPa] or less. That is, it is preferred that the Young's modulus of the hairspring 32 be 1/10 or less of the Young's modulus of the hairspring made of a metal. It is more preferred that the Young's modulus of the hairspring 32 be 10 [GPa] or less. That is, it is preferred that the Young's modulus of the hairspring 32 be 1/20 or less of the Young's modulus of the hairspring made of a metal. Further, the Young's modulus is only required to be 20 [GPa] or less, and thus the hairspring 32 may be made of a material such as paper or wood. Details of the shape of the hairspring 32 are described later with reference to FIG. 11M to FIG. 11O.

Further, in this embodiment, the rotation angle [deg] of each of the balance wheel 31 and the permanent magnet 41 under a state in which the hairspring 32 is brought to a neutral position of elastic deformation is defined as 0°. The neutral position of elastic deformation of the hairspring 32 refers to, in other words, a position at which the hairspring 32 has an equilibrium length. Further, it is assumed that the balance wheel 31 in a state in which the hairspring 32 is brought to the neutral position of elastic deformation is supplied with the motive power from the power spring 11. That is, the balance wheel 31 and the permanent magnet 41 are each at a motive power supply position at which the motive power is supplied from the power spring 11, at the position of the rotation angle of 0°. Further, as described above, in this embodiment, the permanent magnet 41 is brought to a magnetically balanced position at the position of the rotation angle of 0°.

Further, in this embodiment, the balance wheel 31 is designed so as to be driven in a range of from a rotation angle of 340° to a rotation angle of −340°. Thus, the permanent magnet 41 is also driven in a range of from the rotation angle of 340° to the rotation angle of −340°. However, this range is merely an example, and it is preferred that the moving range of the balance wheel 31 be equal to or larger than the range of from a rotation angle of 270° to a rotation angle of −270°. When the moving range of the balance wheel 31 is increased to some extent as described above, the low speed oscillation of the balance wheel 31 can be achieved.

In FIG. 10, a state in which the balance wheel 31 is rotated in the forward direction from the position of the rotation angle of 0° is illustrated for every 45° or 90°. FIG. 10 only shows a state in which the balance wheel 31 is brought to a positive angle (0° to 340°), and illustration of a state in which the balance wheel 31 is brought to a negative angle is omitted.

[Reducing Speed of Balance Wheel 31: Air Resistance Member 15]

Figure 9:
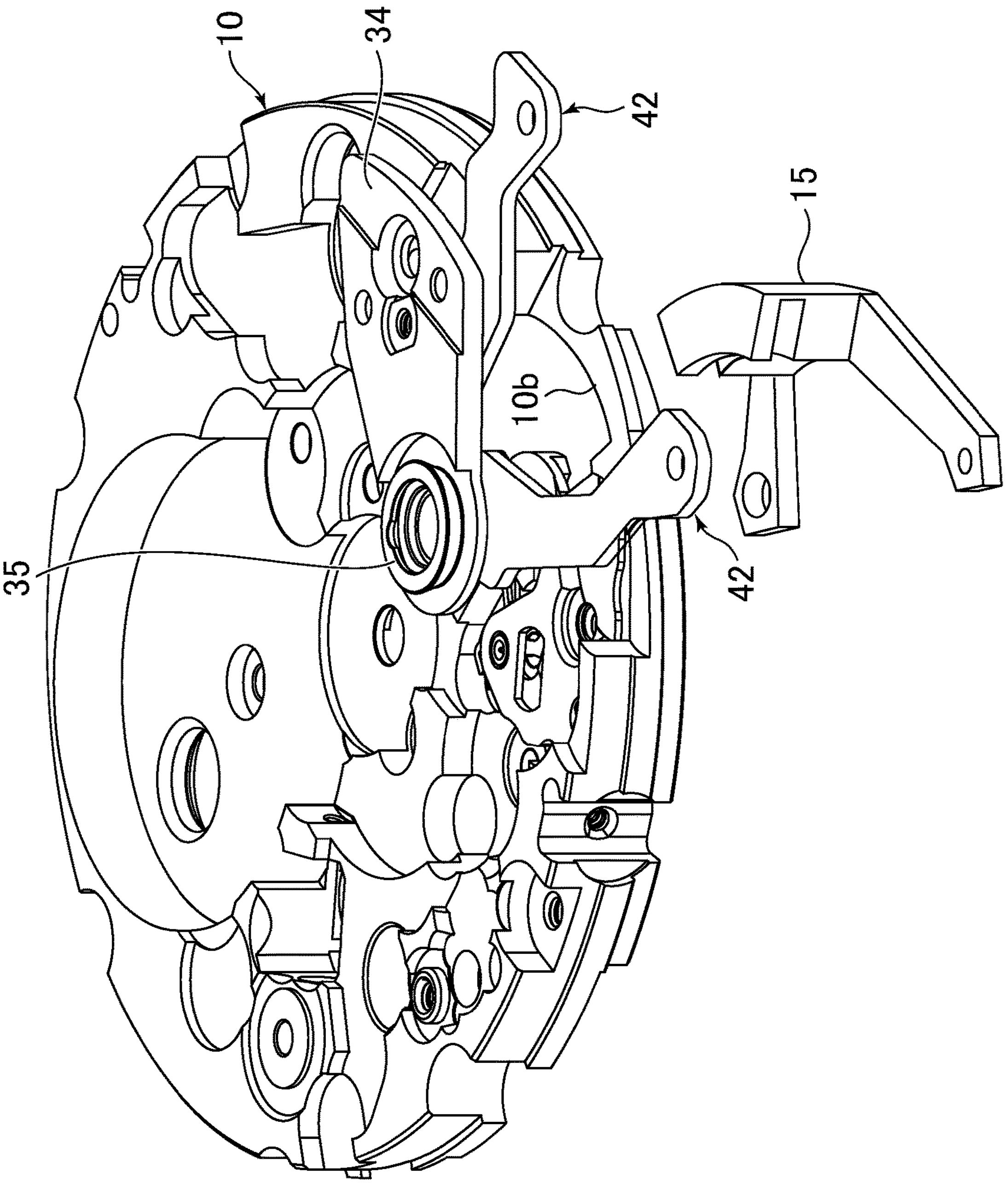
FIG. 9 is an exploded perspective view for illustrating a state in which an air resistance member is disassembled from the main plate.

Further, in this embodiment, there is adopted a configuration in which the air resistance member 15 serving as speed reduction means is mounted to the main plate 10, and an affected portion 313 for receiving air resistance from the air resistance member 15 is formed in a part of the balance wheel 31 in the circumferential direction. FIG. 9 is an exploded perspective view for illustrating a state in which the air resistance member is disassembled from the main plate.

The balance wheel 31 includes a circular portion 312 and the affected portion 313. The circular portion 312 performs the forward/reverse rotational motion about the balance staff 311 serving as a center. The affected portion 313 projects in the radial direction in a part of the circular portion 312 in the circumferential direction. In this embodiment, the affected portion 313 is a part of the balance wheel 31 having the largest length in the radial direction. Further, in this embodiment, as illustrated in FIG. 10, the affected portion 313 has a fan shape.

The air resistance member 15 includes a resistance wall for forming an air resistance region AR for causing air resistance. Specifically, the air resistance member 15 includes a first wall portion 151, a second wall portion 152, and a third wall portion 153. The first wall portion 151 is opposed to one surface of the affected portion 313 of the balance wheel 31. The second wall portion 152 is opposed to another surface of the affected portion 313 of the balance wheel 31. The third wall portion 153 connects the first wall portion 151 and the second wall portion 152 to each other. Those wall portions form the air resistance region AR. Further, the air resistance member 15 includes a base portion 154 which is integrated with the first wall portion 151, the second wall portion 152, and the third wall portion 153, and is to be fixed with respect to the main plate 10.

The air resistance member 15 is fixed with respect to the main plate 10. In this embodiment, as illustrated in FIG. 9, an opening 10*b* is formed in a part of the main plate 10. The air resistance member 15 is fitted into the opening 10*b*, and the base portion 154 is fixed with respect to the main plate 10 through use of a fixing tool such as a bolt. It is preferred that the air resistance member 15 be fitted into the opening 10*b* from a side of the main plate 10 opposite to the side on which the drive mechanism, the escapement mechanism 20, the speed governing mechanism 30, and the like are incorporated. That is, it is preferred that the base portion 154 be fixed with respect to a surface of the main plate 10 on a side opposite to the side on which the drive mechanism, the escapement mechanism 20, the speed governing mechanism 30, and the like are incorporated. FIG. 9 shows an example in which the opening 10*b* is formed in a part of the main plate 10, but the present invention is not limited thereto. The main plate 10 is only required to have a hole passing through the main plate 10 from one side to another side. For example, in the main plate 10, in place of the opening 10*b*, a cutout to which the air resistance member 15 is to be fitted may be formed.

In this embodiment, the air resistance member 15 is arranged so that the air resistance member 15 is provided in a predetermined direction with respect to the balance staff 311 and that the affected portion 313 is positioned inside of the air resistance region AR when the rotation angle of the balance wheel 31 falls within 1350 to 225° (halfway period in the forward direction motion and the reverse direction motion). That is, the affected portion 313 of the balance wheel 31 receives air resistance when the rotation angle of the balance wheel 31 falls within 135° to 225°, resulting in reducing the angular velocity. Further, although not shown, similarly, the affected portion 313 of the balance wheel 31 receives air resistance when the rotation angle of the balance wheel 31 falls within −135° to −225° (halfway period in the forward direction motion and the reverse direction motion), resulting in reducing the angular velocity.

The rotation speed of the balance wheel 31 passing through the air resistance region AR is reduced because an air escape passage is blocked by the first wall portion 151, the second wall portion 152, and the third wall portion 153, and thus the air stagnates in the air resistance region AR so that the stagnant air prevents the balance wheel 31 from moving.

As indicated by the graphs at the upper stage and the middle stage of FIG. 12 at the timing before the measurement time period becomes 2.0 seconds, the angular velocity of the balance wheel 31 sharply rises from when the balance wheel 31 is at the position of the rotation angle of 0°, and the angular velocity reaches the peak at the timing of the measurement time period of 2.0 seconds. This state occurs because, at the rotation angle of 0°, the balance wheel 31 receives the motive power from the power spring 11.

The balance wheel 31 is rotated in the forward direction from the rotation angle of 0°, and its angular velocity is gradually reduced so that the angular velocity becomes 0 at the position of the rotation angle of 340° corresponding to a turnaround point of the forward/reverse rotational motion. After that, the balance wheel 31 is rotated in the reverse direction along with the elastic deformation of the hairspring 32 from the position of the rotation angle of 340°.

The balance wheel 31 receives the air resistance caused by the air resistance member 15 when the balance wheel 31 is brought to the rotation angle of from 1350 to 225° as described above, and hence the angular velocity is reduced during this period. Accordingly, as shown in the graph at the middle stage of FIG. 12, the balance wheel 31 is reversely rotated from the rotation angle of 340° so that the change of the rotation angle of the balance wheel 31 becomes gentler during a period until the rotation angle becomes 0°.

Then, the balance wheel 31 comes back to the position of the rotation angle of 0° again so as to receive the motive power from the power spring 11, and thus the angular velocity in the reverse direction sharply rises to reach the peak. The angular velocity in the rotation in the reverse direction of the balance wheel 31 is gradually reduced so that the angular velocity becomes 0 at the position of the rotation angle of −340° (measurement time period of 3.0 seconds). After that, the balance wheel 31 is rotated in the forward direction along with the elastic deformation of the hairspring 32 from the position of the rotation angle of −340°.

In this case, the balance wheel 31 includes the affected portion 313 projecting in the radial direction, and hence a center-of-gravity position of the balance wheel 31 is shifted to the affected portion 313 side with respect to the balance staff 311 (rotation center). In a configuration in which the center-of-gravity position is deviated from the balance staff 311 present at the center position of the balance wheel 31, the rotational motion of the balance wheel 31 becomes unstable. In view of the above, in this embodiment, an opening 312*h* is formed in a part of the circular portion 312 so that the center-of-gravity position of the balance wheel 31 matches or comes close to the balance staff 311 (center position). As illustrated in FIG. 10, the opening 312*h* is formed so as to be adjacent to the affected portion 313 in the circumferential direction. When such a configuration is adopted, the rotational motion of the balance wheel 31 is less liable to become unstable. In particular, even when the posture of the mechanical timepiece 1 is changed, the balance wheel 31 can be caused to stably perform the rotational motion.

In this embodiment, the air resistance member 15 is arranged so that, when the rotation angle of the balance wheel 31 falls within 1350 to 225°, the affected portion 313 is positioned inside the air resistance region AR. Further, the air resistance region AR is arranged so that its center position 15C (see FIG. 6) in the circumferential direction overlaps the positions of 180° and −180° of the balance wheel 31 in the rotating direction of the balance wheel 31. In this manner, the air resistance to be received by the affected portion 313 becomes symmetrical between when the balance wheel 31 is rotated in the forward direction and when the balance wheel 31 is rotated in the reverse direction. Accordingly, as shown in the graph at the middle stage of FIG. 12 to be referred to later, the angular velocity of the balance wheel 31 becomes symmetrical between when the balance wheel 31 is rotated in the forward direction and when the balance wheel 31 is rotated in the reverse direction.

[Modification Examples of Structure For Reducing Angular Velocity of Balance Wheel 31]

Figure 11A:
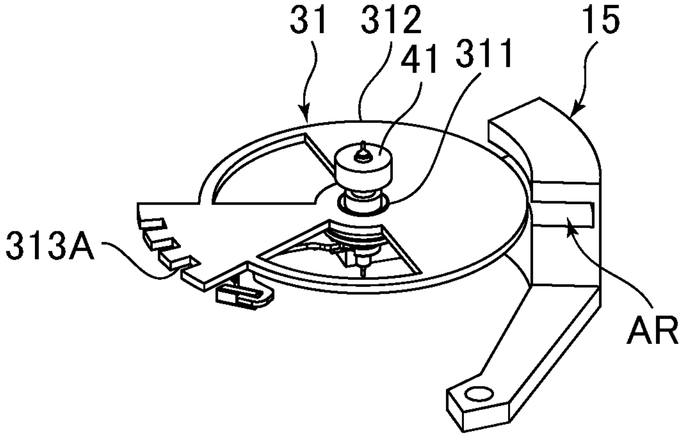
FIG. 11A is a perspective view for illustrating the balance wheel and the air resistance member in a modification example of the embodiment.
Figure 11B:
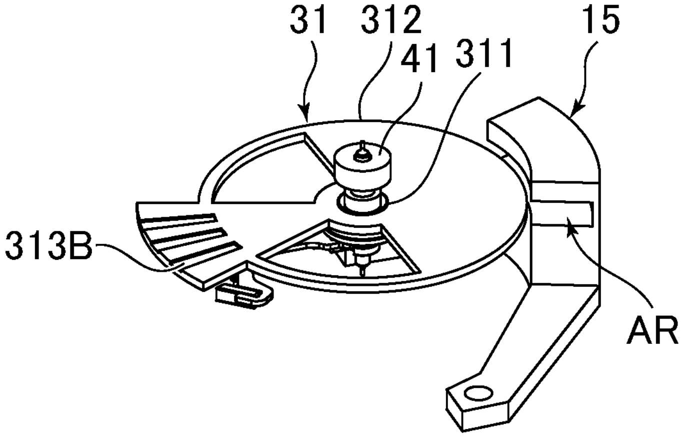
FIG. 11B is a perspective view for illustrating the balance wheel and the air resistance member in a modification example of the embodiment.
Figure 11C:
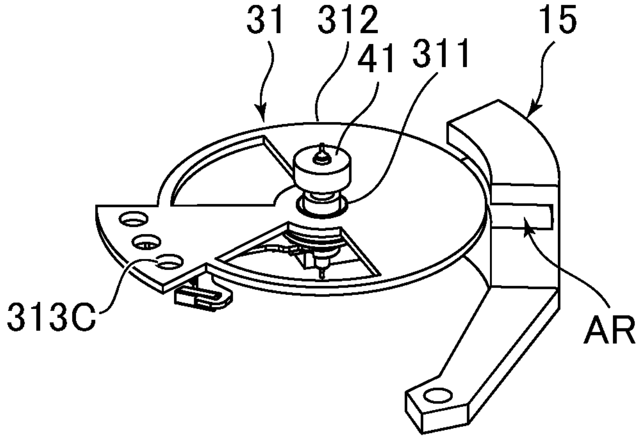
FIG. 11C is a perspective view for illustrating the balance wheel and the air resistance member in a modification example of the embodiment.
Figure 11D:
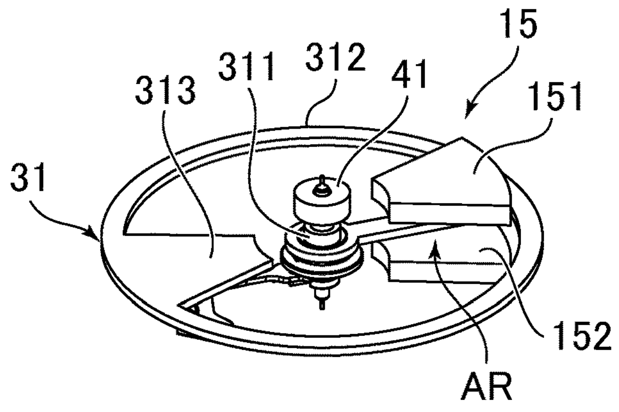
FIG. 11D is a perspective view for illustrating the balance wheel and the air resistance member in a modification example of the embodiment.
Figure 11E:
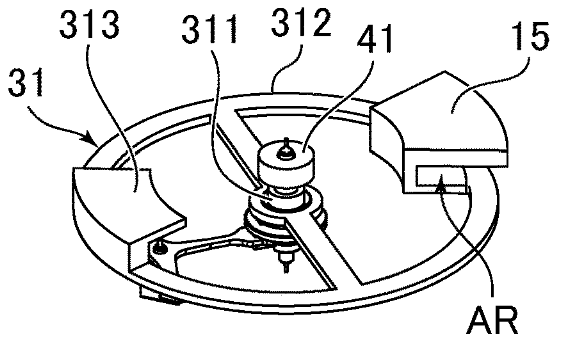
FIG. 11E is a perspective view for illustrating the balance wheel and the air resistance member in a modification example of the embodiment.
Figure 11F:
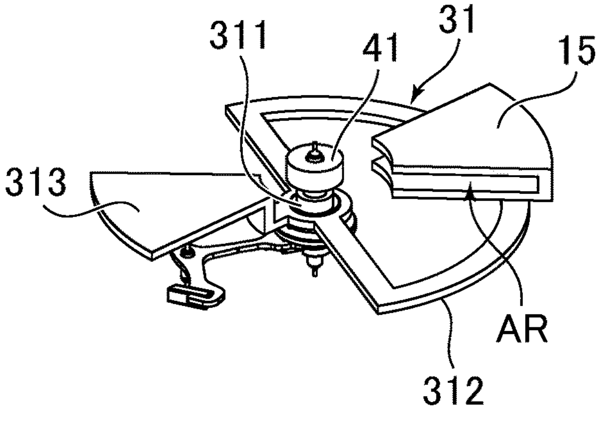
FIG. 11F is a perspective view for illustrating the balance wheel and the air resistance member in a modification example of the embodiment.
Figure 11G:
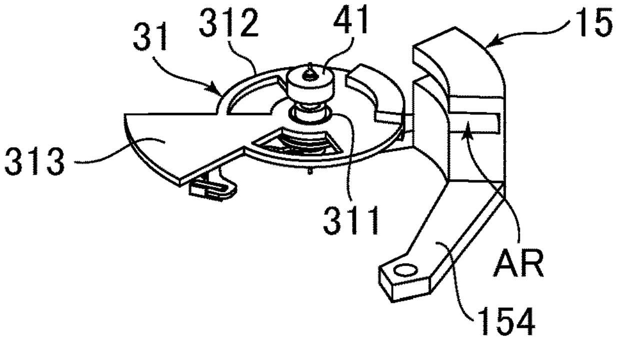
FIG. 11G is a perspective view for illustrating the balance wheel and the air resistance member in a modification example of the embodiment.
Figure 11H:
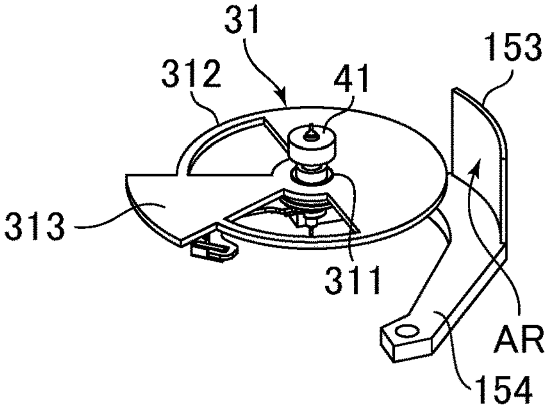
FIG. 11H is a perspective view for illustrating the balance wheel and the air resistance member in a modification example of the embodiment.
Figure 11I:
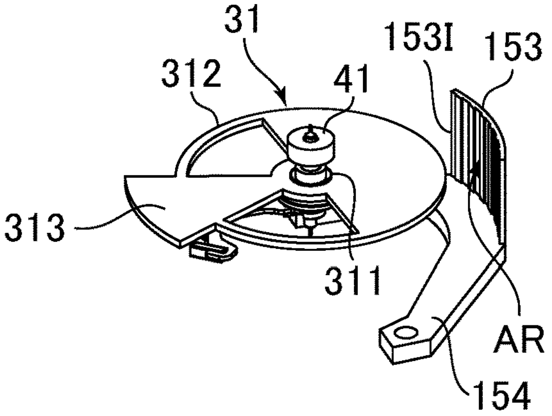
FIG. 11I is a perspective view for illustrating the balance wheel and the air resistance member in a modification example of the embodiment.
Figure 11J:
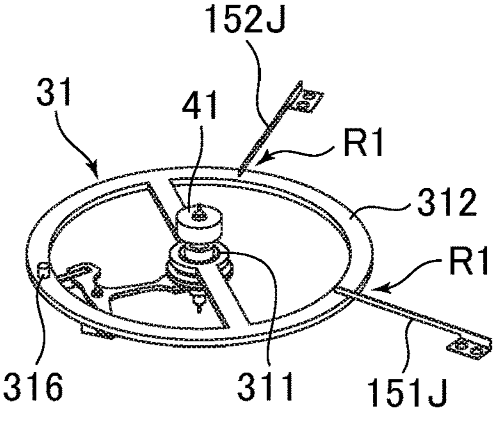
FIG. 11J is a perspective view for illustrating the balance wheel and an elastic member in a modification example of the embodiment.

Now, with reference to FIG. 11A to FIG. 11J, modification examples of the structure for reducing the angular velocity of the balance wheel 31 are described. FIG. 11A to FIG. 11I are each a perspective view for illustrating the balance wheel and the air resistance member in a modification example of this embodiment. FIG. 11J is a perspective view for illustrating the balance wheel and an elastic member in a modification example of this embodiment.

The balance wheel 31 illustrated in FIG. 11A has, in the affected portion 313 of the balance wheel 31 illustrated in FIG. 10, three cutouts 313A provided so as to form a resistance wall intersecting with the circumferential direction. The cutouts 313A are formed so as to pass through the air resistance region AR along with the rotation of the balance wheel 31.

The balance wheel 31 illustrated in FIG. 11B has, in the affected portion 313 of the balance wheel 31 illustrated in FIG. 10, three grooves 313B provided so as to form a resistance wall intersecting with the circumferential direction. The three grooves 313B extend in the radial direction. The grooves 313B are formed so as to pass through the air resistance region AR along with the rotation of the balance wheel 31.

The balance wheel 31 illustrated in FIG. 11C has, in the affected portion 313 of the balance wheel 31 illustrated in FIG. 10, three through holes 313C provided so as to form a resistance wall intersecting with the circumferential direction. The through holes 313C are formed so as to pass through the air resistance region AR along with the rotation of the balance wheel 31.

Through adoption of the affected portions 313 illustrated in FIG. 11A to FIG. 11C, when the affected portion 313 passes through the air resistance region AR, rectification of the air inside of the air resistance region AR is disturbed so that the air resistance to be received by the affected portion 313 is increased. In this manner, the speed of the affected portion 313 passing through the air resistance region AR can be further reduced.

The configurations of the balance wheel 31 illustrated in FIG. 11A to FIG. 11C are merely examples, and the present invention is not limited thereto as long as the balance wheel 31 has a shape including a recessed portion capable of forming the resistance wall for increasing the air resistance.

That is, the position at which the cutout or the like is to be formed and the number of the cutouts or the like are not limited to those illustrated.

FIG. 11D shows an example in which the third wall portion 153 of the air resistance member 15 illustrated in FIG. 10 is excluded, and the first wall portion 151 and the second wall portion 152 are provided on a radially inner side with respect to the path of the affected portion 313. That is, the air resistance member 15 forms the air resistance region AR through use of only the first wall portion 151 and the second wall portion 152 which are opposed to each other. It is preferred that the first wall portion 151 and the second wall portion 152 be mounted to the main plate 10 or the like independently of each other.

Further, in FIG. 11D, the affected portion 313 projects toward the radially inner side. Accordingly, the affected portion 313 passes through the air resistance region AR along with the rotational motion of the balance wheel 31. With the configuration illustrated in FIG. 11D, an increase in size of the balance wheel 31 and the air resistance member 15 in the radial direction can be suppressed.

FIG. 11E shows an example in which the affected portion 313 is provided at a position different from the circular portion 312 in the axial direction of the balance staff 311. Further, the air resistance member 15 is provided at a position at which the affected portion 313 can pass through the air resistance region AR in the axial direction of the balance staff 311.

Also in FIG. 11F, similarly to the modification example illustrated in FIG. 11E, the affected portion 313 is provided at a position different from the circular portion 312 in the axial direction of the balance staff 311. Further, the air resistance member 15 is provided at a position at which the affected portion 313 can pass through the air resistance region AR in the axial direction of the balance staff 311. Further, the circular portion 312 of the balance wheel 31 has a semicircular shape. Accordingly, the balance wheel 31 is reduced in weight.

In the examples illustrated in FIG. 11E and FIG. 11F, the affected portion 313 is provided at a position different from the circular portion 312 in the axial direction so that the center-of-gravity position of the balance wheel 31 can be adjusted.

FIG. 11G shows an example in which a diameter of the circular portion 312 is decreased to be smaller than that of the balance wheel 31 illustrated in FIG. 10, and a thickness of a position opposed to the affected portion 313 through intermediation of the balance staff 311 is increased. That is, a weight of the circular portion 312 at the position opposed to the affected portion 313 through intermediation of the balance staff 311 is increased. With such a configuration, the center-of-gravity position of the balance wheel 31 can be matched with the balance staff 311 (center position of the balance wheel 31). Further, in the configuration of FIG. 11G in which the diameter of the balance wheel 31 is decreased, there is also obtained an advantage in that the degree of freedom of the layout of the stud support 34 for fixing the outer end of the hairspring 32 is improved.

FIG. 11H shows an example in which the air resistance member 15 includes no first wall portion 151 or second wall portion 152, but includes only a configuration corresponding to the third wall portion 153. That is, the air resistance member 15 of FIG. 11H is formed of the base portion 154 and the third wall portion 153. The third wall portion 153 is provided upright from the base portion 154, and has a shape following a rotation locus of the balance wheel 31.

FIG. 11I shows an example in which grooves 1531 are formed in the air resistance member 15 illustrated in FIG. 11H. The grooves 1531 correspond to the recessed portion forming the resistance wall intersecting with the circumferential direction of the balance wheel 31. A plurality of grooves 1531 are formed along the axial direction of the balance staff 311. With such a configuration, as compared to FIG. 11H, the air resistance which acts on the affected portion 313 passing through the air resistance region AR can be increased.

FIG. 11J shows an example of adopting a configuration in which the speed of the balance wheel 31 is reduced not through air resistance but through contact resistance (frictional resistance). Specifically, the balance wheel 31 includes, as the affected portion, a projection 316 formed on the circular portion 312. Further, an elastic member is adopted as a frictional resistance portion.

Specifically, a first elastic member 151J and a second elastic member 152J are provided. The projection 316 is brought into contact with the first elastic member 151J when the balance wheel 31 is positioned at the rotation angle of 135°. The projection 316 is brought into contact with the second elastic member 152J when the balance wheel 31 is positioned at the rotation angle of 225°. It is preferred that the first elastic member 151J and the second elastic member 152J have their ends fixed to the main plate 10.

When the projection 316 of the balance wheel 31 is brought into contact with the first elastic member 151J and the second elastic member 152J, the first elastic member 151J and the second elastic member 152J are elastically deformed while causing a frictional resistance with respect to the projection 316. The balance wheel 31 is reduced in speed by the frictional resistance while the first elastic member 151J and the second elastic member 152J are in contact with the projection 316. In the example illustrated in FIG. 11J, a region in which the projection 316 passes while coming into contact with the first elastic member 151J and the second elastic member 151J corresponds to a resistance region R1.

The configurations illustrated in FIG. 10 and FIG. 11A to FIG. 11J are merely examples. It is only required to adopt a configuration for reducing the speed of the balance wheel 31 by acting on the balance wheel 31 during a halfway period in each of the forward direction motion and the reverse direction motion, and the present invention is not limited to the illustrated examples.

Figure 11K:
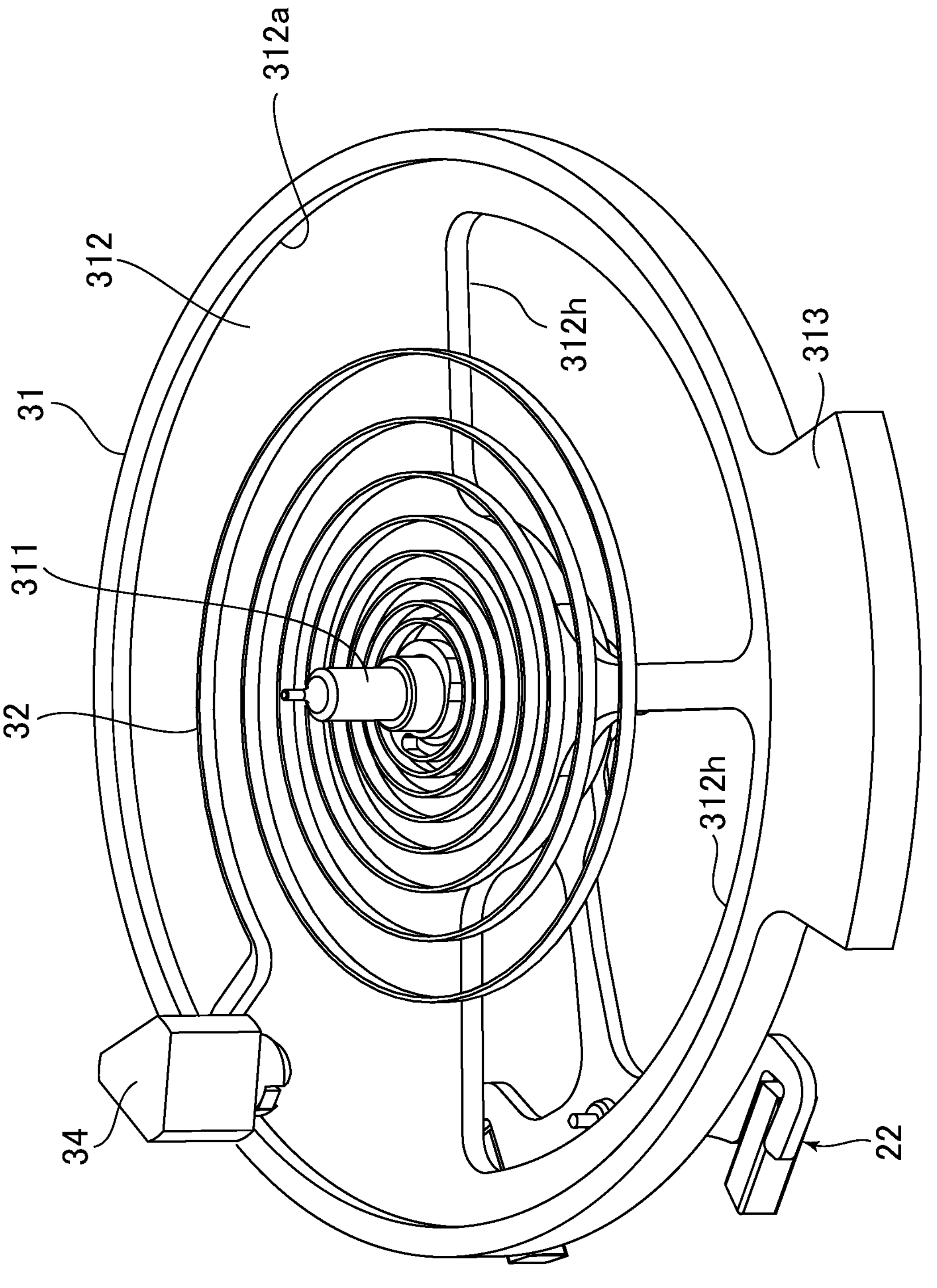
FIG. 11K is a perspective view for illustrating a state in which another example of the balance wheel is viewed from a side on which a hairspring is provided.
Figure 11L:
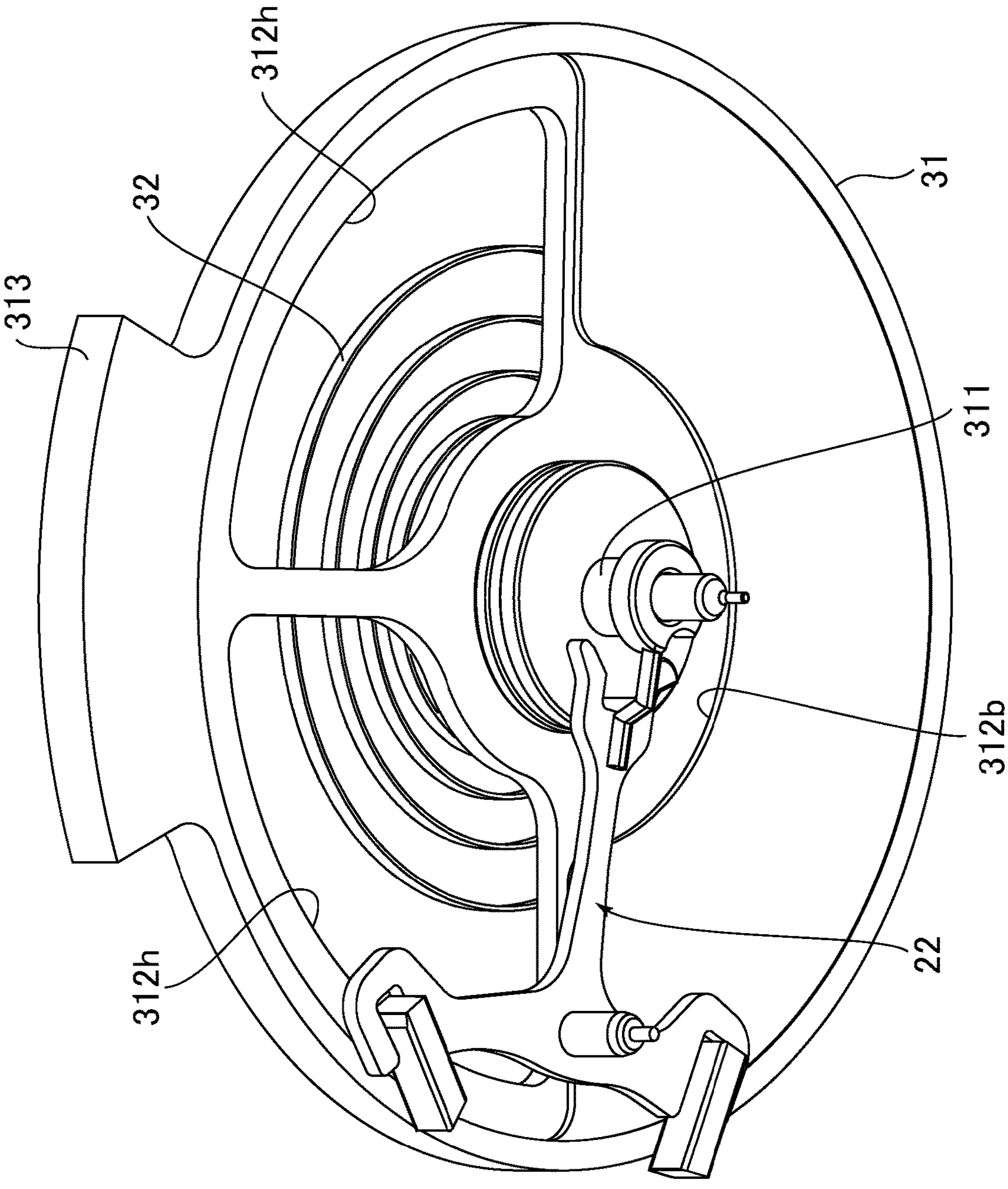
FIG. 11L is a perspective view for illustrating a state in which the balance wheel illustrated in FIG. 11K is viewed from a side opposite to the side on which the hairspring is provided.

Further, with reference to FIG. 11K and FIG. 11L, another example of the balance wheel 31 is described. FIG. 11K is a perspective view for illustrating a state in which the another example of the balance wheel is viewed from the side on which the hairspring is provided. FIG. 11L is a perspective view for illustrating a state in which the balance wheel illustrated in FIG. 11K is viewed from a side opposite to the side on which the hairspring is provided.

The balance wheel 31 illustrated in FIG. 11K and FIG. 11L includes, similarly to that illustrated in FIG. 10 or the like, the circular portion 312 and the affected portion 313. Further, the circular portion 312 has openings 312*h* formed at positions overlapping the affected portion 313 in the circumferential direction.

Further, in the balance wheel 31 illustrated in FIG. 11K and FIG. 11L, an edge portion 312*a* of the circular portion 312 projects in the axial direction of the balance staff 311. That is, the edge portion 312*a* has a thickness larger than that of a part of the circular portion 312 on the inner side of the edge portion 312*a*. Further, the affected portion 313 is formed so as to be flush with the edge portion 312*a*. That is, the thickness of the affected portion 313 is the same as that of the edge portion 312*a*, and is larger than that of the part of the circular portion 312 on the inner side of the edge portion 312*a*.

In the balance wheel 31 illustrated in FIG. 11K and FIG. 11L, the thickness of the affected portion 313 is relatively large, and hence a surface of the affected portion 313 receiving the air resistance is relatively large. Accordingly, an amount of air to be pushed away by the affected portion 313 in the air resistance region AR illustrated in FIG. 10 can be increased. Thus, the movement of the balance wheel 31 is more likely to be hindered, and the speed is more likely to be reduced. When the hairspring 32 is arranged on a part of the balance wheel 31 other than the edge portion 312*a* and the affected portion 313, which has a relatively small thickness, a total thickness of the hairspring 32 and the balance wheel 31 in the axial direction of the balance staff 311 can be reduced.

Further, as illustrated in FIG. 11L, a thickness of a surface of the circular portion 312 of the balance wheel 31 on a side opposite to the side on which the hairspring 32 is provided is partially increased. When the thickness of the affected portion 313 is increased, the weight of the affected portion 313 is increased, and thus the center of gravity of the balance wheel 31 is shifted to the affected portion 313 side. However, when the thickness of the circular portion 312 is partially increased, the center-of-gravity position of the balance wheel 31 can be matched with the balance staff 311 (center position of the balance wheel 31).

Figure 11M:
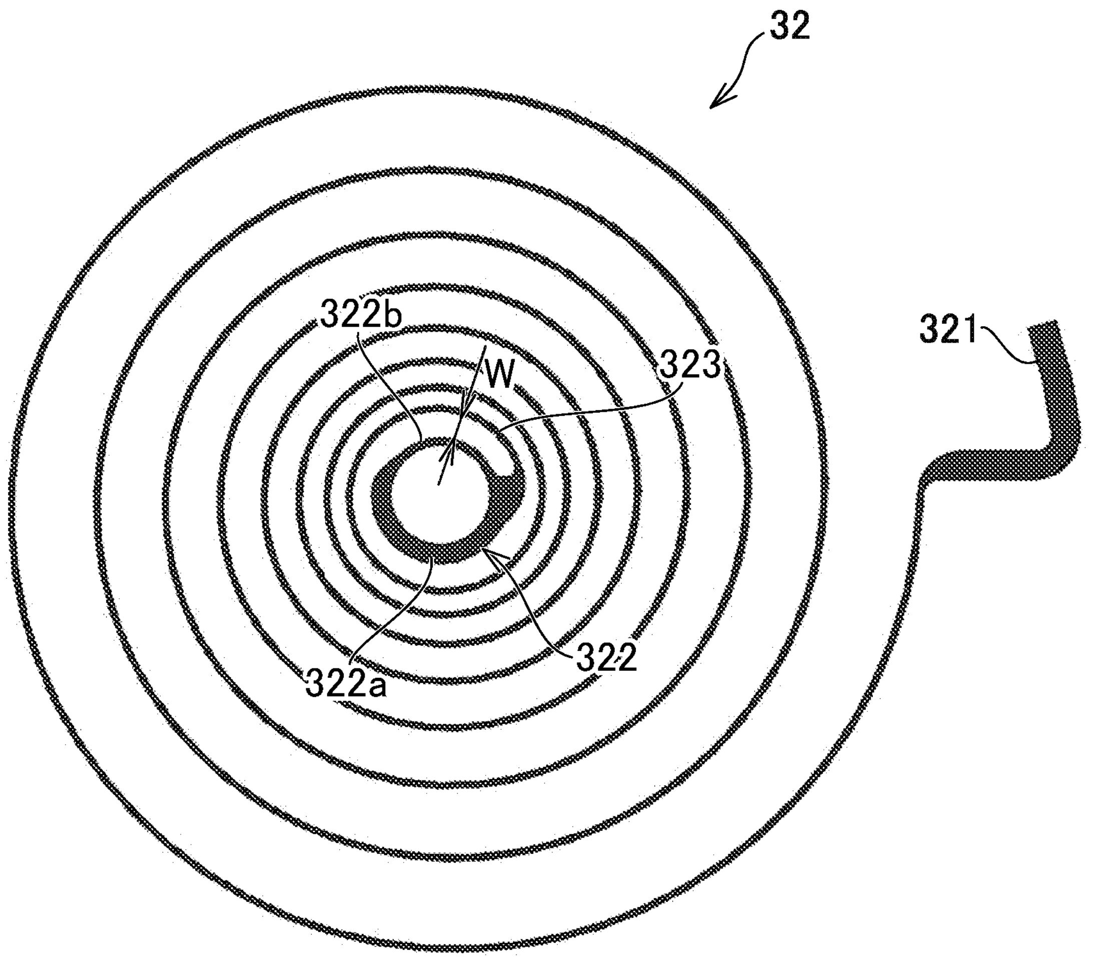
FIG. 11M is a plan view for illustrating a state in which the hairspring is brought to its neutral position of elastic deformation.
Figure 11N:
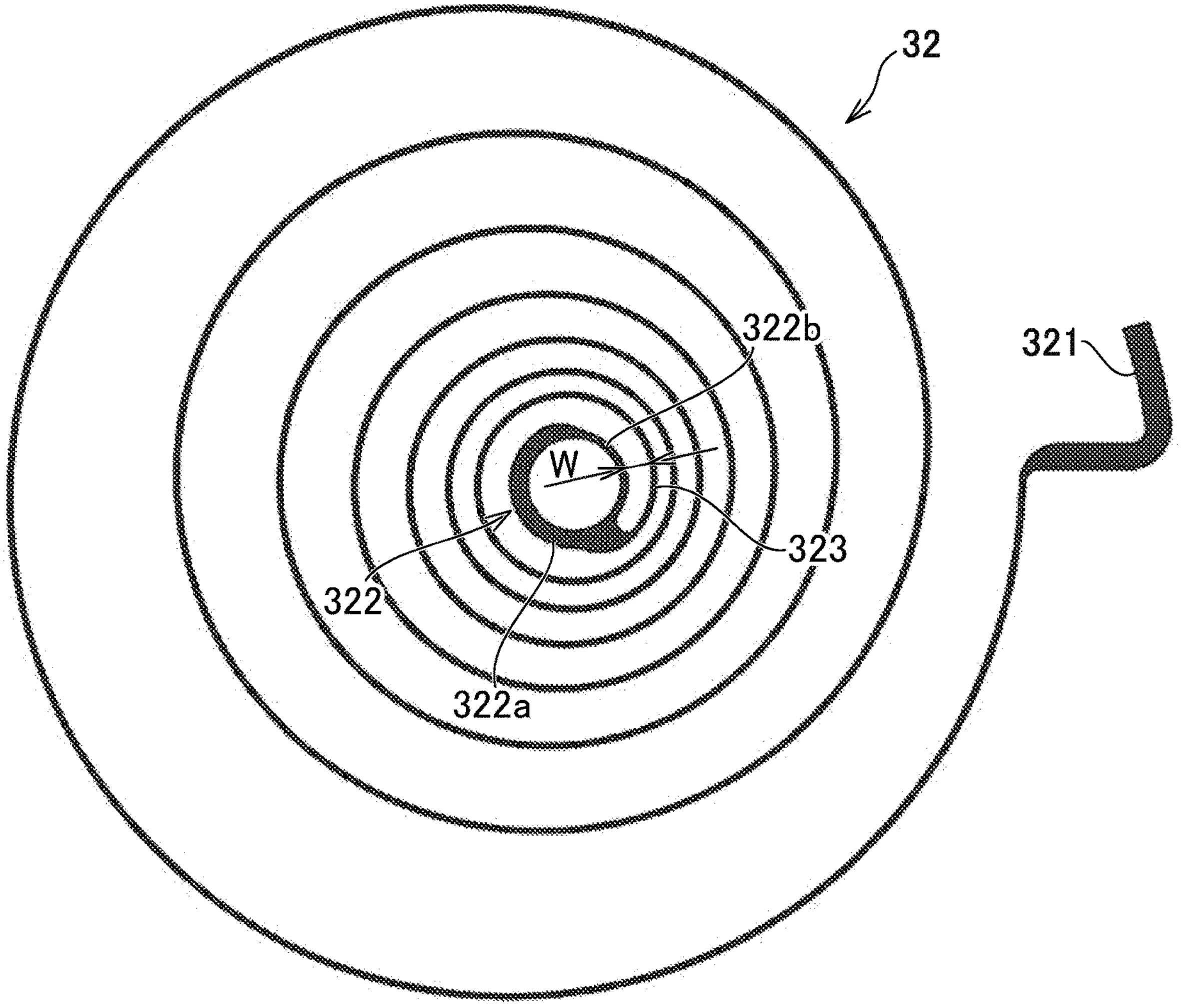
FIG. 11N is a plan view for illustrating a state in which the hairspring is elastically deformed in an expanding direction from the neutral position.
Figure 11O:
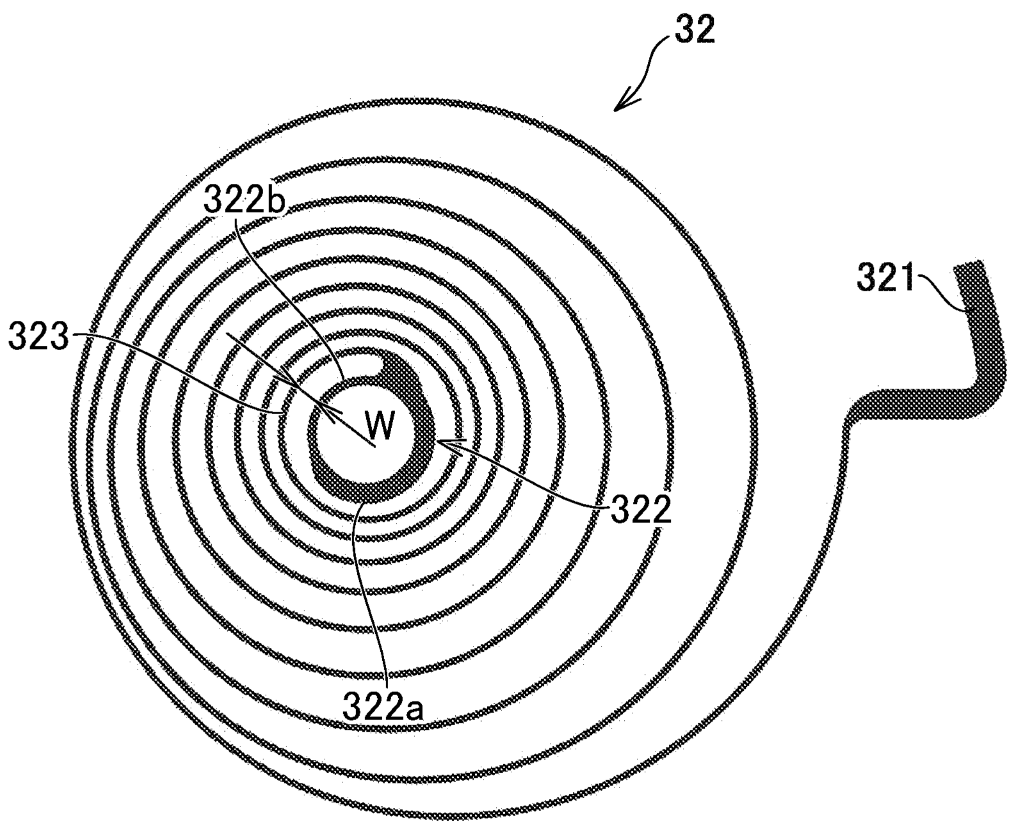
FIG. 11O is a plan view for illustrating a state in which the hairspring is elastically deformed in a contracting direction from the neutral position.

Further, with reference to FIG. 11M to FIG. 11O, details of the hairspring 32 are described. FIG. 11M is a plan view for illustrating a state in which the hairspring is brought to its neutral position of elastic deformation. FIG. 11N is a plan view for illustrating a state in which the hairspring is elastically deformed in an expanding direction from the neutral position. FIG. 11O is a plan view for illustrating a state in which the hairspring is elastically deformed in a contracting direction from the neutral position.

The hairspring 32 includes an outer end portion 321 to be connected to the stud support 34, and an inner end portion 322 to be connected to the balance staff 311. The inner end portion 322 has an annular shape for following the peripheral surface of the balance staff 311. The outer end portion 321 and the inner end portion 322 each have a thickness larger than that of another part (part to be elastically deformed) of the hairspring 32. Accordingly, a connection strength to the stud support 34 and the balance staff 311 is maintained.

When the entire length of the hairspring 32 is increased, a spring force of the hairspring 32 is reduced, thereby being capable of achieving low oscillation. When the entire length of the hairspring 32 is increased, the diameter of the hairspring 32 is increased. In order to increase the entire length while downsizing the hairspring 32, it is preferred that a distance between an inner part and an outer part of the hairspring 32 be decreased. That is, it is preferred that a pitch of the hairspring 32 be narrowed.

The hairspring 32 adopts a shape using a logarithmic spiral. As described above, when laser processing is performed, a logarithmic-spiral hairspring can be easily manufactured. When the shape using the logarithmic spiral is adopted, as compared to an Archimedean spiral having an equal pitch, which is generally used as the shape of the hairspring, a distance between pitches of the hairspring 32 on the inner end portion 322 side can be decreased. Thus, the entire length of the hairspring can be increased, and the diameter can be decreased. As a result, the spring force can be reduced while the diameter of the hairspring 32 is reduced, thereby also being capable of achieving low oscillation. However, when the hairspring 32 is manufactured by laser processing as described above, it is difficult to narrow the pitch. Narrowing the pitch is difficult because there is a possibility that, due to the heat of laser light, the shape of the hairspring 32 may be deformed.

In view of the above, in order to maintain a dimension accuracy of the hairspring 32 while narrowing the pitch, as illustrated in FIG. 11M to FIG. 11O, a configuration in which the inner end portion 322 includes a fixing portion 322*a* and a pitch enlarging portion 322*b* is adopted. The fixing portion 322*a* is a part to be fixed with respect to the balance staff 311. The pitch enlarging portion 322*b* is a part having a width narrower than that of the fixing portion 322*a*, and is a part for enlarging a pitch between the inner end portion 322 and a part 323 of the hairspring 32 adjacent to the inner end portion 322 in the radial direction. The part 323 of the hairspring 32 adjacent to the inner end portion 322 in the radial direction is a part other than the inner end portion 322, and is a part arranged on the innermost side. Symbol W shown in FIG. 11M to FIG. 11O indicates a distance between the inner end portion 322 and the part 323 adjacent to the inner end portion 322 in the radial direction.

FIG. 11M to FIG. 11O show an example in which the inner end portion 322 has an annular shape, that is, an example in which the fixing portion 322*a* and the pitch enlarging portion 322*b* are connected to each other, but the present invention is not limited thereto. For example, the inner end portion 322 may be separated in a part in the circumferential direction, and the separated part may function as the pitch enlarging portion 322*b*. However, the strength of the fixing with respect to the balance staff 311 is more likely to be ensured when the inner end portion 322 has an annular shape. FIG. 11M to FIG. 11O show an example in which the hairspring 32 has the shape using the logarithmic spiral, but the present invention is not limited thereto. The configuration in which the pitch enlarging portion 322*b* is formed is particularly effective in a hairspring having a shape in which the pitch is narrower on the inner side of the diameter than on the outer side of the diameter.

In this embodiment, an example in which the configuration for reducing the speed of the balance wheel 31 is adopted has been described, but the present invention is not limited thereto. When the number of times the balance wheel 31 performs the reciprocating motion per second is increased by increasing the speed of the balance wheel 31, an error per second, that is, the influence of the rate accuracy is decreased. The configuration including the elastic deformation portion 3322 described above may be adopted in the configuration in which the balance wheel 31 is relatively increased in speed as described above.

[Timing of Power Generation]

An amount of current to be caused in the coil 43 due to the motion of the permanent magnet 41 is increased in proportional to the angular velocity of the permanent magnet 41. Accordingly, in order to efficiently perform power generation, it is preferred that a current to be caused in the coil 43 be used at the time when the angular velocity of the permanent magnet 41 is fast.

In view of the above, in this embodiment, at a timing at which the permanent magnet 41 (balance wheel 31) is at the position of 0° or at a timing immediately after this timing, power generation is performed based on a current corresponding to a counter-electromotive voltage (detection voltage) to be detected in the coil 43 due to the motion of the permanent magnet 41. That is, as shown in the graph at the lower stage of FIG. 12, the power generation is performed at the timing at which the counter-electromotive voltage to be detected in the coil 43 reaches a peak.

The timing to perform the power generation is not limited to the timing at which the balance wheel 31 is at the position of the rotation angle of 0° or the timing immediately after this timing, and the timing is only required to be a timing before the affected portion 313 (balance wheel 31) reaches the position of the air resistance member 15 in any of the forward direction motion or the reverse direction motion in the forward/reverse rotational motion of the balance wheel 31. That is, the power generation may be performed based on the current corresponding to the counter-electromotive voltage detected in the coil 43, during a period before the angular velocity of the balance wheel 31 is reduced when the affected portion 313 receives the air resistance by the air resistance member 15.

As shown in the graph at the lower stage of FIG. 12, in this embodiment, the same voltage waveform is detected between the forward direction motion and the reverse direction motion of the balance wheel 31. Accordingly, in the mechanical timepiece 1, in adjustment of the timing to perform the power generation, it is not required to grasp in which direction of the forward direction motion or the reverse direction motion the balance wheel 31 is performing the motion.

[Relationship Between Direction of Magnetization of Permanent Magnet 41 and Power Generation Efficiency]

Now, with reference to FIG. 5, FIG. 12, and FIG. 13A to FIG. 13C, a relationship between the direction of magnetization of the permanent magnet 41 and the power generation efficiency is described.

In the mechanical timepiece 1 according to this embodiment, the power generation is performed based on electric power obtained by rectifying, by the rectifying circuit 50, a current corresponding to the counter-electromotive voltage caused in the coil 43. In this case, as the rectification to be performed by the rectifying circuit 50, it is conceivable to perform full wave rectification using a bridge circuit including a plurality of diodes or to perform half-wave rectification using a circuit including one diode. When a plurality of diodes are used, a voltage drop occurs in accordance with the number of diodes, and thus loss is caused in the electric power to be obtained. Accordingly, in this embodiment, a configuration in which the half-wave rectification is performed by the rectifying circuit 50 is adopted. Further, in the half-wave rectification, when a difference in shape is provided between the positive counter-electromotive voltage and the negative counter-electromotive voltage, and the power generation is performed based on the counter-electromotive voltage having a larger absolute value, efficient power generation can be performed. In view of the above, in this embodiment, the permanent magnet 41 is arranged so that the counter-electromotive voltage suitable for the half-wave rectification is detected.

Figure 13A:
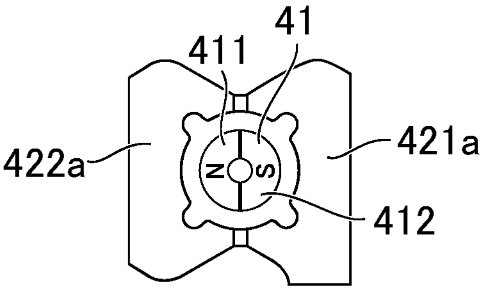
FIG. 13A is a graph for showing the counter-electromotive voltage to be detected in the coil in an arrangement of the permanent magnet in the embodiment.
Figure 13A:
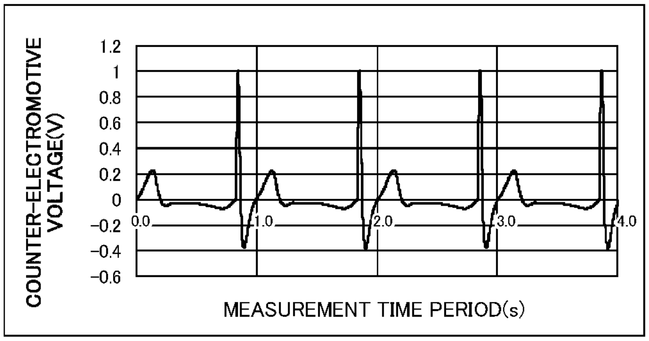
Figure 13B:
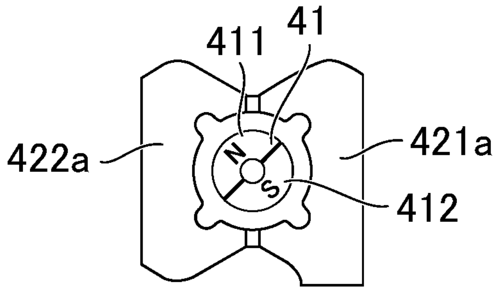
FIG. 13B is a graph for showing the counter-electromotive voltage to be detected in the coil in an arrangement of the permanent magnet in Comparative Example 1.
Figure 13B:
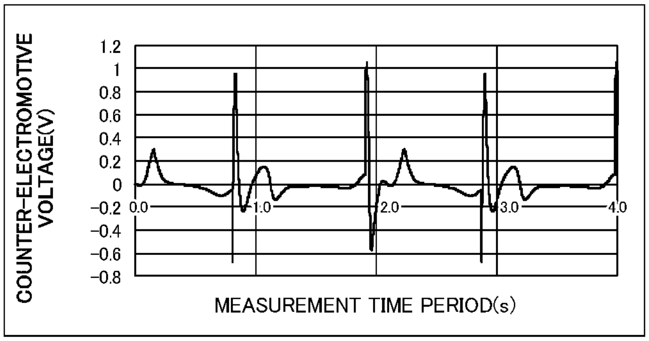
Figure 13C:
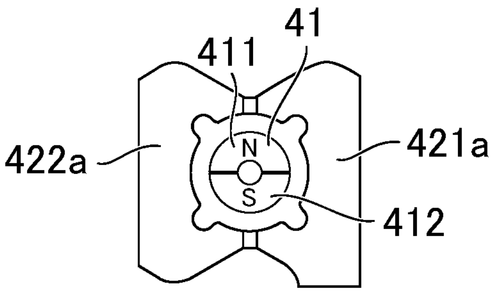
FIG. 13C is a graph for showing the counter-electromotive voltage to be detected in the coil in an arrangement of the permanent magnet in Comparative Example 2.
Figure 13C:
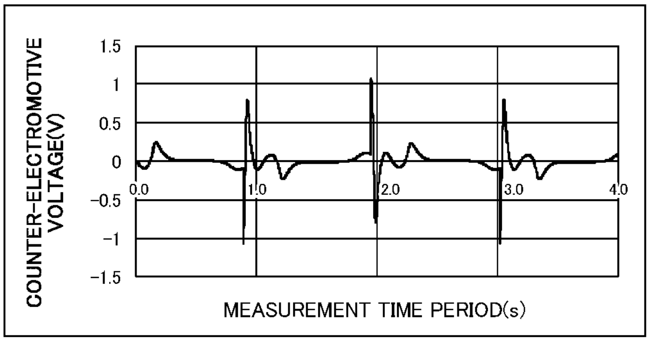

FIG. 13A shows a counter-electromotive voltage to be detected in the coil 43 in an arrangement of the permanent magnet 41 in this embodiment. FIG. 13B shows a counter-electromotive voltage to be detected in the coil 43 in an arrangement of the permanent magnet 41 in Comparative Example 1. FIG. 13C shows a counter-electromotive voltage to be detected in the coil 43 in an arrangement of the permanent magnet 41 in Comparative Example 2.

[Relationship Between Direction of Magnetization of Permanent Magnet 41 and Power Generation Efficiency: This Embodiment]

In this embodiment, the permanent magnet 41 is arranged so that, under a state in which the hairspring 32 is brought to its neutral position of elastic deformation, the direction of magnetization is orthogonal to the opposing direction of the first welding portion 423 and the second welding portion 424.

Now, description is given of the counter-electromotive voltage to be detected in the coil 43 during a period in which the rotational motion is performed in the forward direction from when the permanent magnet 41 is positioned at the rotation angle of 0°, then the rotational motion is performed in the reverse direction due to the elastic force of the hairspring 32, and further the rotational motion is performed in the forward direction due to the elastic force of the hairspring 32.

Further, a counter-electromotive voltage to be caused in the coil 43 due to a change in a magnetic field at the time when the N-pole portion 411 of the permanent magnet 41 moves in a direction of coming close to the first end portion 421*a* of the soft magnetic core 42 is referred to as "positive" counter-electromotive voltage. Meanwhile, a counter-electromotive voltage to be caused in the coil 43 due to a change in a magnetic field at the time when the N-pole portion 411 moves in a direction of separating away from the first end portion 421*a* of the soft magnetic core 42 is referred to as "negative" counter-electromotive voltage.

In this embodiment, the permanent magnet 41 is brought to a magnetically balanced position at the rotation angle of 0°. Accordingly, at the rotation angle of 0°, the counter-electromotive voltage to be caused in the coil 43 becomes 0. The permanent magnet 41 is supplied with motive power from the power spring 11 at the rotation angle of 0°. That is, the angular velocity of the permanent magnet 41 becomes maximum at the timing immediately after the rotation angle of 0°. Further, while the permanent magnet 41 is rotated in the forward direction from the rotation angle of 0° to 180°, the N-pole portion 411 moves in the direction of coming close to the first end portion 421*a*. As described above, in this embodiment, the permanent magnet 41 is arranged so that the counter-electromotive voltage to be detected in the coil 43 has the same polarity while the permanent magnet 41 is rotated by 180° in the forward direction from the motive power supply position.

Accordingly, while the permanent magnet 41 is rotated from the rotation angle of 0° to 180°, the angular velocity of the permanent magnet 41 becomes maximum, and the positive counter-electromotive voltage to be caused in the coil 43 reaches a peak.

At the rotation angle of 180° at which the permanent magnet 41 is brought to the magnetically balanced position, the counter-electromotive voltage to be caused in the coil 43 becomes 0.

When the permanent magnet 41 is rotated in the forward direction from the rotation angle of 180°, the N-pole portion 411 moves in the direction of separating away from the first end portion 421*a*. Accordingly, while the permanent magnet 41 is rotated from the rotation angle of 180° to 340°, a negative counter-electromotive voltage is caused in the coil 43. The angular velocity of the permanent magnet 41 at this time is smaller than the angular velocity obtained while the permanent magnet 41 is moved from the rotation angle of 0° to 180°. Accordingly, the absolute value of the peak of the negative counter-electromotive voltage comes out to be smaller than the absolute value of the peak of the positive counter-electromotive voltage.

Further, the angular velocity of the permanent magnet 41 becomes 0 at the rotation angle of 340° corresponding to the turnaround position of the reciprocating motion. Accordingly, at the rotation angle of 340°, the counter-electromotive voltage to be caused in the coil 43 becomes 0.

The permanent magnet 41 which has reached the rotation angle of 340° starts to rotate in the reverse direction due to the elastic force of the hairspring 32. When the permanent magnet 41 is rotated from the rotation angle of 340° to 180°, the N-pole portion 411 moves in the direction of coming close to the first end portion 421*a*. Accordingly, while the permanent magnet 41 is rotated from the rotation angle of 340° to 180°, a positive counter-electromotive voltage is caused in the coil 43.

Further, at the rotation angle of 180° at which the permanent magnet 41 is brought to the magnetically balanced position, the counter-electromotive voltage to be caused in the coil 43 becomes 0.

Further, the permanent magnet 41 is rotated from the rotation angle of 180° to 0°. When the permanent magnet 41 is rotated from the rotation angle of 180° to 0°, the N-pole portion 411 moves in the direction of separating away from the first end portion 421*a*. Accordingly, while the permanent magnet 41 is rotated from the rotation angle of 180° to 0°, a negative counter-electromotive voltage is caused in the coil 43.

Further, at the rotation angle of 0° at which the permanent magnet 41 is brought to the magnetically balanced position, the counter-electromotive voltage to be caused in the coil 43 becomes 0.

The permanent magnet 41 which has reached the rotation angle of 0° is supplied with the motive power from the power spring 11. That is, the angular velocity of the permanent magnet 41 becomes maximum immediately after reaching the rotation angle of 0°. Further, while the permanent magnet 41 is rotated from the rotation angle of 0° to −180°, the N-pole portion 411 moves in the direction of coming close to the first end portion 421*a*. As described above, in this embodiment, the permanent magnet 41 is arranged so that the counter-electromotive voltage to be detected in the coil 43 has the same polarity while the permanent magnet 41 is rotated by −180° in the reverse direction from the motive power supply position.

Accordingly, while the permanent magnet 41 is rotated from the rotation angle of 0° to −180°, the angular velocity of the permanent magnet 41 becomes maximum, and the positive counter-electromotive voltage to be caused in the coil 43 reaches a peak.

At the rotation angle of −180° at which the permanent magnet 41 is brought to the magnetically balanced position, the counter-electromotive voltage to be caused in the coil 43 becomes 0.

When the permanent magnet 41 is rotated in the reverse direction from the rotation angle of −180°, the N-pole portion 411 moves in the direction of separating away from the first end portion 421*a*. Accordingly, while the permanent magnet 41 is rotated from the rotation angle of −180° to −340°, a negative counter-electromotive voltage is caused in the coil 43. The angular velocity of the permanent magnet 41 at this time is smaller than the angular velocity obtained while the permanent magnet 41 is moved from the rotation angle of 0° to −180°. Accordingly, the absolute value of the peak of the negative counter-electromotive voltage comes out to be smaller than the absolute value of the peak of the positive counter-electromotive voltage.

Further, the angular velocity of the permanent magnet becomes 0 at the rotation angle of −340° corresponding to the turnaround position of the reciprocating motion. Accordingly, at the rotation angle of −340°, the counter-electromotive voltage to be caused in the coil 43 becomes 0.

The permanent magnet 41 which has reached the rotation angle of −340° starts to rotate in the forward direction due to the elastic force of the hairspring 32. When the permanent magnet 41 is rotated from the rotation angle of −340° to −180°, the N-pole portion 411 moves in the direction of coming close to the first end portion 421*a*. Accordingly, while the permanent magnet 41 is rotated from the rotation angle of −340° to −180°, a positive counter-electromotive voltage is caused in the coil 43.

Further, at the rotation angle of −180° at which the permanent magnet 41 is brought to the magnetically balanced position, the counter-electromotive voltage to be caused in the coil 43 becomes 0.

Further, the permanent magnet 41 is rotated from the rotation angle of −180° to 0°. When the permanent magnet 41 is rotated from the rotation angle of −180° to 0°, the N-pole portion 411 moves in the direction of separating away from the first end portion 421*a*. Accordingly, when the permanent magnet 41 is rotated from the rotation angle of −180° to 0°, a negative counter-electromotive voltage is caused in the coil 43.

The above-mentioned operation is repeated so that, in the arrangement of the permanent magnet 41 in this embodiment, a counter-electromotive voltage having a waveform shown in FIG. 13A is caused in the coil 43. As illustrated in FIG. 13A, the peak of the counter-electromotive voltage is different between the positive counter-electromotive voltage and the negative counter-electromotive voltage. That is, the maximum value of the absolute value of the positive counter-electromotive voltage is larger than the maximum value of the absolute value of the negative counter-electromotive voltage. Further, the waveform of the counter-electromotive voltage to be detected is the same between the motion in the forward direction and the motion in the reverse direction of the permanent magnet 41.

[Relationship Between Direction of Magnetization of Permanent Magnet 41 and Power Generation Efficiency: Comparative Example 1]

Next, with reference to FIG. 13B, Comparative Example 1 is described. In Comparative Example 1, the permanent magnet 41 is arranged so that, under a state in which the hairspring 32 is brought to its neutral position of elastic deformation, the direction of magnetization is inclined by 45° in the opposing direction of the first welding portion 423 and the second welding portion 424. That is, in Comparative Example 1, the permanent magnet 41 is arranged so that the position of the rotation angle of 0° is inclined by −45° with respect to that in this embodiment.

In Comparative Example 1, when the permanent magnet 41 is rotated in the forward direction from the rotation angle of 0°, first, the N-pole portion 411 moves in the direction of separating away from the first end portion 421*a*. Then, when the permanent magnet 41 passes the rotation angle of 45°, the N-pole portion 411 moves in the direction of coming close to the first end portion 421*a*. Accordingly, while the permanent magnet 41 is rotated in the forward direction from the rotation angle of 0° to 225°, a negative counter-electromotive voltage is caused in the coil 43 immediately after the rotation, and then, after passing the rotation angle of 45°, a positive counter-electromotive voltage is caused in the coil 43.

In Comparative Example 1, when the permanent magnet 41 is rotated in the forward direction from the rotation angle of 0° to 340°, then is rotated in the reverse direction by the elastic force of the hairspring 32, and further comes back to the rotation angle of 0° again so as to be rotated in the reverse direction from the rotation angle of 0°, the N-pole portion 411 moves in the direction of coming close to the first end portion 421*a*. That is, when the permanent magnet 41 is rotated in the reverse direction from the rotation angle of 0°, a positive counter-electromotive voltage is caused in the coil 43.

As described above, in Comparative Example 1, the rotation in the forward direction and the rotation in the reverse direction have different waveforms of the positive counter-electromotive voltage and the negative counter-electromotive voltage at least before and after the rotation angle of 0°. Accordingly, the rotation in the forward direction and the rotation in the reverse direction have different magnitudes of the peak of the counter-electromotive voltage. Further, the peak position of the counter-electromotive voltage varies between the rotation in the forward direction and the rotation in the reverse direction, and hence there is a possibility that it is determined that the cycle of the forward/reverse rotational motion of the balance wheel 31 is disturbed so that rate adjustment is unexpectedly performed. Accordingly, in the configuration of Comparative Example 1, the rate adjustment means 40 is required to include means for grasping in advance in which direction of the forward direction motion or the reverse direction motion the balance wheel 31 is preforming the motion.

[Relationship Between Direction of Magnetization of Permanent Magnet 41 and Power Generation Efficiency: Comparative Example 2]

Next, with reference to FIG. 13C, Comparative Example 2 is described. In Comparative Example 2, the permanent magnet 41 is arranged so that, under a state in which the hairspring 32 is brought to its neutral position of elastic deformation, the direction of magnetization is the same as the opposing direction of the first welding portion 423 and the second welding portion 424. That is, in Comparative Example 2, the permanent magnet 41 is arranged so that the position of the rotation angle of 0° is inclined by −90° with respect to that in this embodiment.

In Comparative Example 2, when the permanent magnet 41 is rotated in the forward direction from the rotation angle of 0°, first, the N-pole portion 411 moves in the direction of separating away from the first end portion 421*a*. Then, when the permanent magnet 41 passes the rotation angle of 90°, the N-pole portion 411 moves in the direction of coming close to the first end portion 421*a*. Accordingly, while the permanent magnet 41 is rotated in the forward direction from the rotation angle of 0° to 180°, a negative counter-electromotive voltage is caused in the coil 43 immediately after the rotation, and then, after passing the rotation angle of 90°, a positive counter-electromotive voltage is caused in the coil 43.

In Comparative Example 2, when the permanent magnet 41 is rotated in the forward direction from the rotation angle of 0° to 340°, then is rotated in the reverse direction by the elastic force of the hairspring 32, and further comes back to the rotation angle of 0° again so as to be rotated in the reverse direction from the rotation angle of 0°, the N-pole portion 411 moves in the direction of coming close to the first end portion 421*a*. That is, when the permanent magnet 41 is rotated in the reverse direction from the rotation angle of 0°, a positive counter-electromotive voltage is caused in the coil 43.

As described above, in Comparative Example 2, the rotation in the forward direction and the rotation in the reverse direction have different waveforms of the positive counter-electromotive voltage and the negative counter-electromotive voltage at least before and after the rotation angle of 0°. Accordingly, the rotation in the forward direction and the rotation in the reverse direction have different magnitudes of the peak of the counter-electromotive voltage. In the configuration of Comparative Example 2, the peak of the counter-electromotive voltage is smaller in the rotation in the forward direction or the rotation in the reverse direction as compared to that in Comparative Example 1, and hence it cannot be said that this counter-electromotive voltage is suitable for the half-wave rectification. Further, the rotation in the forward direction and the rotation in the reverse direction have different peaks of the counter-electromotive voltage, and hence, in some cases, a threshold value Vth is also required to be changed. As a result, similarly to Comparative Example 1, the rate adjustment means 40 is required to include means for grasping in advance in which direction of the forward direction motion or the reverse direction motion the balance wheel 31 is performing the motion.

[Relationship Between Direction of Magnetization of Permanent Magnet 41 and Power Generation Efficiency: Summary]

As described above, in this embodiment, regardless of whether the rotating direction of the permanent magnet 41 is the forward direction or the reverse direction, a counter-electromotive voltage having a waveform of the same shape is detected. Accordingly, in this embodiment, the peak of the positive counter-electromotive voltage is detected at the same magnitude and a constant cycle. Further, in this embodiment, the positive counter-electromotive voltage and the negative counter-electromotive voltage have an asymmetric shape. Specifically, the peak of the positive counter-electromotive voltage comes out to be larger than the peak of the negative counter-electromotive voltage. Accordingly, it can be said that, in the arrangement of the permanent magnet 41 in this embodiment, as compared to Comparative Examples 1 and 2, the counter-electromotive voltage has a waveform suitable for rate adjustment and half-wave rectification.

The arrangement of the permanent magnet 41 illustrated in FIG. 5 is merely an example, and it is preferred that the permanent magnet 41 be arranged so that, under a state in which the hairspring 32 is brought to its neutral position of elastic deformation, its direction of magnetization is the same as an opposing direction of the first end portion 421*a* and the second end portion 422*a*. The opposing direction of the first end portion 421*a* and the second end portion 422*a* refers to a direction orthogonal to the opposing direction of the first welding portion 423 and the second welding portion 424 illustrated in FIG. 5. However, the present invention is not limited thereto, and it is preferred that the permanent magnet 41 be at least arranged so that, under a state in which the hairspring 32 is brought to its neutral position of elastic deformation, its direction of magnetization is directed to the first end portion 421*a* side or the second end portion 422*a* side.

Further, it is preferred that the permanent magnet 41 be arranged so that, under a state in which the hairspring 32 is brought to its neutral position of elastic deformation, a boundary B between the N-pole portion 411 and the S-pole portion 412 overlaps an imaginary band-shaped region (S indicated in FIG. 5) connecting the first welding portion 423 and the second welding portion 424 to each other. The band-shaped region S is an imaginary region defined for the sake of indicating the arrangement of the permanent magnet 41, and does not physically exist as the configuration of the mechanical timepiece 1.

[Circuit Diagram]

Figure 14A:
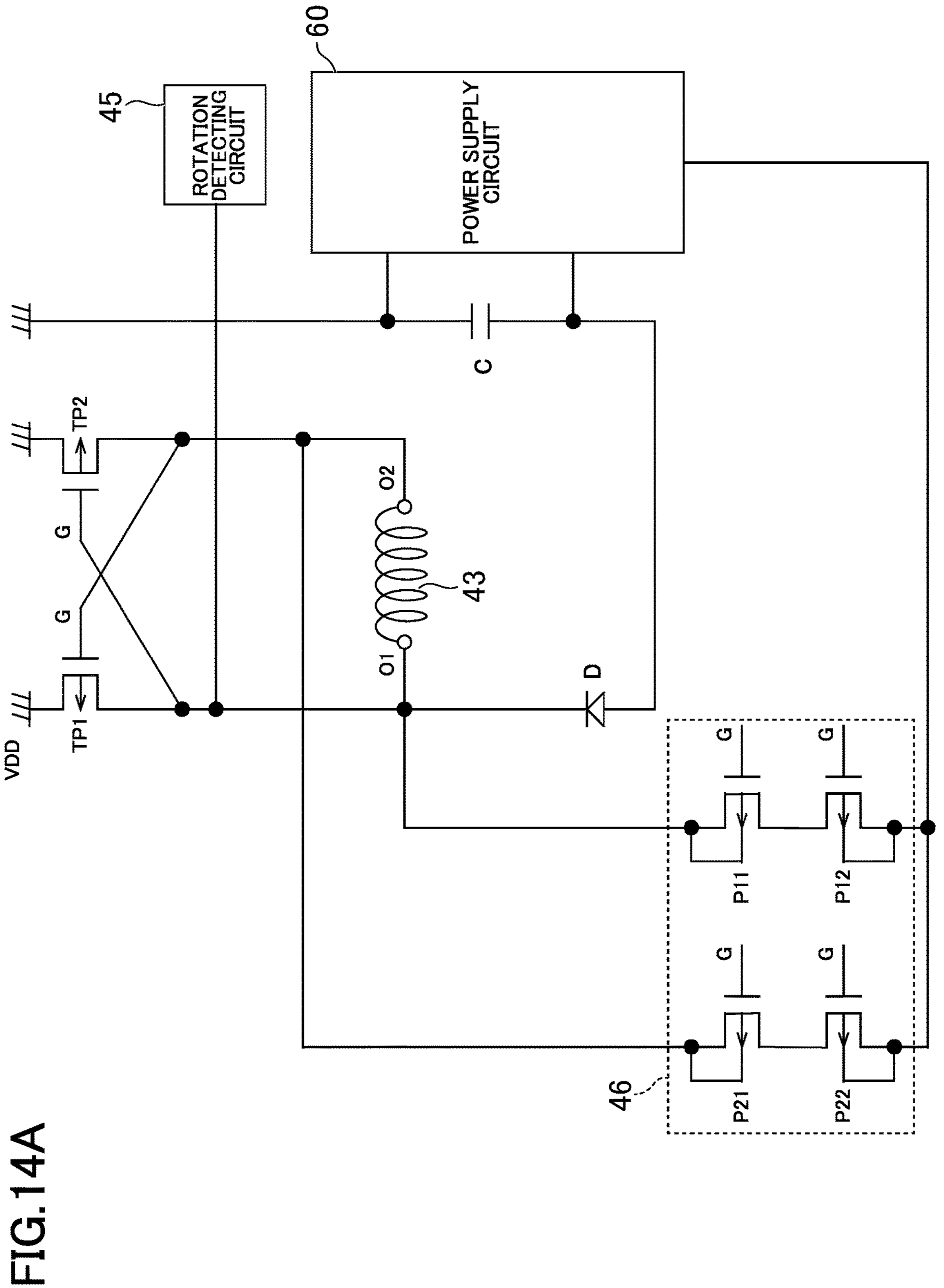
FIG. 14A is a circuit diagram for illustrating an example of a circuit in the embodiment.

Now, with reference to FIG. 14A, an outline of the rectifying circuit in this embodiment is described. FIG. 14A is a circuit diagram for illustrating an example of the circuit in this embodiment.

In this embodiment, there is adopted a configuration in which, through use of the rectifying circuit 50 including one diode D, a current corresponding to the counter-electromotive voltage caused in the coil 43 due to the motion of the permanent magnet 41 is subjected to half-wave rectification. The rectifying circuit 50 is a circuit for eliminating a negative voltage part of the counter-electromotive voltage caused in the coil 43 so as to achieve conversion into a direct current.

A transistor TP1 and a transistor TP2 are connected to a first terminal O1 and a second terminal O2 of the coil 43, respectively. The counter-electromotive voltage caused in the coil 43 is input to the transistors TP1 and TP2, and the rotation detecting circuit 45 detects the detection signal based on this input. That is, when the transistor TP2 is turned on at a predetermined timing, an induced voltage generated at the first terminal O1 and the second terminal O2 corresponding to those transistors can be extracted as the detection signal being a voltage signal.

Further, transistors P11 and P12 are connected to the first terminal O1 of the coil 43, and transistors P21 and P22 are connected to the second terminal O2 of the coil 43. The transistors P11, P12, P21, and P22 are controlled to be turned on or off by the speed governing pulse from the speed governing pulse output circuit 46. At the time of power generation, gate terminals of the transistors P11, P12, P21, and P22 are turned off. Under this state, the rectifying circuit 50 is formed of the transistors TP1 and TP2 and the diode D. When the permanent magnet 41 performs the forward/reverse rotational motion, a current flows through the coil 43 so that a capacitor C is charged. When the capacitor C is charged to some extent, the power supply circuit 60 is activated. Then, through activation of the power supply circuit 60, the control circuit 44 is activated so that the control of each circuit included in the rate adjustment means 40 is performed by the control circuit 44.

Figure 14B:
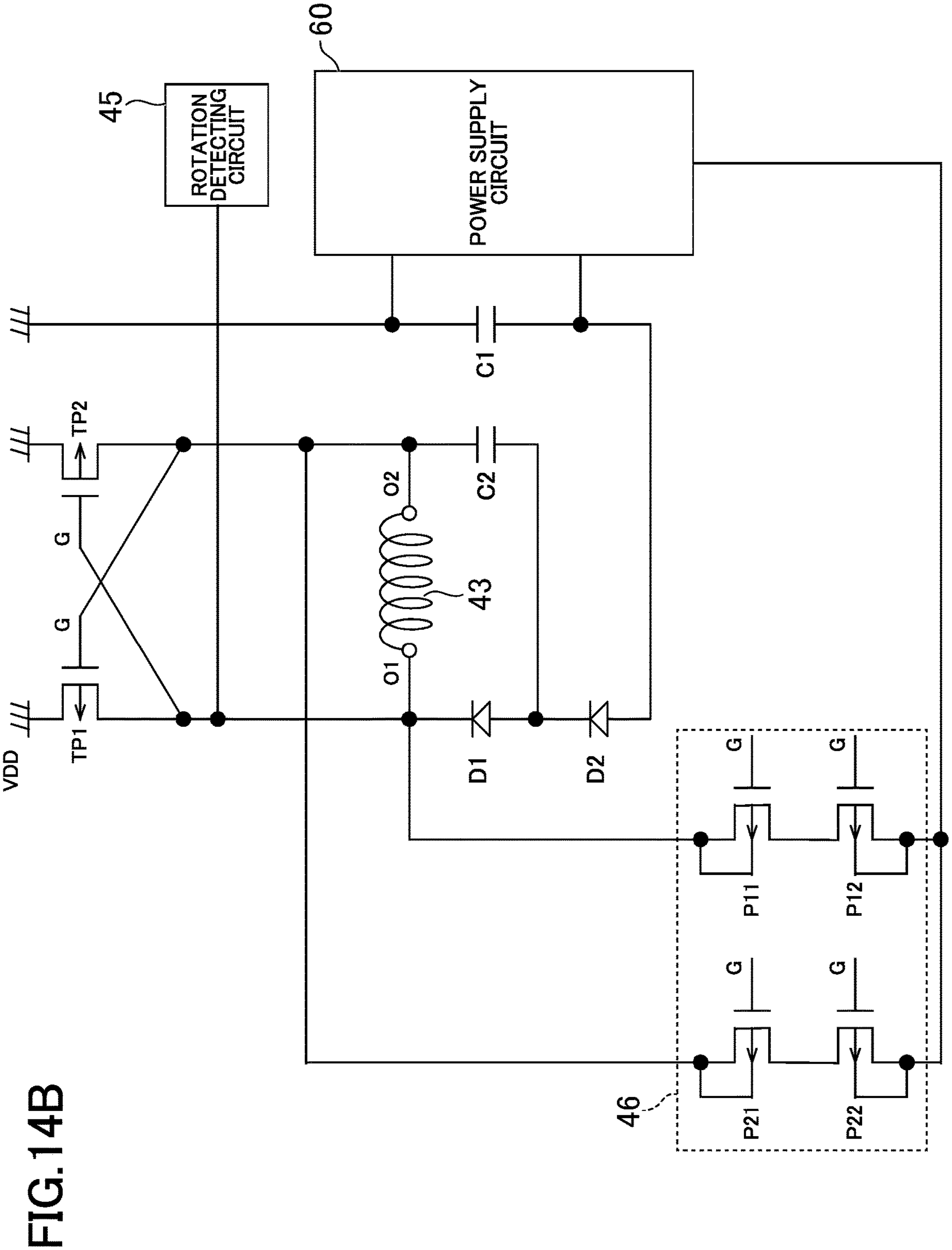
FIG. 14B is a circuit diagram for illustrating another example of the circuit in the embodiment.

In this embodiment, as illustrated in FIG. 14A, a configuration in which the half-wave rectification is performed through use of the rectifying circuit 50 including one diode D is adopted. Thus, the circuit configuration can be simplified, and a voltage drop can be made less liable to occur. The circuit illustrated in FIG. 14A is merely an example. As illustrated in FIG. 14B, as the rectifying circuit 50, a voltage doubling rectifying circuit capable of rectifying also the counter-electromotive voltage in the reverse direction may be adopted. FIG. 14B shows an example of a voltage doubling rectifying circuit including two diodes D1 and D2 and two capacitors C1 and C2. In the voltage doubling rectifying circuit, the number of diodes can be reduced as compared to that of the full-wave rectifying circuit. That is, a voltage drop can be made less liable to occur.

[Details of Rate Adjustment Control]

Figure 15A:
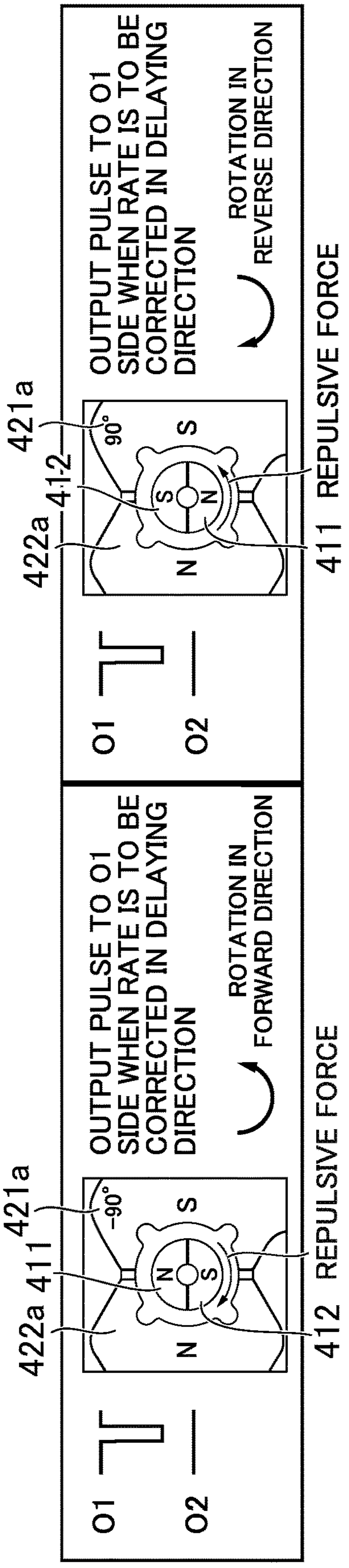
FIG. 15A is a diagram for illustrating control of a movement of the permanent magnet through use of a speed governing pulse in the embodiment.

Now, with reference to FIG. 12 and FIG. 15A to FIG. 19, details of rate adjustment control in this embodiment are described. FIG. 15A and FIG. 15B are diagrams for illustrating control of the movement of the permanent magnet through use of the speed governing pulse in this embodiment.

In this embodiment, the speed governing pulse output circuit 46 outputs the speed governing pulse so as to control the movement of the permanent magnet 41, thereby controlling the movement of the balance wheel 31 so as to perform the rate adjustment.

Figure 15B:
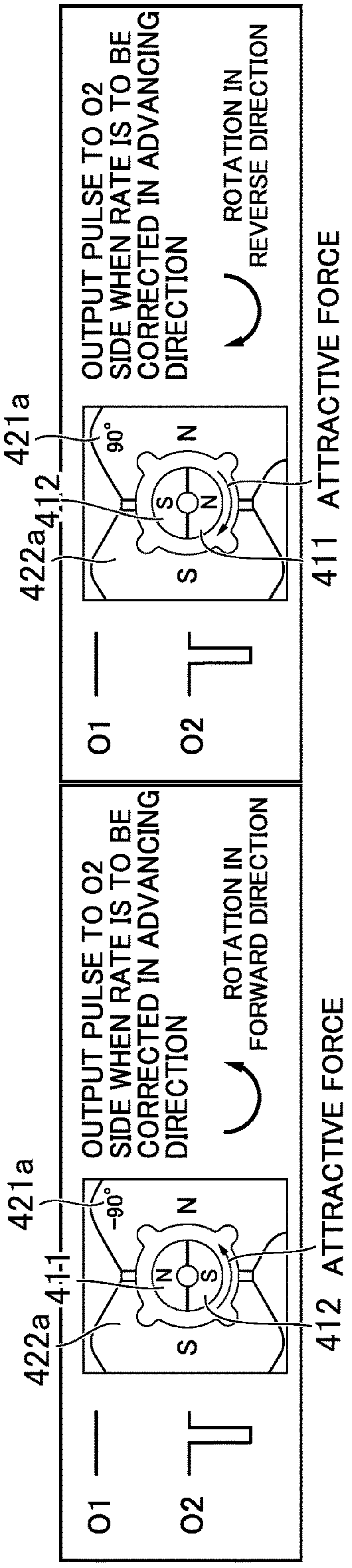
FIG. 15B is a diagram for illustrating control of the movement of the permanent magnet through use of the speed governing pulse in the embodiment.

In this embodiment, it is defined that, as illustrated in FIG. 15A, when the speed governing pulse is output to the first terminal O1 of the coil 43, the first end portion 421*a* has a polarity of the S pole and the second end portion 422*a* has a polarity of the N pole. Meanwhile, it is defined that, as illustrated in FIG. 15B, when the speed governing pulse is output to the first terminal O2 of the coil 43, the first end portion 421*a* has a polarity of the N pole and the second end portion 422*a* has a polarity of the S pole. When the winding direction of the coil 43 is opposite, the polarities of the first end portion 421*a* and the second end portion 422*a* are reversed.

[Details of Rate Adjustment Control: Output Timing of Speed Governing Pulse]

In this case, under a state in which the angular velocity of the permanent magnet 41 is fast, it is difficult to perform the rate adjustment at a desired timing. The reason therefor is because, under a state in which the angular velocity of the permanent magnet 41 is fast, it is highly possible that the output timing of the speed governing pulse is deviated.

In view of the above, in this embodiment, the speed governing pulse is output while the permanent magnet 41 is rotated in the reverse direction from the rotation angle of 180° to 0°, and while the permanent magnet 41 is rotated in the forward direction from the rotation angle of −180° to 0° in the forward direction motion and the reverse direction motion in the forward/reverse rotational motion of the permanent magnet 41. That is, the speed governing pulse is output during a period before the balance wheel 31 is supplied with the motive power from the power spring 11. In this manner, the speed governing pulse can be output under a state in which the angular velocity of the permanent magnet 41 is relatively low. Further, in this embodiment, the balance wheel 31 receives the air resistance caused by the air resistance member 15 during a period from the rotation angle of 225° to 135°, and hence the angular velocity of the permanent magnet 41 is particularly low during the period from the rotation angle of 180° to 0°. The same holds true also during a period from the rotation angle of −225° to −135°. As described above, it is preferred that the rate adjustment be performed during a period after the affected portion 313 has reached the position of the air resistance member 15 in the forward direction motion and the reverse direction motion in the forward/reverse rotational motion of the balance wheel 31.

When such a configuration is adopted, deviation of the output timing of the speed governing pulse can be suppressed. As a result, the rate accuracy can be maintained. In FIG. 12, the timing to perform the rate adjustment is indicated by a band-shaped region. As shown in the graph at the upper stage of FIG. 12, the rate adjustment is performed during a period in which the angular velocity of the permanent magnet 41 is low.

[Details of Rate Adjustment Control: Coil Terminal To Which Speed Governing Pulse Is Output]

FIG. 15A shows an example in which the speed governing pulse is output to the coil 43 at a timing at which the permanent magnet 41 rotating in the forward direction is brought to a position of the rotation angle of −90° and a timing at which the permanent magnet 41 rotating in the reverse direction is brought to a position of the rotation angle of 90°.

As illustrated in FIG. 15A, when the permanent magnet 41 is rotated in the forward direction from the rotation angle of −90°, in a case in which the speed governing pulse is output to the first terminal O1 of the coil 43, the permanent magnet 41 receives a repulsive force from the soft magnetic core 42. That is, the rotation of the permanent magnet 41 in the forward direction is braked. Meanwhile, when the permanent magnet 41 is rotated in the reverse direction from the rotation angle of 90°, in a case in which the speed governing pulse is output to the first terminal O1 of the coil 43, the permanent magnet 41 receives a repulsive force from the soft magnetic core 42. That is, the rotation of the permanent magnet 41 in the reverse direction is braked.

Further, as illustrated in FIG. 15B, when the permanent magnet 41 is rotated in the forward direction from the rotation angle of −90°, in a case in which the speed governing pulse is output to the second terminal O2 of the coil 43, the permanent magnet 41 receives an attractive force from the soft magnetic core 42. That is, the rotation of the permanent magnet 41 in the forward direction is accelerated. Meanwhile, when the permanent magnet 41 is rotated in the reverse direction from the rotation angle of 90°, in a case in which the speed governing pulse is output to the second terminal O2 of the coil 43, the permanent magnet 41 receives an attractive force from the soft magnetic core 42. That is, the rotation of the permanent magnet 41 in the reverse direction is accelerated.

As described above, in this embodiment, regardless of whether the rotation is in the forward direction or in the reverse direction in the forward/reverse rotational motion of the permanent magnet 41, when the speed governing pulse is output to the first terminal O1, the rotation of the permanent magnet 41 can be weakened. Meanwhile, when the speed governing pulse is output to the second terminal O2, the rotation of the permanent magnet 41 can be strengthened.

That is, regardless of whether the rotation is in the forward direction or in the reverse direction in the forward/reverse rotational motion of the permanent magnet 41, when the rate is to be adjusted in a delaying direction, the first terminal O1 may be energized, and when the rate is to be adjusted in an advancing direction, the second terminal O2 may be energized.

[Details of Rate Adjustment Control: Operation Flow of Rate Adjustment Control]

Figure 16:
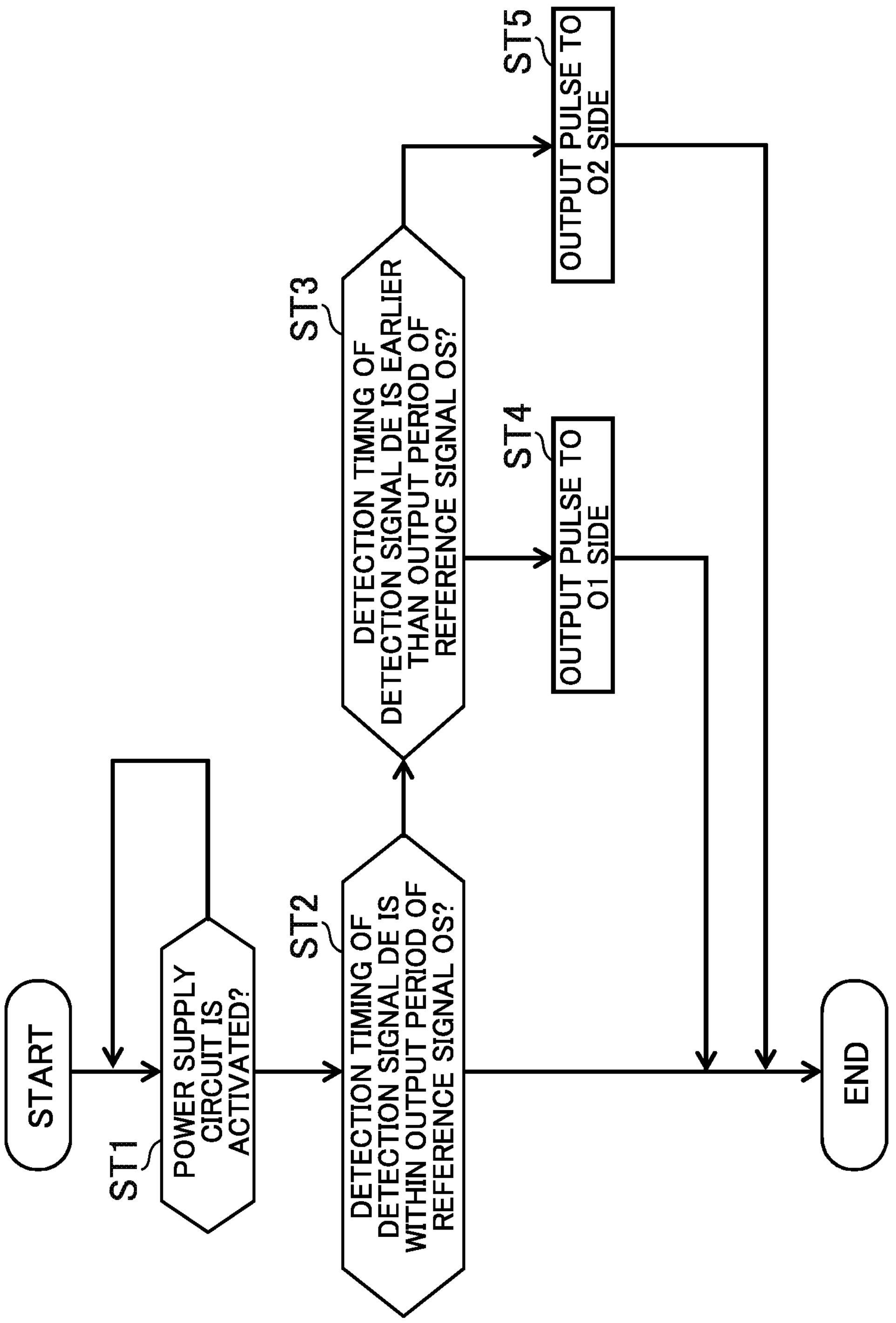
FIG. 16 is a flow chart for illustrating an example of rate adjustment control in the embodiment.

FIG. 16 is a flow chart for illustrating an example of rate adjustment control in this embodiment. In the following description, a signal to be detected by the rotation detecting circuit 45 when a counter-electromotive voltage having a predetermined threshold value Vth or more is generated is defined as a detection signal DE. The control circuit 44 controls the speed governing pulse output circuit 46 based on the detection signal DE detected by the rotation detecting circuit 45 and on the reference signal OS generated by the frequency dividing circuit 47.

The timing at which the detection signal DE is detected is when a large counter-electromotive voltage is caused in the coil 43, that is, when the angular velocity of the permanent magnet 41 is high. Accordingly, it is preferred that the control circuit 44 perform the rate adjustment based on the reference signal OS and the detection voltage caused in the coil 43 due to the motion of the permanent magnet 41 before the affected portion 313 reaches the position of the air resistance member 15 in the forward direction motion and the reverse direction motion in the forward/reverse rotational motion of the balance wheel 31.

In this embodiment, after the power supply circuit 60 is activated through the power generation caused by the motion of the permanent magnet 41 (Y in Step ST1), the rate adjustment control is performed by the rate adjustment means 40.

Figure 17:
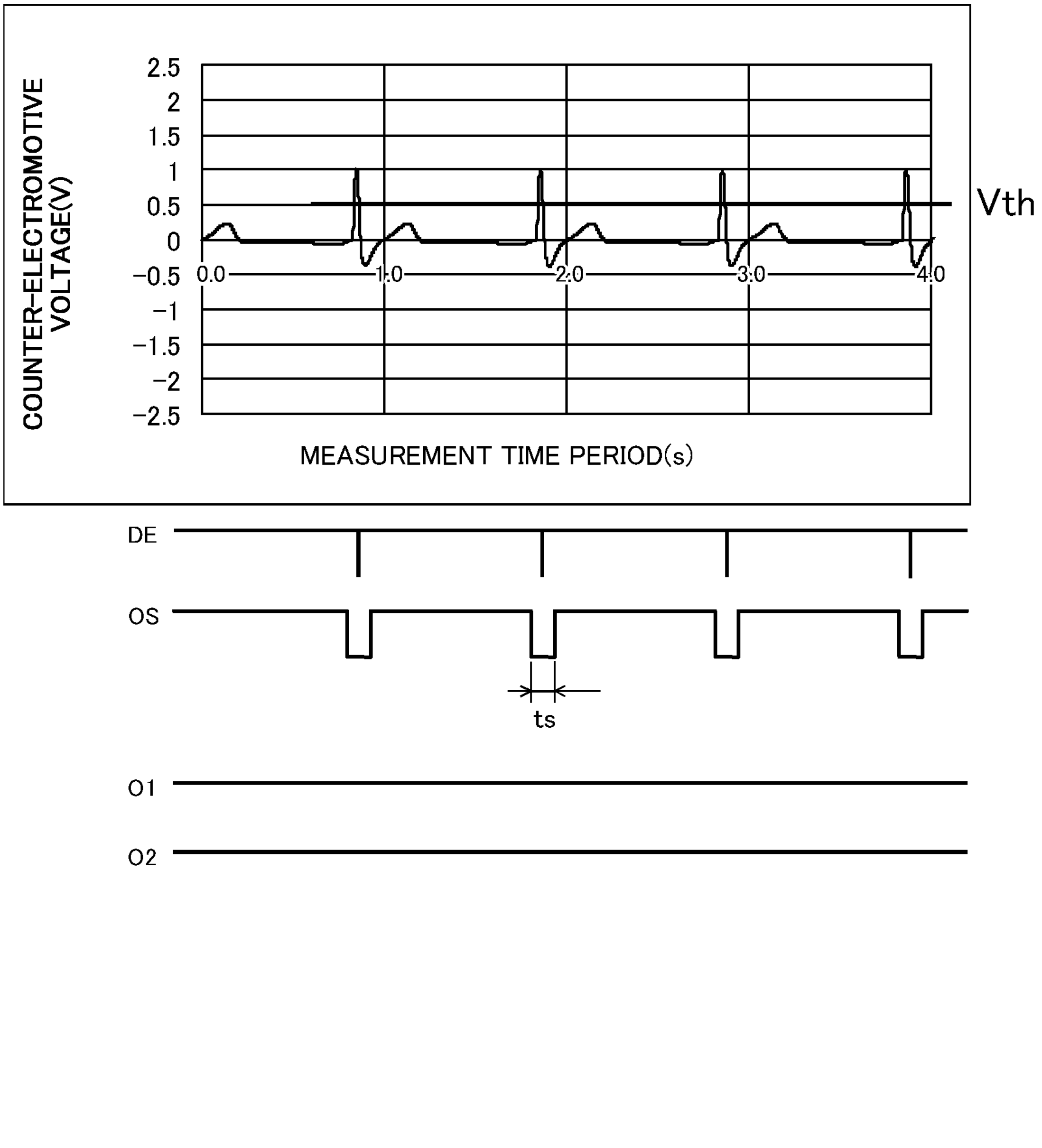
FIG. 17 is a timing chart for illustrating an example of a case in which a detection signal is detected within an output period of a reference signal.

When the detection signal DE is detected within the output period of the reference signal OS (Y in Step ST2), that is, when no rate deviation occurs, the rate adjustment control is ended. FIG. 17 is a timing chart for illustrating an example of a case in which the detection signal is detected within the output period of the reference signal. As illustrated in FIG. 17, in this embodiment, the output period of the reference signal OS is represented by an output period "ts" having a predetermined width.

When the detection signal DE is not detected within the output period of the reference signal OS (N in Step ST2), that is, when a rate deviation occurs, the control circuit 44 determines whether or not the detection timing of the detection signal DE is earlier than the output period of the reference signal OS (Step ST3).

When the detection timing of the detection signal DE is earlier than the output period of the reference signal OS (Y in Step ST3), the control circuit 44 controls the speed governing pulse output circuit 46 so as to output the speed governing pulse to the terminal O1 (Step ST4).

Figure 18:
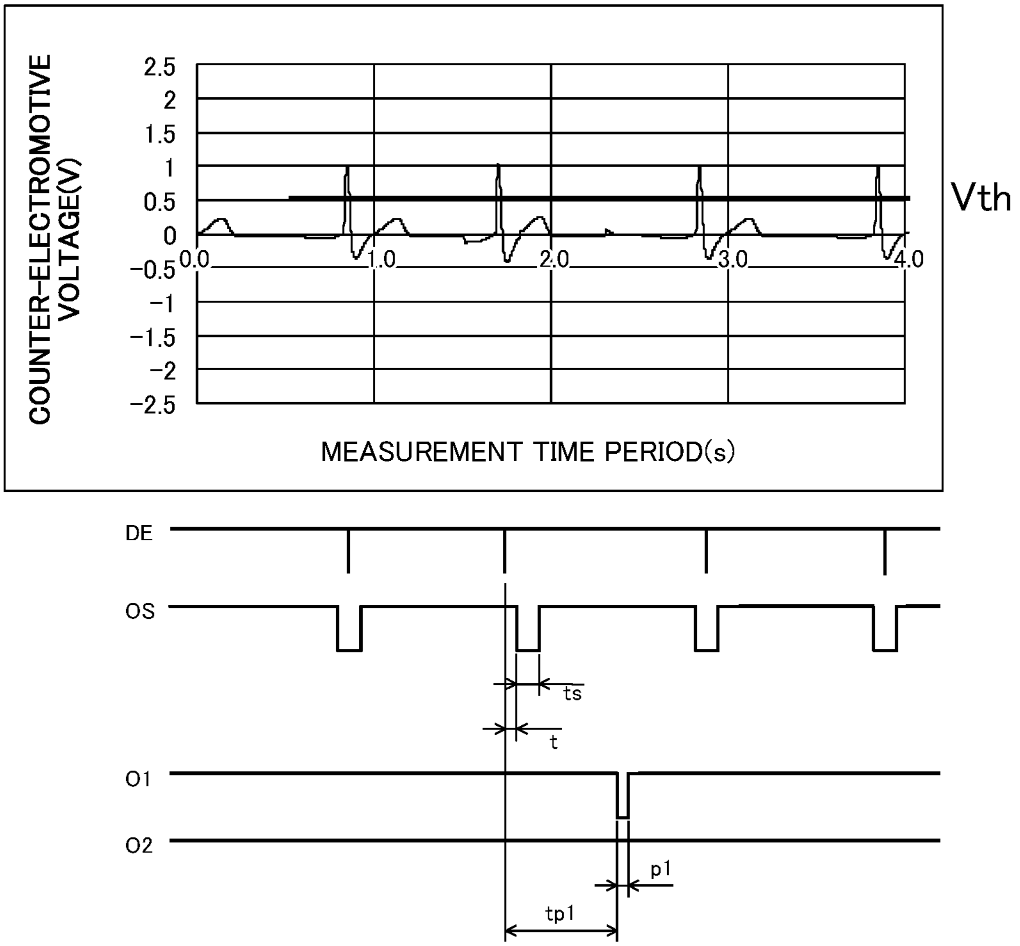
FIG. 18 is a timing chart for illustrating an example of a case in which a detection timing of the detection signal is earlier than the output period of the reference signal.

FIG. 18 is a timing chart for illustrating an example of a case in which the detection timing of the detection signal is earlier than the output period of the reference signal. FIG. 18 shows an example in which, at a timing at which a time period tp1 has elapsed from the detection timing of the detection signal DE, a speed governing pulse p1 is output to the first terminal O1 of the coil 43. As illustrated in FIG. 18, the cycle in which the detection signal DE is detected varies before and after the speed governing pulse p1 is output. That is, the cycle of detection of the detection signal DE detected after the speed governing pulse p1 is output is longer than the cycle of detection of the detection signal DE detected before the speed governing pulse p1 is output. In this manner, after the speed governing pulse p1 is output, the detection signal DE is detected within the output period "ts" of the reference signal OS.

When the detection timing of the detection signal DE is later than the reference signal OS (N in Step ST3), the control circuit 44 controls the speed governing pulse output circuit 46 so as to output the speed governing pulse to the terminal O2 (Step ST5).

Figure 19:
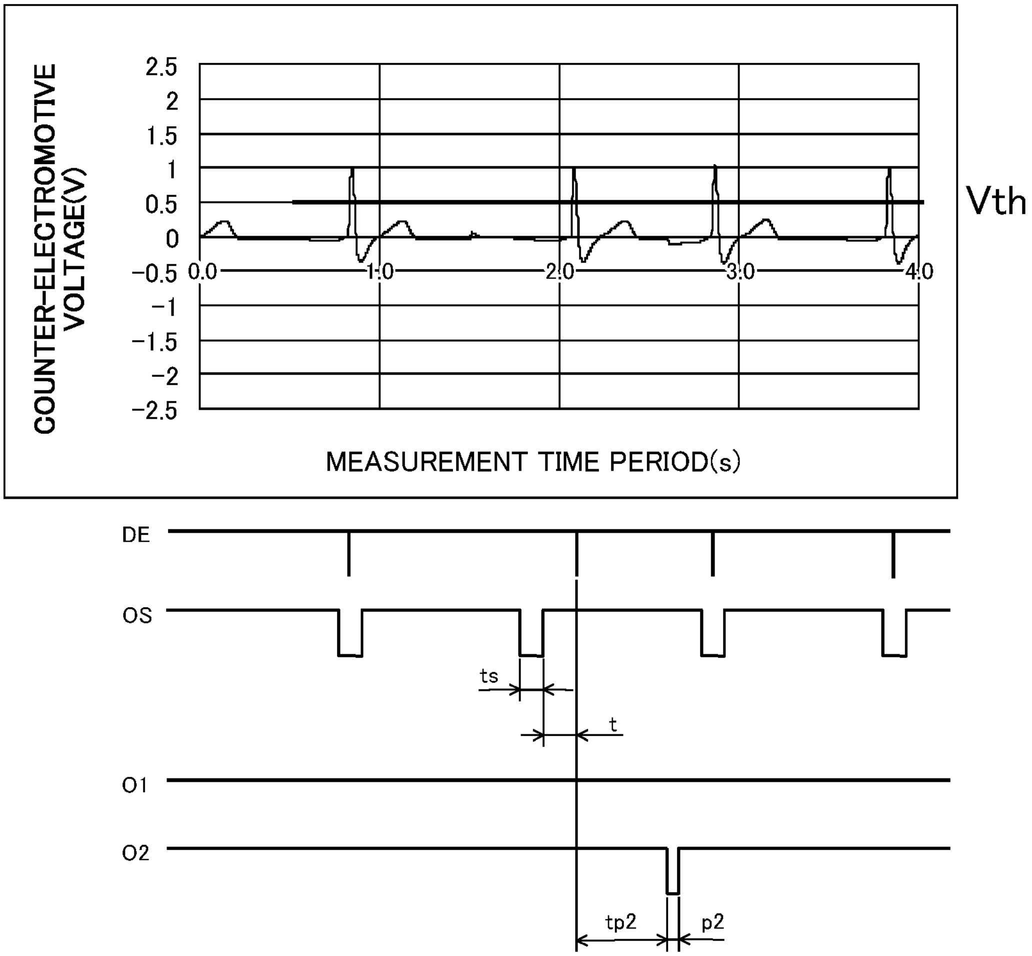
FIG. 19 is a timing chart for illustrating an example of a case in which the timing at which the detection signal is detected is later than the output period of the reference signal.

FIG. 19 is a timing chart for illustrating an example of a case in which the timing at which the detection signal is detected is later than the output period of the reference signal. FIG. 19 shows an example in which, at a timing at which a time period tp2 has elapsed from the detection timing of the detection signal DE, a speed governing pulse p2 is output to the second terminal O2 of the coil 43. As illustrated in FIG. 19, the cycle in which the detection signal DE is detected varies before and after the speed governing pulse p2 is output. That is, the cycle of detection of the detection signal DE detected after the speed governing pulse p2 is output is shorter than the cycle of detection of the detection signal DE detected before the speed governing pulse p2 is output. In this manner, after the speed governing pulse p2 is output, the detection signal DE is detected within the output period "ts" of the reference signal OS.

The speed governing pulse p1 to be output to the first terminal O1 and the speed governing pulse p2 to be output to the second terminal O2 may have different output timings or different output periods. The reason therefor is because, in some cases, the direction of advancing the permanent magnet 41 and the direction of delaying the permanent magnet 41 have different correction amounts due to the output of the speed governing pulse.

[Details of Rate Adjustment Control: Operation Flow of First Modification Example of Rate Adjustment Control]

Figure 20:
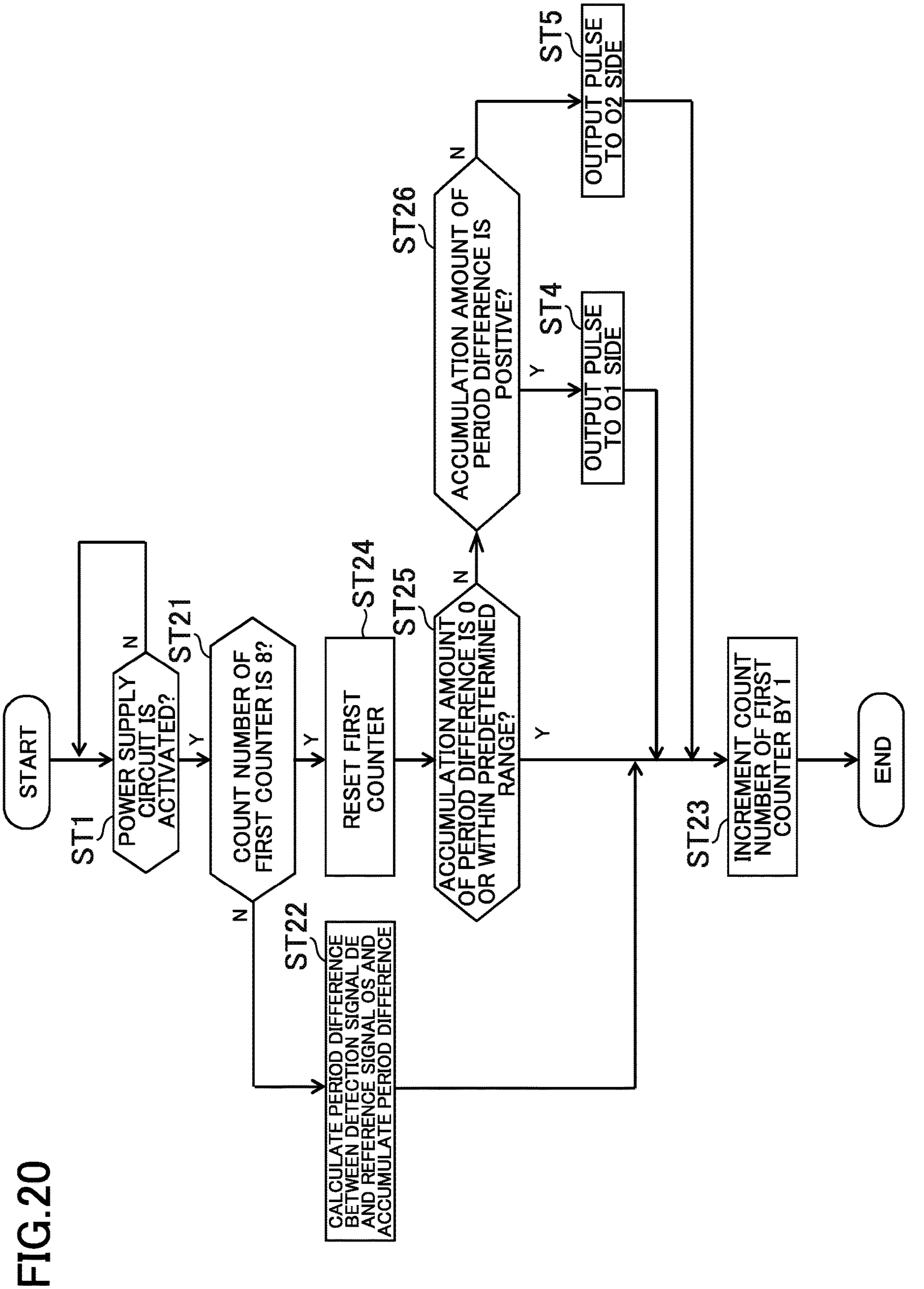
FIG. 20 is a flow chart for illustrating a first modification example of the rate adjustment control.
Figure 21:
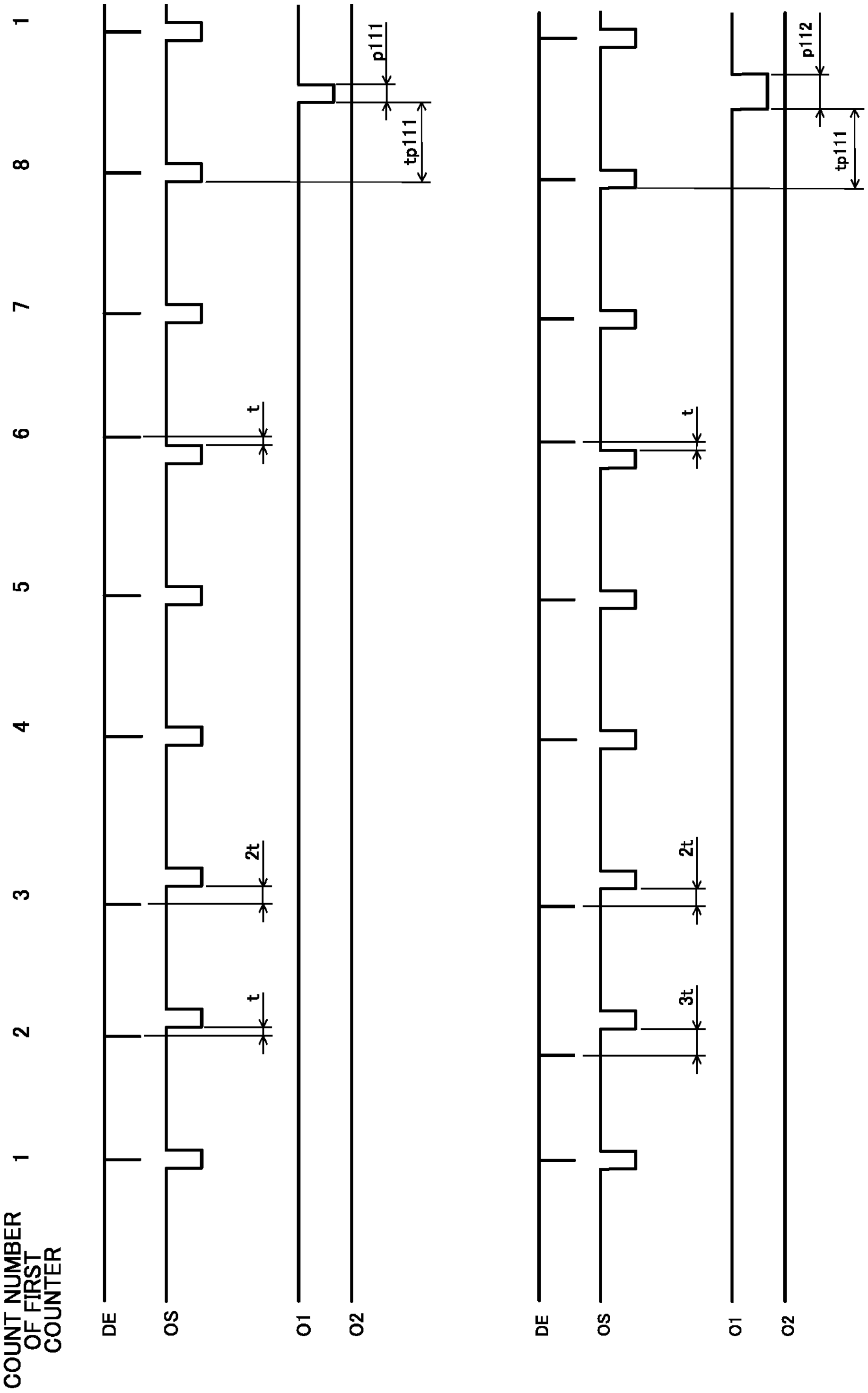
FIG. 21 is a timing chart for illustrating the detection signal and the reference signal in the first modification example of the rate adjustment control.

Next, with reference to FIG. 20 and FIG. 21, a first modification example of the rate adjustment control is described. FIG. 20 is a flow chart for illustrating the first modification example of the rate adjustment control.

In this example, it is preferred that the rate adjustment means 40 include a first counter and a second counter. The first counter counts the number of times of detection of the detection signal DE. The second counter is an accumulating unit for accumulating a period difference between the detection signal DE and the reference signal OS (deviation amount of the detection timing of the detection signal DE with respect to the output timing of the reference signal OS).

In the first modification example of the rate adjustment control, after the power supply circuit 60 is activated through the power generation caused by the motion of the permanent magnet 41 (Y in Step ST1), the rate adjustment control is performed by the rate adjustment means 40.

The control circuit 44 determines whether or not the forward/reverse rotational motion of the balance wheel 31 (permanent magnet 41) is the eighth forward/reverse rotational motion. Specifically, the control circuit 44 determines whether or not the count number of the first counter is 8 (Step ST21).

When the count number of the first counter is not 8 (N in Step ST21), a period difference between the detection signal DE and the reference signal OS is calculated, and the period difference is accumulated (Step ST22). After that, the count number of the first counter is incremented by 1 (Step ST23).

Meanwhile, when the count number of the first counter is 8 (Y in Step ST21), the first counter is reset, and the count number is set to 0 (Step ST24).

Then, the control circuit 44 determines whether or not the accumulation amount of the period difference between the detection signal DE and the reference signal OS is 0 or falls within a predetermined range (Step ST25). When the accumulation amount of the period difference between the detection signal DE and the reference signal OS is 0 or falls within a predetermined range, the control circuit 44 increments the count number of the first counter by 1 without performing the rate adjustment (Step ST23).

When the accumulation amount of the period difference between the detection signal DE and the reference signal OS is positive (N in Step ST25 and Y in Step ST26), the control circuit 44 controls the speed governing pulse output circuit 46 so as to output the speed governing pulse to the first terminal O1 (Step ST4).

Meanwhile, when the accumulation amount of the period difference between the detection signal DE and the reference signal OS is negative (N in Step ST25 and N in Step ST26), the control circuit 44 controls the speed governing pulse output circuit 46 so as to output the speed governing pulse to the second terminal O2 (Step ST5).

The upper stage of FIG. 21 shows an example in which, when the first counter is 2, the detection timing of the detection signal DE is earlier by "t" than the output period of the reference signal OS, when the first counter is 3, the detection timing of the detection signal DE is earlier by 2*t* than the output period of the reference signal OS, and when the first counter is 6, the detection timing of the detection signal DE is later by "t" than the output period of the reference signal OS. In this example, the accumulation amount of the period difference until the first counter becomes 8 is +2t. That is, the timing at which the detection signal DE is detected is earlier by 2*t* in total than the reference signal OS. Accordingly, the control circuit 44 outputs the speed governing pulse to the first terminal O1 so that the rate is delayed.

The lower stage of FIG. 21 shows an example in which, when the first counter is 2, the detection timing of the detection signal DE is earlier by "3t" than the output period of the reference signal OS, when the first counter is 3, the detection timing of the detection signal DE is earlier by 2*t* than the output period of the reference signal OS, and when the first counter is 6, the detection timing of the detection signal DE is later by "t" than the output period of the reference signal OS. In this example, the accumulation amount of the period difference until the first counter becomes 8 is +4t. That is, the timing at which the detection signal DE is detected is earlier by 4*t* in total than the reference signal OS. Accordingly, the speed governing pulse is output to the first terminal O1 so that the rate is delayed.

Figure 22:
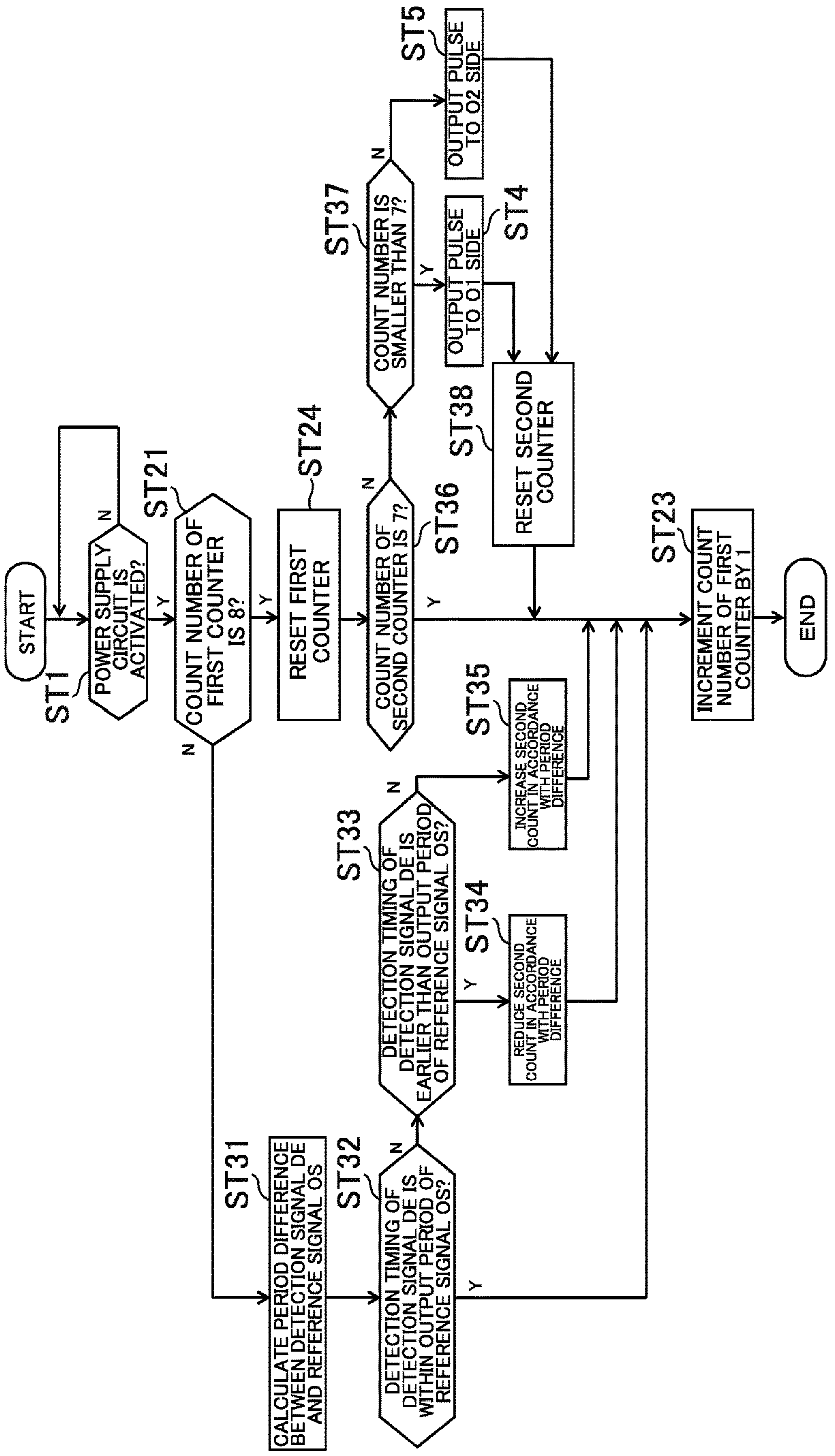
FIG. 22 is a flow chart for illustrating a second modification example of the rate adjustment control.

Further, in the example of the lower stage of FIG. 21, the accumulation amount of the period difference is larger than that of the example of the upper stage of FIG. 21, and hence the output period of the speed governing pulse is increased. Specifically, an output period p112 of the speed governing pulse shown at the lower stage of FIG. 22 is set to be longer than an output period p111 of the speed governing pulse shown at the upper stage of FIG. 22. In both of the examples of the upper stage and the lower stage of FIG. 22, the speed governing pulse is output at a timing at which tp111 has elapsed from the output of the reference signal OS which is output when the first counter is 8. That is, regardless of the output period of the speed governing pulse, the output timing of the speed governing pulse is the same.

In the first modification example of the rate adjustment control described above, the rate adjustment is not performed every seconds, and hence the number of times the speed governing pulse is output can be decreased. As a result, the power consumption can be reduced.

[Details of Rate Adjustment Control: Operation Flow of Second Modification Example of Rate Adjustment Control]

Figure 23:
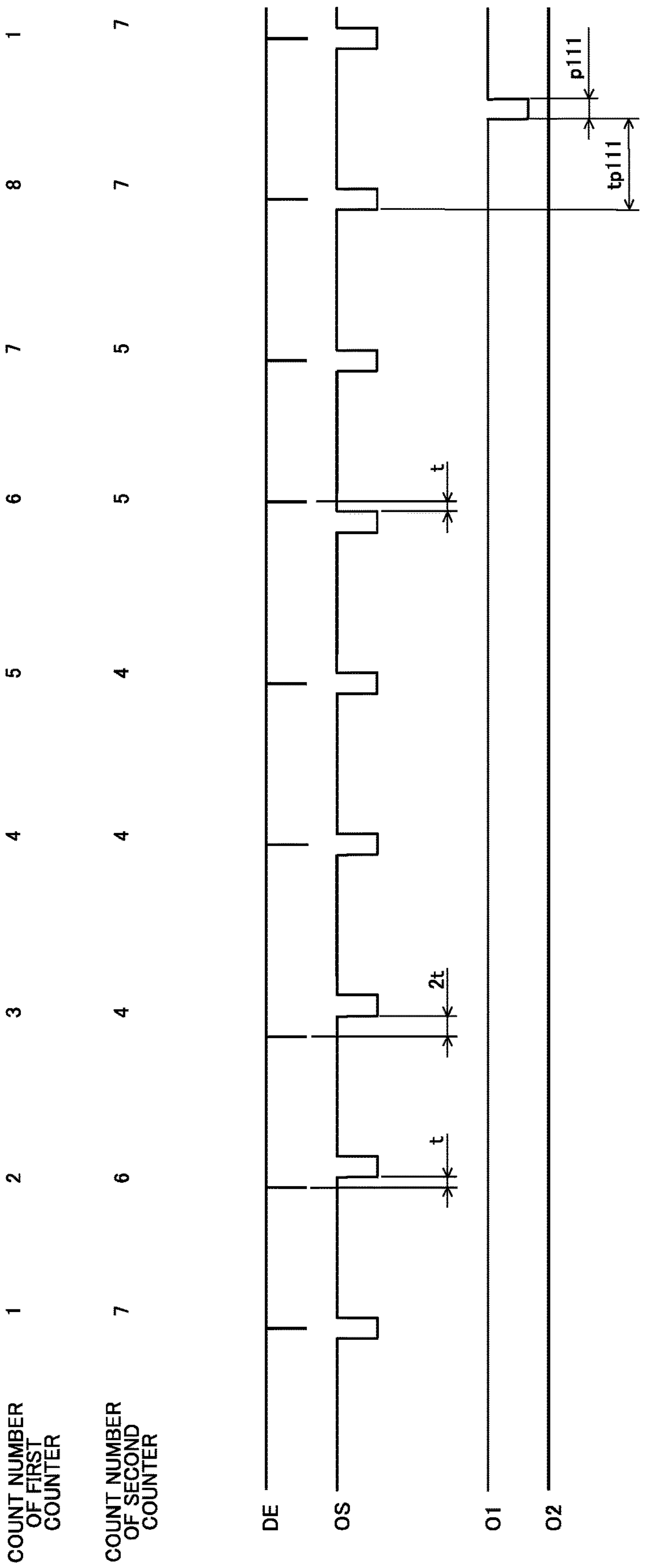
FIG. 23 is a timing chart for illustrating the detection signal and the reference signal in the second modification example of the rate adjustment control.

Next, with reference to FIG. 22 and FIG. 23, a second modification example of the rate adjustment control is described. FIG. 22 is a flow chart for illustrating the second modification example of the rate adjustment control.

In this example, it is preferred that the rate adjustment means 40 include a first counter and a second counter. The first counter counts the number of times of detection of the detection signal DE. The second counter is an accumulating unit for accumulating a period difference between the detection signal DE and the reference signal OS (deviation amount of the detection timing of the detection signal DE with respect to the output timing of the reference signal OS). In the second modification example of the rate adjustment control, the count number becomes 7 when the second counter is reset.

In the second modification example of the rate adjustment control, after the power supply circuit 60 is activated through the power generation caused by the motion of the permanent magnet 41 (Y in Step ST1), the rate adjustment control is performed by the rate adjustment means 40.

The control circuit 44 determines whether or not the forward/reverse rotational motion of the balance wheel 31 (permanent magnet 41) is the eighth forward/reverse rotational motion. Specifically, the control circuit 44 determines whether or not the count number of the first counter is 8 (Step ST21). When the count number of the first counter is not 8 (N in Step ST21), the control circuit 44 calculates a period difference between the detection signal DE and the reference signal OS (Step ST31).

Then, when the detection timing of the detection signal DE is within the output period of the reference signal OS (Y in Step ST32), the control circuit 44 increments the count number of the first counter by 1 without performing the rate adjustment (Step ST23).

When the detection timing of the detection signal DE is outside of the output period of the reference signal OS (N in Step ST32), the control circuit 44 determines whether or not the detection timing of the detection signal DE is earlier than the output period of the reference signal OS (Step ST33).

When the detection timing of the detection signal DE is earlier than the output period of the reference signal OS (Y in Step ST33), the second count is reduced in accordance with this period difference (Step ST34). When the detection timing of the detection signal DE is later than the output period of the reference signal OS (N in Step ST33), the second count is increased in accordance with this period difference (Step ST35). After that, the count number of the first counter is incremented by 1 (Step ST23).

When the count number of the first counter is 8 (Y in Step ST21), the first counter is reset, and the count number is set to 0 (Step ST24).

Then, the control circuit 44 determines whether or not the count number of the second counter is 7 (Step ST36). When the count number of the second counter is 7 (Y in Step ST36), the control circuit 44 increments the count number of the first counter by 1 without performing the rate adjustment (Step ST23).

When the count number of the second counter is not 7 (N in Step ST36), the control circuit 44 determines whether or not the count number of the second counter is smaller than 7 (Step ST37). When the count number of the second counter is smaller than 7 (Y in Step ST37), the control circuit 44 controls the speed governing pulse output circuit 46 so as to output the speed governing pulse to the first terminal O1 (Step ST4). When the count number of the second counter is larger than 7 (N in Step ST37), the control circuit 44 controls the speed governing pulse output circuit 46 so as to output the speed governing pulse to the second terminal O2 (Step ST5). After that, the count number of the second counter is reset so that the count number becomes 7 (Step ST38).

In the second modification example of the rate adjustment control described above, the rate adjustment is not performed every seconds, and hence the number of times the speed governing pulse is output can be decreased. As a result, the power consumption can be reduced.

FIG. 23 shows an example in which, when the first counter is 2, the detection timing of the detection signal DE is earlier by "t" than the output period of the reference signal OS, when the first counter is 3, the detection timing of the detection signal DE is earlier by 2*t* than the output period of the reference signal OS, and when the first counter is 6, the detection timing of the detection signal DE is later by "t" than the output period of the reference signal OS. In this example, the second counter has become 5 by the time when the first counter becomes 8. That is, the timing at which the detection signal DE is detected is earlier by 2*t* in total than the reference signal OS. Accordingly, the control circuit 44 outputs the speed governing pulse to the first terminal O1 so that the rate is delayed.

Figure 24:
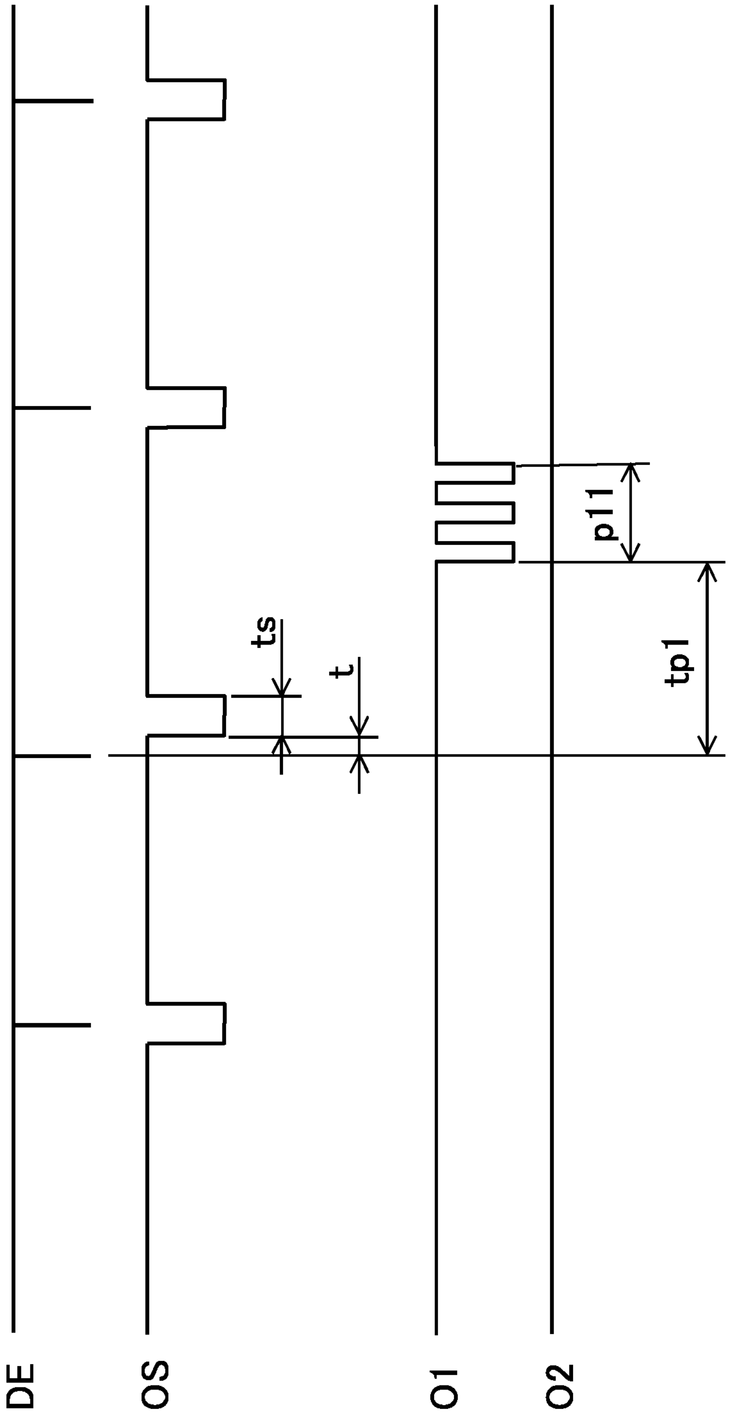
FIG. 24 is a chart for illustrating an example of the speed governing pulse.

The speed governing pulse is not limited to a single pulse, and may be formed of a pulse group including a plurality of single pulses as illustrated in FIG. 24. When the speed governing pulse is formed of a pulse group, manufacturing variations and drive variations of the speed governing mechanism 30 can be absorbed. In this case, instead of changing the output period of the speed governing pulse as illustrated in FIG. 21, a duty ratio of the speed governing pulse may be changed so that the attractive force or the repulsive force acting on the permanent magnet 41 is controlled. The duty ratio indicates a ratio in which the pulse is output within a predetermined period. FIG. 24 shows an example of a speed governing pulse having a duty ratio of 3/5.

[Details of Rate Adjustment Control: Rate Adjustment Control At Time When Power Supply Circuit Starts To Activate From Stop State]

Figure 25:
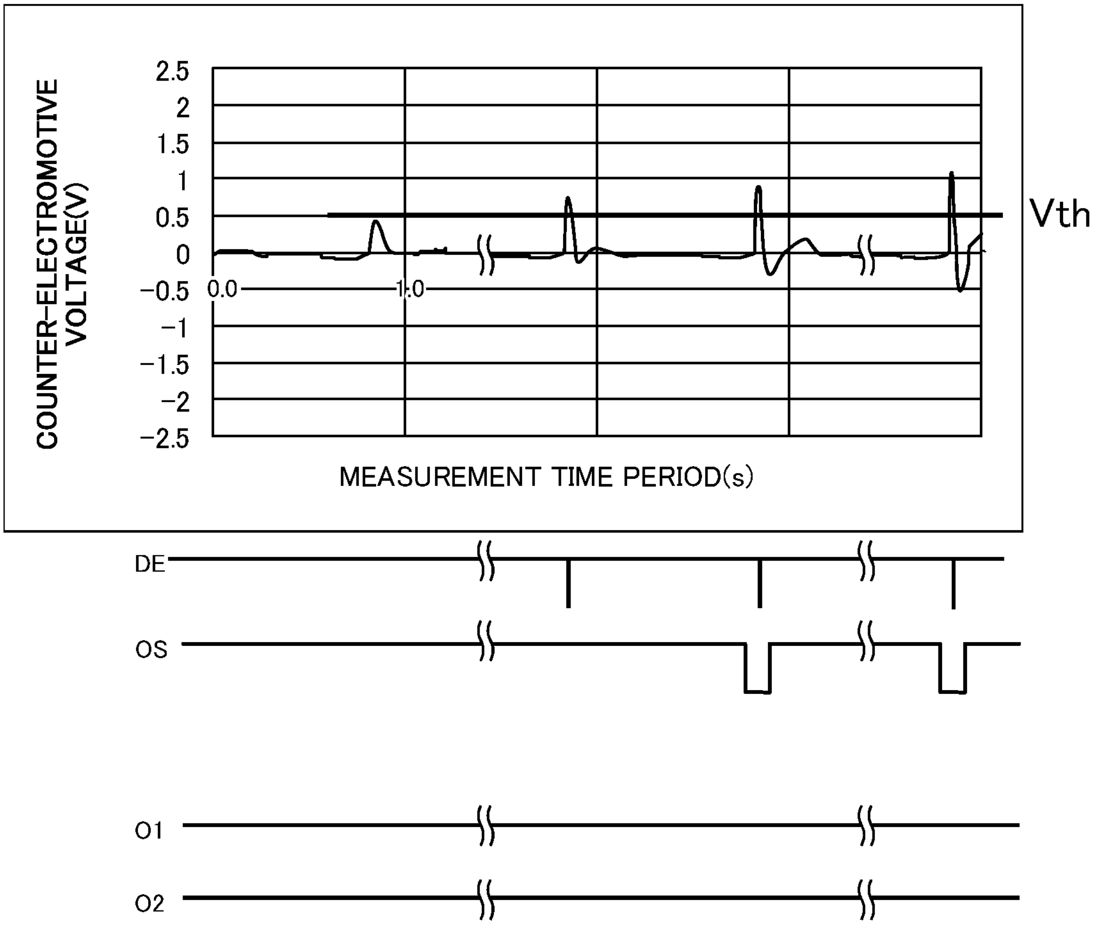
FIG. 25 is a timing chart for illustrating an example of rate adjustment control at the time when a power supply circuit starts to activate from a stop state.

FIG. 25 is a timing chart for illustrating an example of rate adjustment control at the time when the power supply circuit starts to activate from a stop state.

As described above, after the power supply circuit 60 is activated through the power generation caused by the motion of the permanent magnet 41, the rate adjustment control is performed by the rate adjustment means 40. Accordingly, it is preferred that the output of the reference signal OS to be used in the rate adjustment control be started after the power supply circuit 60 is activated. For example, as illustrated in FIG. 25, it is preferred that the output of the reference signal OS be started through use of, as a starting point, a timing at which the detection signal DE is first detected. FIG. 25 shows a state in which the peak of the counter-electromotive voltage is gradually increased, and the output of the reference signal OS is started through use of, as the starting point, a timing at which the counter-electromotive voltage first exceeds the threshold value Vth. That is, FIG. 25 shows a state in which the output of the reference signal OS is started from the next timing (after one second) of the timing at which the counter-electromotive voltage first exceeds the threshold value Vth. However, the present invention is not limited thereto, and the output of the reference signal OS may be started in consideration of an unstable rotation state caused immediately after the power supply circuit 60 is activated, through use of, as a starting point, a time point at which the detection signal DE is detected a plurality of times (predetermined number of times).

[Details of Rate Adjustment Control: Rate Adjustment Control Considering Influence of Disturbance]

Figure 26:
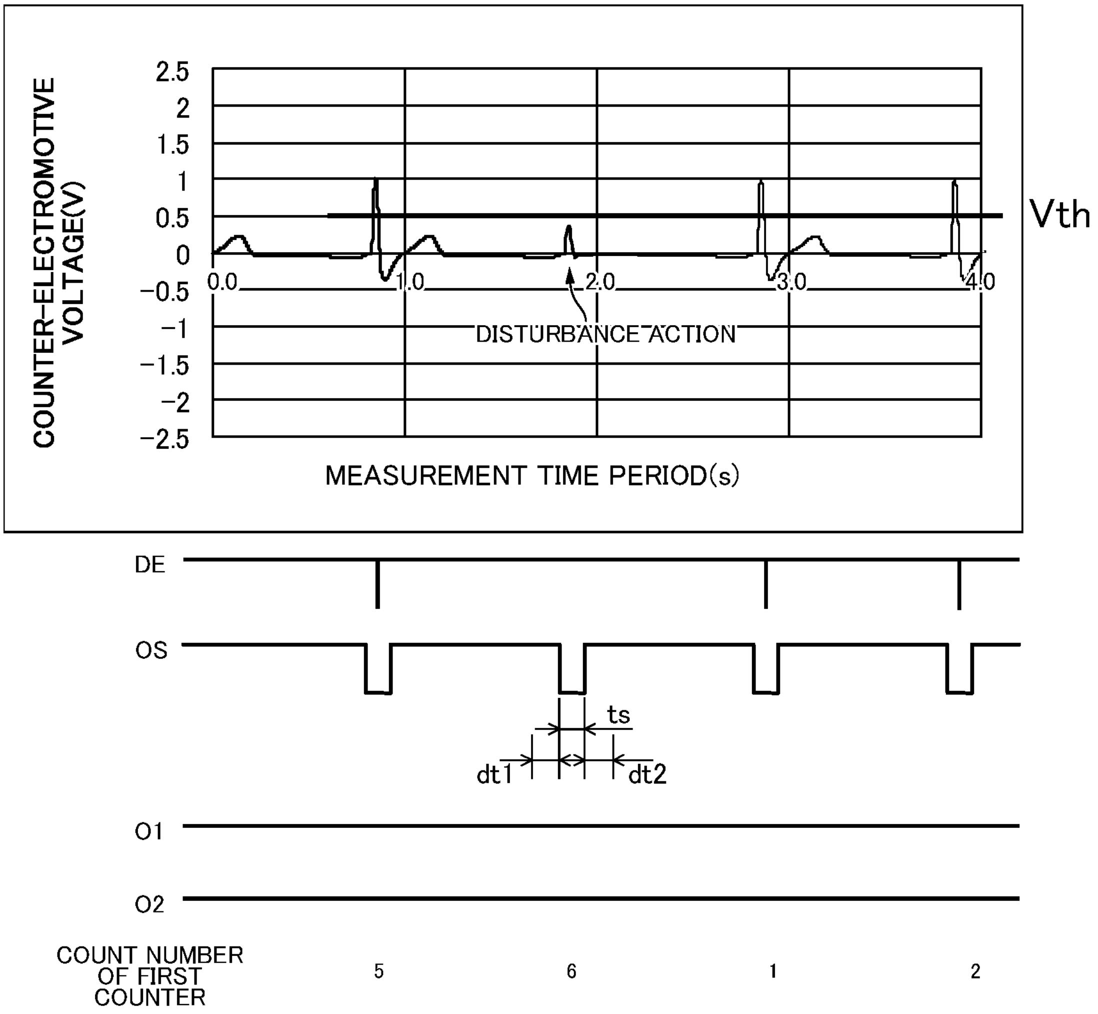
FIG. 26 is a timing chart for illustrating an example of rate adjustment control considering an influence of a disturbance.
Figure 27:
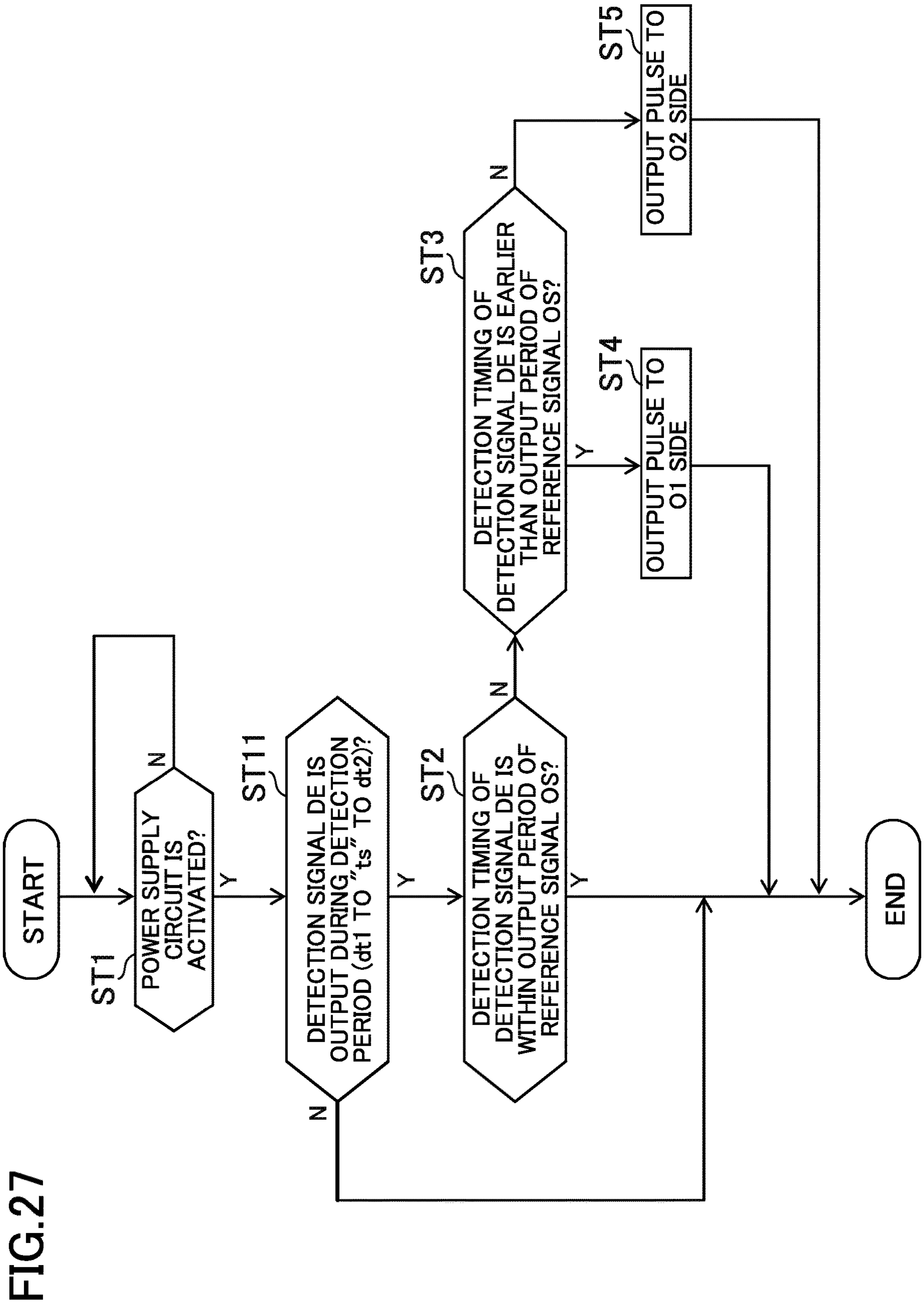
FIG. 27 is a flow chart for illustrating the example of the rate adjustment control considering the influence of the disturbance.
Figure 28:
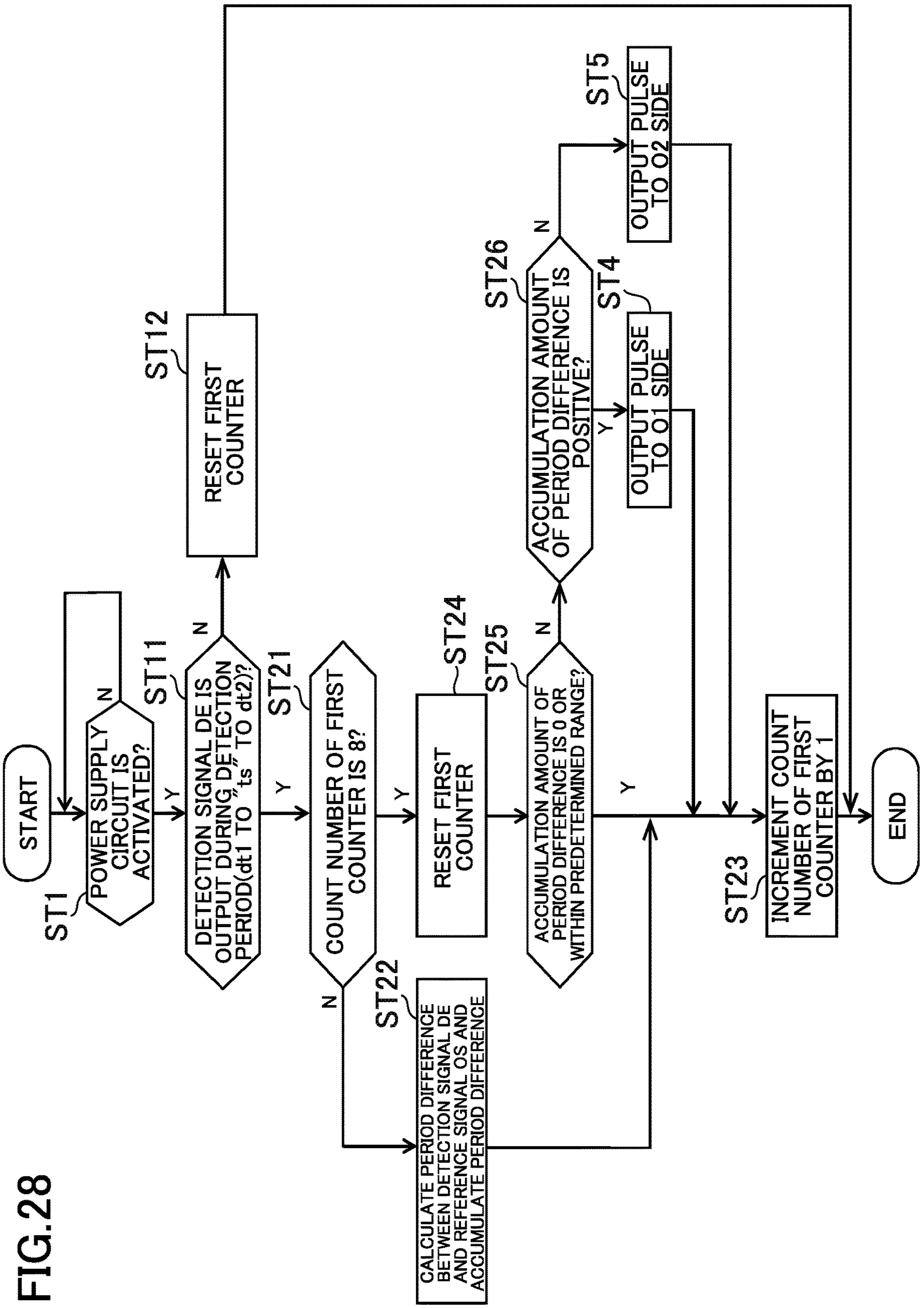
FIG. 28 is a flow chart for illustrating rate adjustment control considering an influence of a disturbance in the first modification example of the rate adjustment control illustrated in FIG. 20.

FIG. 26 is a timing chart for illustrating an example of rate adjustment control considering an influence of a disturbance. FIG. 27 is a flow chart for illustrating the example of the rate adjustment control considering the influence of the disturbance. FIG. 28 is a flow chart for illustrating rate adjustment control considering an influence of a disturbance in the first modification example of the rate adjustment control illustrated in FIG. 20.

When an external magnet comes close to the mechanical timepiece 1 or an impact is applied to the mechanical timepiece 1, a disturbance momentarily acts so that the counter-electromotive voltage is disturbed. Thus, in some cases, the detection signal DE cannot be detected. In those cases, the control circuit 44 erroneously determines that the rate is greatly delayed.

Accordingly, as illustrated in FIG. 26, the rate adjustment may be prevented from being performed when no detection signal DE is detected in a predetermined period including periods before and after the output period of the reference signal OS. The upper stage of FIG. 26 shows a state in which, due to the action of the disturbance, no detection signal DE is detected near the measurement time period of 2.0 [s]. Specifically, the upper stage of FIG. 26 shows a state in which no detection signal is detected in the output period "ts" of the reference signal OS, a period dt1 immediately before the output period "ts," and a period dt2 immediately after the output period "ts." FIG. 26 shows an example in which the period dt1 and the period dt2 have the same length, but those periods may have different lengths. Further, it is preferred that the speed governing pulse be output so as to avoid the period dt1 and the period dt2. The reason therefor is because, when the speed governing pulse is output, a coil waveform (waveform of the counter-electromotive voltage) is disturbed, and thus there is a possibility that the detection accuracy of the detection signal DE is reduced.

The flow chart of FIG. 27 shows an example in which the rate adjustment is performed when, after the power supply circuit 60 is activated through the power generation caused by the motion of the permanent magnet 41 (Y in Step ST1), the detection signal DE is output (detected) during a predetermined detection period (dt1 to "ts" to dt2) (Y in Step ST11), while no rate adjustment is performed when no detection signal DE is output (detected) during the predetermined detection period (dt1 to "ts" to dt2) (N in Step ST11). Each step illustrated in FIG. 27 is the same as that illustrated in FIG. 16 except for Step ST11, and hence details of the description thereof are omitted.

The flow chart of FIG. 28 shows an example in which the rate adjustment is performed when, after the power supply circuit 60 is activated through the power generation caused by the motion of the permanent magnet 41 (Y in Step ST1), the detection signal DE is output (detected) during the predetermined detection period (dt1 to "ts" to dt2) (Y in Step ST11), while the first counter is reset (ST12) without performing rate adjustment when no detection signal DE is output (detected) during the predetermined detection period (dt1 to "ts" to dt2) (N in Step ST11). As described above, when an influence of a disturbance or the like is received, the first counter is reset so that the count of the number of times of detection of the detection signal DE is re-started.

Each step illustrated in FIG. 28 is the same as that illustrated in FIG. 20 except for Step ST11 and Step ST12, and hence details of the description thereof are omitted.

When the configurations illustrated in FIG. 26 to FIG. 28 are adopted, highly-accurate rate adjustment is allowed even when a disturbance is applied. Further, unnecessary output of the speed governing pulse can be suppressed, and hence the power consumption can be saved.

[Details of Rate Adjustment Control: Rate Adjustment Control in Case in Which Failure of Detection of Detection Signal Occurs Successively]

Figure 29:
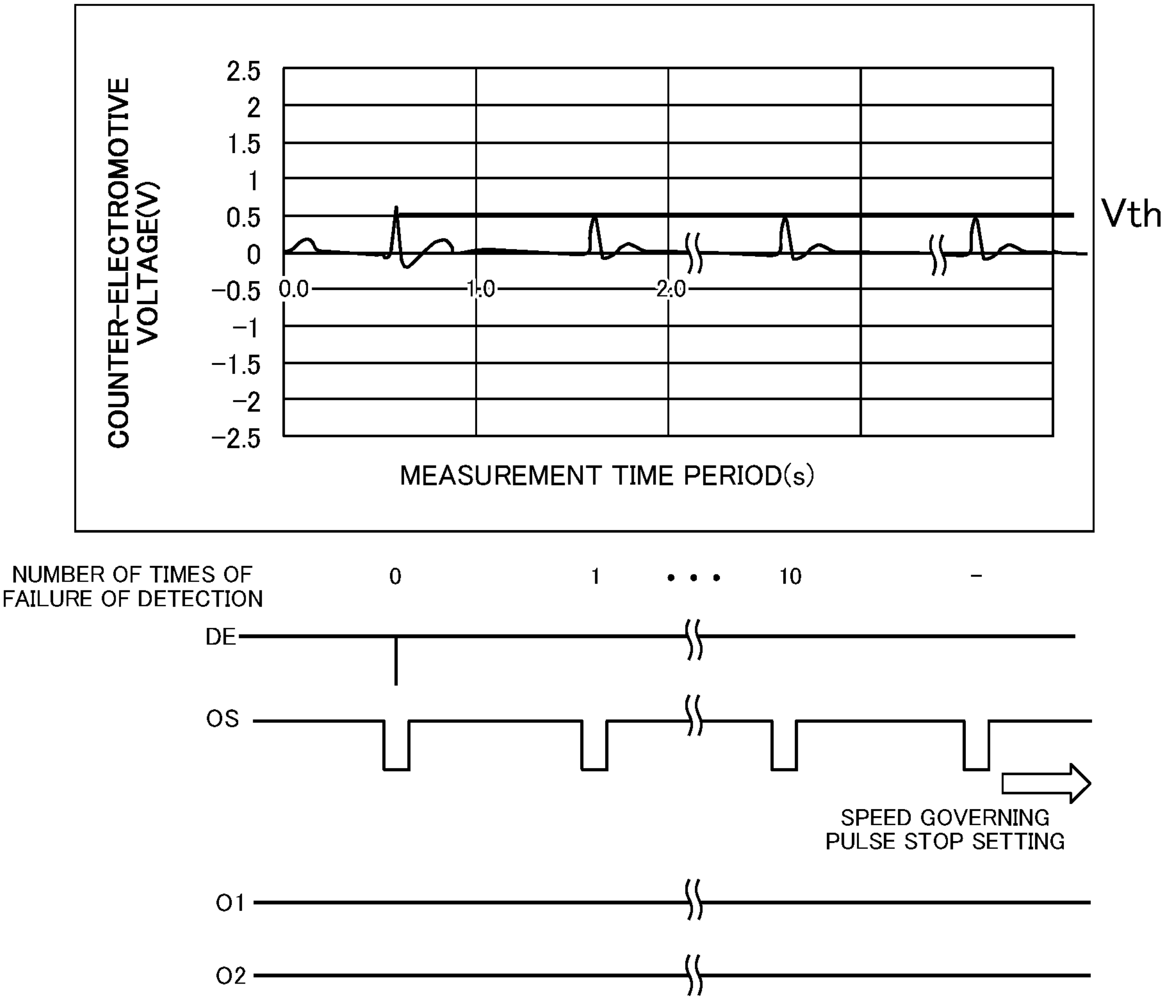
FIG. 29 is a timing chart for illustrating an example of rate adjustment control in a case in which failure of the detection of the detection signal occurs successively.
Figure 30:
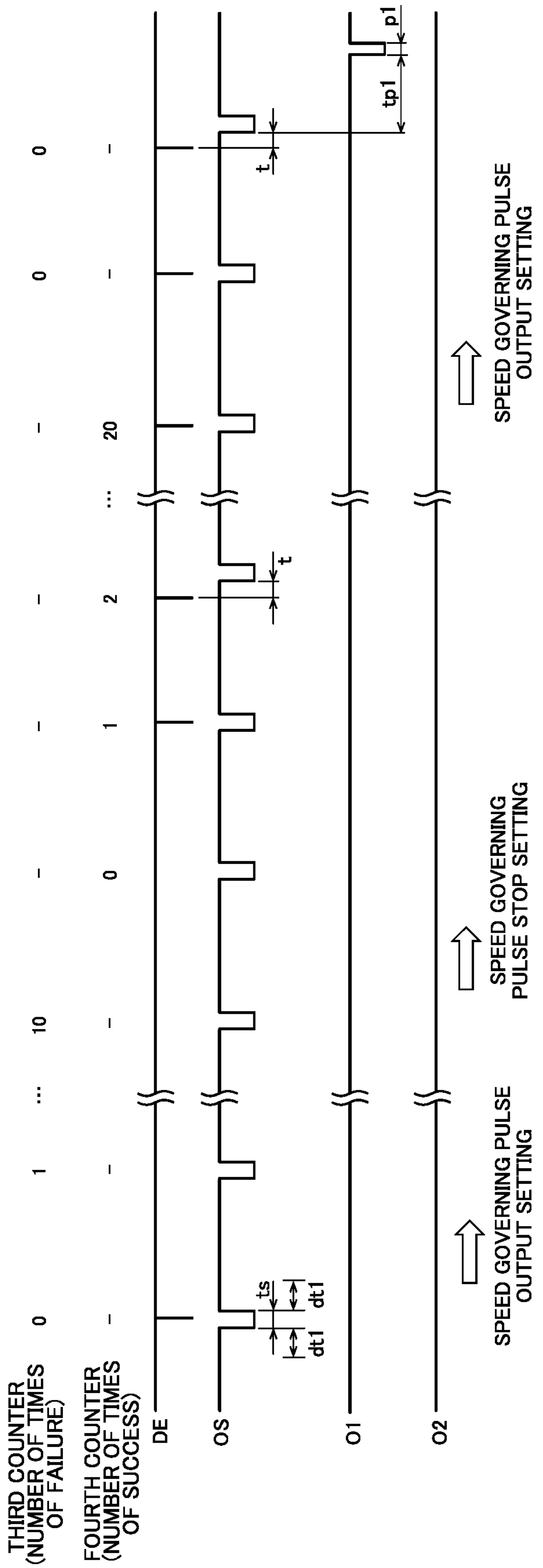
FIG. 30 is a timing chart for illustrating an example of rate adjustment control in a case in which failure of the detection of the detection signal occurs successively.
Figure 31:
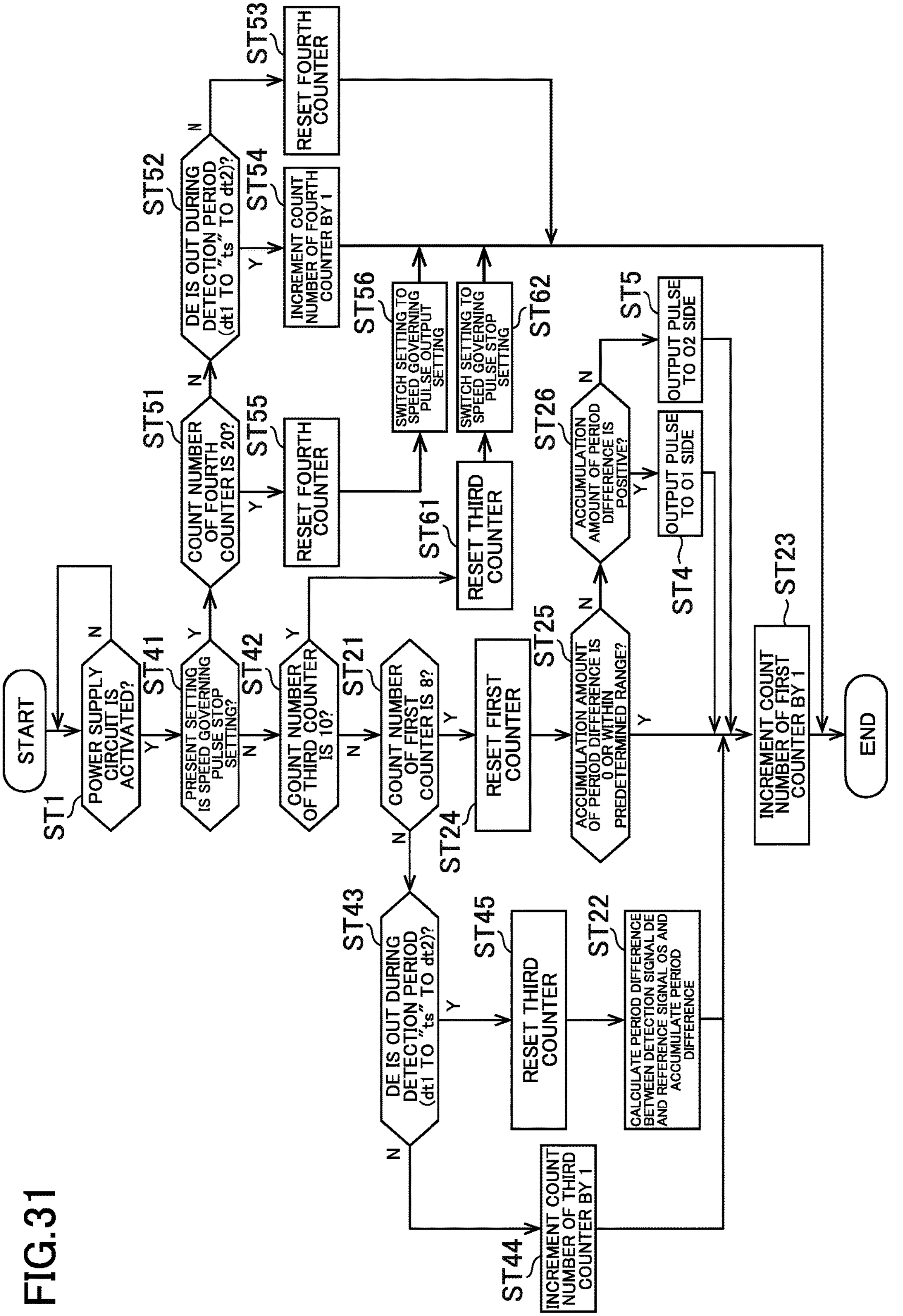
FIG. 31 is a flow chart for illustrating an example of rate adjustment control assuming that failure of the detection of the detection signal occurs successively.

FIG. 29 and FIG. 30 are each a timing chart for illustrating an example of rate adjustment control in a case in which failure of the detection of the detection signal occurs successively. FIG. 31 is a flow chart for illustrating an example of rate adjustment control assuming that failure of the detection of the detection signal occurs successively.

As the power spring 11 is unwound, a rotational force of the rotor 41 is weakened, and, in some cases, the counter-electromotive voltage does not exceed the threshold value Vth. In those cases, the power generation amount is reduced, and the charged amount of the capacitor C is also reduced. That is, the mechanical timepiece 1 is brought into a state of being liable to be stopped, and the power supply circuit 60 is brought into a state of being liable to be stopped. In such cases, it is preferred that no speed governing pulse be output for power saving. That is, it is preferred that no rate adjustment be performed.

In view of the above, in the example illustrated in FIG. 29 and FIG. 30, the following configuration is adopted. That is, through use of a third counter and a fourth counter, a "speed governing pulse output setting" for outputting the speed governing pulse and a "speed governing pulse stop setting" for stopping the output of the speed governing pulse are switched. The third counter counts the number of times the detection of the detection signal DE has successively failed. The fourth counter counts the number of times the detection of the detection signal DE has successively succeeded.

Specifically, there is adopted a configuration in which, when the third counter reaches 10, that is, when the detection of the detection signal DE has successively failed 10 times, the setting is switched to the speed governing pulse stop setting. Further, there is adopted a configuration in which, when the fourth counter reaches 20, that is, when the detection of the detection signal DE has successively succeeded 20 times, the setting is switched to the speed governing pulse output setting. The count number serving as a trigger for switching the setting is merely an example, and the present invention is not limited to the represented count number.

FIG. 29 shows an example in which the peak of the counter-electromotive voltage is small, and the detection of the detection signal DE has successively failed 10 times so that the setting is switched to the speed governing pulse stop setting.

FIG. 30 shows an example in which the detection of the detection signal DE has successively failed 10 times so that the setting is switched to the speed governing pulse stop setting, and then the detection of the detection signal DE has successively succeeded 20 times so that the setting is switched to the speed governing pulse output setting, resulting in outputting the speed governing pulse p1. Whether or not the detection of the detection signal DE has succeeded is determined based on, similarly to the examples illustrated in FIG. 26 to FIG. 28, whether or not the detection signal DE is output (detected) during the predetermined detection period (dt1 to "ts" to dt2).

In the flow chart of FIG. 31, after the power supply circuit 60 is activated through the power generation caused by the motion of the permanent magnet 41 (Y in Step ST1), it is determined whether or not the present setting is the speed governing pulse stop setting (Step ST41). It is preferred that whether or not the present setting is the speed governing pulse stop setting be determined based on, for example, whether or not a speed governing pulse stop flag is on.

When the present setting is not the speed governing pulse stop setting (N in Step ST41), the control circuit 44 determines whether or not the third counter is 10 (Step ST42). That is, the control circuit 44 determines whether or not the detection of the detection signal DE has successively failed 10 times. When the third counter is not 10 (N in Step ST42), the control circuit 44 determines whether or not the first counter is 8 (Step ST21). That is, the control circuit 44 determines whether or not the number of times of detection of the detection signal DE is 8.

When the first counter is 8 (Y in Step ST21), Step ST24 and subsequent process steps illustrated in FIG. 20 are performed. Meanwhile, when the first counter is not 8 (N in Step ST21), the control circuit 44 determines whether or not the detection signal DE is output (detected) during the predetermined detection period (dt1 to "ts" to dt2) (Step ST43). When no detection signal DE is output (detected) during the predetermined detection period (dt1 to "ts" to dt2) (N in Step ST43), the count number of the third counter is incremented by 1 (Step ST44), and the count number of the first counter is incremented by 1 (Step ST23). Meanwhile, when the detection signal DE is output (detected) during the predetermined detection period (dt1 to "ts" to dt2) (Y in Step ST43), the third counter is reset (Step ST45), and the period difference between the detection signal DE and the reference signal OS is calculated so that the period difference is accumulated (Step ST22).

Further, in Step ST41, when the present setting is the speed governing pulse stop setting (Y in Step ST41), the control circuit 44 determines whether or not the count number of the fourth counter is 20 (Step ST51). That is, the control circuit 44 determines whether or not the detection of the detection signal DE has successively succeeded 20 times. When the fourth counter is not 20 (N in Step ST51), the control circuit 44 determines whether or not the detection signal DE is output (detected) during the predetermined detection period (dt1 to "ts" to dt2) (Step ST52). When no detection signal DE is output (detected) during the predetermined detection period (dt1 to "ts" to dt2) (N in Step ST52), the fourth counter is reset (Step ST53). When the detection signal DE is output (detected) during the predetermined detection period (dt1 to "ts" to dt2) (Y in Step ST52), the count number of the fourth counter is incremented by 1 (Step ST54).

When the count number of the fourth counter is 20 in Step ST51 (Y in Step ST51), the fourth counter is reset (Step ST55), and the setting is switched to the speed governing pulse output setting (Step ST56).

Further, when the count number of the third counter is 10 in Step ST42 (Y in Step ST42), the third counter is reset (Step ST61), and the setting is switched to the speed governing pulse stop setting (Step ST62). When the operation of the power supply circuit 60 is started after the power supply circuit 60 is stopped, the charged amount of the capacitor C is small, and hence it can be said that the power supply circuit 60 is in a state of being liable to be stopped again. Accordingly, it is preferred that, when the operation of the power supply circuit 60 is started after the power supply circuit 60 is stopped, the number of times of successive success of the detection signal DE required until the rate adjustment is started be increased. For example, it is preferred that, in Step ST51 of FIG. 31, when the count number of the fourth counter is 60, that is, when the detection of the detection signal DE has successively succeeded 60 times, the setting be switched to the speed governing pulse output setting.

In the example of FIG. 29 to FIG. 31 described above, the execution of the rate adjustment is regulated so that the power consumption can be reduced, and further transfer to the rate adjustment is likely to be immediately performed when the power spring 11 is wound up.

In the example of FIG. 29 to FIG. 31, there may be provided a function of notifying, when the counter-electromotive voltage exceeding the threshold value Vth has not been successively detected for a predetermined second, a user that the mechanical timepiece 1 is in a state of being liable to be stopped. As means for the notification, for example, it is preferred that a position or the like indicated by the hand be used. In this manner, it is possible to urge the user to perform the operation of winding up the power spring 11.

Further, in the example of FIG. 29 to FIG. 31, when the counter-electromotive voltage exceeding the threshold value Vth has not been successively detected for a predetermined second, the threshold voltage may be decreased. Specifically, for example, it is preferred that, when the threshold value Vth is 0.5 V, in a case in which the detection of the detection signal DE has successively failed 10 times, the threshold voltage be set to 0.25 V. In this manner, although the power supply circuit 60 is liable to be stopped, the rate accuracy can be maintained. In addition, after the threshold value Vth is decreased, when the counter-electromotive voltage exceeding the decreased threshold value has been successively detected for a predetermined second, it is preferred that the decreased threshold value be restored to the original threshold value Vth. Further, when the counter-electromotive voltage exceeding the threshold value Vth has not been successively detected for a predetermined second, the threshold value may be decreased stepwise.

[Details of Rate Adjustment Control: Rate Adjustment Control Considering Rotating Direction of Balance Wheel]

Figure 32:
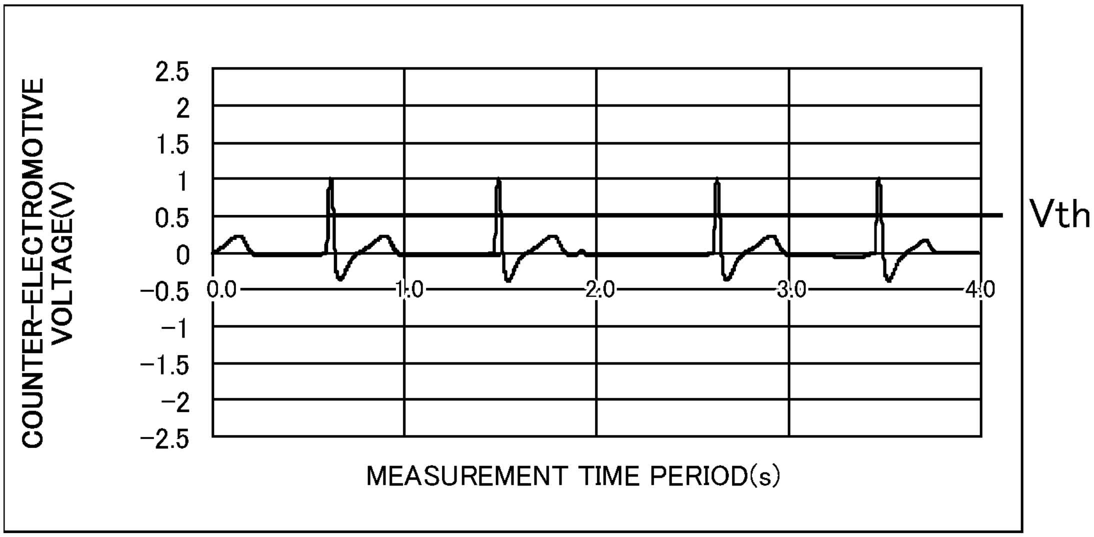
FIG. 32 is a timing chart for illustrating an example of an output timing of the reference signal.
Figure 32:
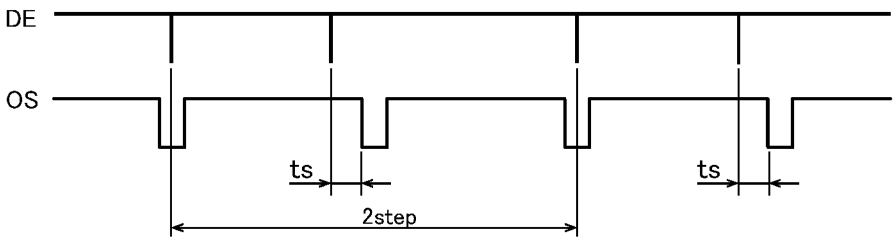
Figure 32:
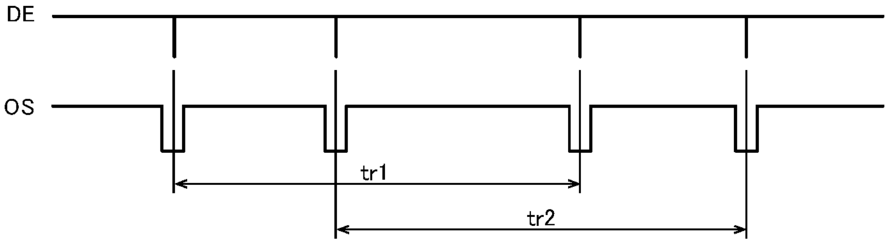

FIG. 32 is a timing chart for illustrating an example of the output timing of the reference signal. Because of the manufacturing variations at the time of assembly of the mechanical timepiece 1, the position adjustment of the balance wheel 31 performed by the support member 33 at the time of shipping inspection, and the like, in some cases, the rotation angle of the balance wheel 31 is different between the forward direction and the reverse direction. The different rotation angles mean that the forward direction and the reverse direction have different timings at which the detection signal DE is detected. As a result, there is a possibility that, although there is no rate deviation as a whole, the speed governing pulse is unnecessarily output.

In view of the above, in the example illustrated in FIG. 32, there is adopted a configuration in which the reference signal OS is set based on two steps (two seconds). The upper stage of FIG. 32 shows an example of a waveform of the counter-electromotive voltage in a case in which the detected detection signals DE are different between the forward direction and the reverse direction. The lower stage of FIG. 32 shows an example of a timing chart in a case in which the reference signal OS is set based on two steps (two seconds). As illustrated in the lower stage of FIG. 32, an output interval of odd-numbered reference signals OS from the left is represented by tr1, and an output interval of even-numbered reference signals OS from the left is represented by tr2 (=tr1). It is preferred that this example be achieved by performing, by the control circuit 44, two-system control in units of two steps (in units of two seconds). In addition, it is preferred that the rate adjustment be performed when a rate abnormality is detected in any of the control systems. In order to simplify the circuit configuration, a control system of only one system having the output interval of any of tr1 or tr2 may be employed.

With reference to the example illustrated in FIG. 32, the reference signal OS is provided based on two steps (tr1 and tr2), and the rate adjustment is performed in accordance with each step. In this manner, even when there is a difference in rotation angle between the forward motion and the reverse motion of the balance wheel 31, the circuit is less liable to be stopped by the disturbance, and highly-accurate rate adjustment is allowed.

The middle stage of FIG. 32 shows a timing chart in a case in which the reference signal OS is set based on one step (one second), that is, in the example illustrated in FIG. 17 referred to above or the like. In the example illustrated in the middle stage of FIG. 32, because the peak position of the counter-electromotive voltage is different between the forward direction and the reverse direction, although there is no rate deviation as a whole, the output timing of the even-numbered detection signal DE from the left is always deviated. In such a case, the speed governing pulse is unnecessarily output.

SUMMARY

In this embodiment, there is adopted a configuration in which the angular velocity of the balance wheel 31 is reduced, and hence wearing of each mechanism for transmitting the motive power (for example, the escape wheel and pinion 21 or the pallet fork 22) can be suppressed. As a result, the durability of the mechanical timepiece 1 is improved. Further, there is adopted a configuration in which, through use of the air resistance member 15, the angular velocity of the balance wheel 31 is reduced during the halfway period in each of the forward direction motion and the reverse direction motion of the balance wheel 31. In this manner, while the cycle of the rotation of the balance wheel 31 is delayed, electric power is generated during a period in which the balance wheel 31 receives no air resistance by the air resistance member 15, thereby being capable of ensuring a sufficient power generation amount. Further, the rate adjustment is performed during a period in which the balance wheel 31 receives the air resistance by the air resistance member 15 or a period after the balance wheel 31 receives the air resistance by the air resistance member 15, thereby being capable of maintaining the accuracy of the rate adjustment. Further, there is adopted a configuration in which the permanent magnet 41 is arranged so that a counter-electromotive voltage suitable for half-wave rectification can be obtained, and hence electric power can be efficiently extracted through use of the half-wave rectification.

Others

The rate adjustment means 40 obtains the detection signal based on the operation of the permanent magnet 41 magnetized into two poles. When a member causing a magnetic effect is present around the permanent magnet 41, there is a possibility that the detection accuracy is reduced. Accordingly, it is preferred that, as a material of a member present around the permanent magnet 41, a material causing less magnetic effect be adopted.

For example, it is preferred that a resin material be used as materials of the support member 33 and the stud support 34. Further, it is preferred that phosphor bronze be used as a material of the fixing tool 33*a* for fixing the support member 33 with respect to the main plate 10. Further, it is preferred that a resin material or aluminum be used as the material of the balance wheel 31. Further, it is preferred that an acrylic resin be used as the air resistance member 15. The materials given here are merely examples, and the present invention is not limited to those materials.

Further, as described above, the hairspring 32 is made of a resin so that the Young's modulus is reduced. Thus, as compared to the case in which the hairspring 32 is made of a metal, the magnetic effect to be applied to the permanent magnet 41 can be reduced. Further, when the hairspring 32 is made of a metal having magnetism, there is a possibility that the hairspring 32 receives a magnetic effect from the permanent magnet 41 so that the shape or the posture of the hairspring 32 is changed. In this embodiment, the hairspring 32 is made of a resin so that the shape and the posture of the hairspring 32 itself can be stabilized. Further, an antimagnetic plate made of a magnetic material may be separately provided to the mechanical timepiece 1. In this manner, even when an external magnet comes close to the mechanical timepiece 1, a disturbance of the forward/reverse rotational motion of the permanent magnet 41 (balance wheel 31) can be suppressed, and stable rate adjustment can be performed.

Further, in this embodiment, as illustrated in FIG. 5, there is shown an example in which the first end portion 421*a* and the second end portion 422*a* of the soft magnetic core 42 are integrated with each other through intermediation of the first welding portion 423 and the second welding portion 424, but the present invention is not limited thereto. For example, the soft magnetic core 42 may not include the first welding portion 423 and the second welding portion 424, and the magnetic coupling between the first end portion 421*a* and the second end portion 422*a* may be separated via a gap. Further, the present invention is not limited to a case of completely separating the magnetic coupling. For example, the first end portion 421*a* and the second end portion 422*a* may be physically connected to each other through intermediation of a narrowing portion serving as a separating portion.

Further, although not shown, it is preferred that the mechanical timepiece 1 include, on a dial or a back cover, an opening or a transparent portion for allowing the balance wheel 31 to be visually recognized from the outside.

Further, in this embodiment, an example in which the air resistance member 15 is provided has been described. However, the present invention is not limited thereto, and the mechanical timepiece 1 is not required to include the air resistance member 15. Further, when the air resistance member 15 is absent, the balance wheel 31 is not required to include the affected portion 313.

When a configuration in which the air resistance member 15 is used to cause air resistance to act on the balance wheel 31 is adopted as in this embodiment, energy is consumed by the air resistance, and thus the duration of the power spring 11 is reduced. Meanwhile, in this embodiment, a resin material having a low Young's modulus is adopted as the material of the hairspring 32 so that the speed of the operation of the balance wheel 31 is reduced, and thus the duration is increased as compared to that in a mechanical timepiece having six to eight oscillations in the related art. That is, the reduction in speed of the operation of the balance wheel 31 can compensate for the reduction of the duration caused by the air resistance. Accordingly, sufficient duration as the mechanical timepiece can be achieved.

What is claimed is:

1. A mechanical timepiece, comprising:

a hairspring to be elastically deformed so as to cause a balance wheel to perform a forward/reverse rotational motion;

a permanent magnet which is magnetized into two poles, and is configured to perform a forward/reverse rotational motion along with the forward/reverse rotational motion of the balance wheel;

a coil in which a counter-electromotive voltage is caused by the forward/reverse rotational motion of the permanent magnet;

a soft magnetic core including:

a first end portion to be provided along an outer periphery of the permanent magnet; and a second end portion which is to be provided along the outer periphery of the permanent magnet, and is to be arranged so as to be opposed to the first end portion through intermediation of the permanent magnet, the soft magnetic core being configured to form a magnetic circuit together with the coil; and a control circuit configured to be driven by an electric power being caused based on the counter-electromotive voltage, and perform rate adjustment based on the counter-electromotive voltage and a normal frequency of a reference signal source;

wherein the permanent magnet is arranged so that, under a state in which the hairspring is brought to an equilibrium length, a direction of magnetization is directed to the first end portion side or the second end portion side.

2. The mechanical timepiece according to claim 1, wherein the permanent magnet is arranged so that, under the state in which the hairspring is brought to the equilibrium length, the direction of magnetization is the same as an opposing direction of the first end portion and the second end portion.

3. The mechanical timepiece according to claim 1, wherein the soft magnetic core includes:

a first separating portion configured to separate magnetic coupling between the first end portion and the second end portion; and the second separating portion which is configured to separate the magnetic coupling between the first end portion and the second end portion, and is to be arranged so as to be opposed to the first separating portion through intermediation of the permanent magnet, and wherein the permanent magnet is arranged so that, under the state in which the hairspring is brought to the equilibrium length, the direction of magnetization is orthogonal to an opposing direction of the first separating portion and the second separating portion.

4. The mechanical timepiece according to claim 1, wherein the soft magnetic core includes:

a first separating portion configured to separate magnetic coupling between the first end portion and the second end portion; and the second separating portion which is configured to separate the magnetic coupling between the first end portion and the second end portion, and is to be arranged so as to be opposed to the first separating portion through intermediation of the permanent magnet, and wherein the permanent magnet includes an N-pole portion and an S-pole portion, and is arranged so that, under the state in which the hairspring is brought to the equilibrium length, a boundary between the N-pole portion and the S-pole portion overlaps a band-shaped region connecting the first separating portion and the second separating portion to each other.

5. The mechanical timepiece according to claim 1, further comprising a power source to drive the balance wheel;

wherein, under the state in which the hairspring is brought to the equilibrium length, the balance wheel is brought to a motive power supply position at which the motive power is supplied from the power source.

6. The mechanical timepiece according to claim 5, wherein the permanent magnet is arranged so that the counter-electromotive voltage to be detected while the permanent magnet is rotated by 180° in a forward direction or a reverse direction from the motive power supply position has the same polarity.

7. The mechanical timepiece according to claim 1, further comprising:

a rotation detecting circuit configured to detect a detection signal based on the counter-electromotive voltage; and a speed governing pulse output circuit configured to output a speed governing pulse for controlling a motion of the balance wheel, wherein the control circuit is configured to control the speed governing pulse output circuit based on a detection timing of the detection signal and an output timing of a reference signal, which is based on the normal frequency.

8. The mechanical timepiece according to claim 7, wherein the speed governing pulse output circuit is configured to:

output, when the detection timing of the detection signal is earlier than the output timing of the reference signal, the speed governing pulse to any one of a first terminal or a second terminal of the coil; and output, when the detection timing of the detection signal is later than the output timing of the reference signal, the speed governing pulse to another one of the first terminal or the second terminal.

9. The mechanical timepiece according to claim 7, wherein the speed governing pulse output circuit is configured to output a plurality of speed governing pulses as the speed governing pulse, the plurality of speed governing pulses having output periods different from each other.

10. The mechanical timepiece according to claim 7, wherein the speed governing pulse output circuit is configured to output a plurality of speed governing pulses as the speed governing pulse, the plurality of speed governing pulses having duty ratios different from each other.

11. The mechanical timepiece according to claim 9, wherein the speed governing pulse output circuit is configured to output the speed governing pulse corresponding to a deviation amount of the detection timing of the detection signal with respect to the output timing of the reference signal.

12. The mechanical timepiece according to claim 11, further comprising an accumulating unit configured to accumulate the deviation amount of the detection timing of the detection signal with respect to the output timing of the reference signal, wherein the speed governing pulse output circuit is configured to output the speed governing pulse corresponding to the deviation amount accumulated in the accumulating unit.

13. The mechanical timepiece according to claim 1, further comprising a rectifier circuit that rectifies a current generated in the coil according to the counter-electromotive voltage;

wherein the rectifying circuit includes a diode.

14. The mechanical timepiece according to claim 1, wherein the first end portion and the second end portion have at least a pair of notches for reducing holding torque of the permanent magnet, the pair of notches being formed so as to be opposed to each other.

15. The mechanical timepiece according to claim 1, further comprising a bearing structure configured to support an end portion of a rotary shaft of the balance wheel on a side closer to the permanent magnet, wherein the bearing structure includes an elastic deformation portion which is to be elastically deformed in accordance with displacement of the rotary shaft, and is made of a non-magnetic material.

16. The mechanical timepiece according to claim 15, wherein the elastic deformation portion has such a shape as to be elastically deformable in at least one of a radial direction or an axial direction of the rotary shaft in accordance with the displacement of the rotary shaft.

17. The mechanical timepiece according to claim 15, wherein the bearing structure includes:

a hole stone having a shaft hole through which the end portion of the rotary shaft is to be inserted; and a holding portion which is configured to hold the hole stone, is to be connected to the elastic deformation portion, and is made of a non-magnetic material.

18. The mechanical timepiece according to claim 15, further comprising an accommodating member configured to accommodate the bearing structure, wherein the accommodating member includes:

a first peripheral surface for surrounding the end portion of the rotary shaft;

a second peripheral surface which is to be provided on a side closer to the balance wheel with respect to the first peripheral surface, and which has a diameter smaller than a diameter of the first peripheral surface; and a stepped portion connecting the first peripheral surface and the second peripheral surface to each other, and wherein an outer edge of the elastic deformation portion is fixed with respect to the stepped portion.

19. The mechanical timepiece according to claim 18, wherein a diameter of the permanent magnet is smaller than the diameter of the second peripheral surface, and wherein at least parts of the permanent magnet and the second peripheral surface are provided at the same position in an axial direction of the rotary shaft.

* * * * *